(12) United States Patent
Quillen et al.

(10) Patent No.: US 8,431,202 B2
(45) Date of Patent: Apr. 30, 2013

(54) ALUMINUM/ALKALINE OR ALKALI/TITANIUM CONTAINING POLYESTERS HAVING IMPROVED REHEAT, COLOR AND CLARITY

(75) Inventors: Donna Rice Quillen, Kingsport, TN (US); Rodney Scott Armentrout, Kingsport, TN (US); Mary Therese Jernigan, Kingsport, TN (US); Steven Lee Stafford, Gray, TN (US); Zhiyong Xia, Gaithersburg, MD (US)

(73) Assignee: Grupo Petrotemex, S.A. de C.V., San Pedro Garza Garica (MX)

( * ) Notice: Subject to any disclaimer, the term of this patent is extended or adjusted under 35 U.S.C. 154(b) by 388 days.

(21) Appl. No.: 11/229,238

(22) Filed: Sep. 16, 2005

(65) Prior Publication Data

US 2007/0066735 A1   Mar. 22, 2007

(51) Int. Cl.
*B29D 22/00* (2006.01)
*B29D 23/00* (2006.01)
*B32B 1/08* (2006.01)

(52) U.S. Cl.
USPC ... 428/35.7; 428/36.9; 428/36.92; 428/542.8; 252/188.26; 252/184; 252/399; 252/400.1; 252/400.2; 252/400.21; 252/400.22; 252/400.23; 252/400.24

(58) Field of Classification Search ............... 428/35.7, 428/480, 36.92, 36.9, 542.8; 423/380, 382, 423/411; 252/500, 188.26, 184, 399, 400.1, 252/400.2, 400.21, 400.22, 400.23, 400.24; 528/274; 264/500
See application file for complete search history.

(56) References Cited

U.S. PATENT DOCUMENTS

| | | | |
|---|---|---|---|
| 2,720,506 A | 10/1955 | Caldwell et al. |
| 2,808,390 A | 10/1957 | Caldwell et al. |
| 2,965,613 A | 12/1960 | Milone et al. |
| 3,264,255 A | 8/1966 | Taylor |
| 3,420,913 A | 1/1969 | Railsback |
| 3,451,971 A | 6/1969 | Lazarus |
| 3,528,945 A | 9/1970 | Stewart et al. |
| 3,528,946 A | 9/1970 | Stewart et al. |
| 3,533,973 A | 10/1970 | Stewart et al. |
| 3,538,045 A | 11/1970 | Stewart et al. |
| 3,624,040 A | 11/1971 | Rath et al. |
| 3,631,153 A | 12/1971 | Carter et al. |
| 3,682,864 A | 8/1972 | Siclari et al. |
| 3,733,309 A | 5/1973 | Wyeth et al. |
| 3,852,262 A | 12/1974 | Vit et al. |
| 3,880,582 A | 4/1975 | Sawaya |
| 4,087,482 A | 5/1978 | Shaffer |
| 4,093,593 A | 6/1978 | Go |
| 4,100,142 A | 7/1978 | Schaefer et al. |
| 4,107,149 A | 8/1978 | Bier et al. |
| 4,124,566 A | 11/1978 | Saiki et al. |
| 4,159,301 A | 6/1979 | Buser et al. |
| 4,161,571 A | 7/1979 | Yasui et al. |
| 4,169,006 A | 9/1979 | Matsubara et al. |
| 4,185,043 A | 1/1980 | Shaffer |
| 4,228,549 A | 10/1980 | Rispoli |
| 4,230,595 A | 10/1980 | Yamaji et al. |
| 4,250,078 A | 2/1981 | McFarlane et al. |
| 4,260,735 A | 4/1981 | Bander et al. |
| 4,289,871 A | 9/1981 | Rowan et al. |
| 4,330,661 A | 5/1982 | Go |
| 4,343,922 A | 8/1982 | Shaffer |
| 4,357,461 A | 11/1982 | Go et al. |
| 4,401,804 A | 8/1983 | Wooten et al. |
| 4,408,004 A | 10/1983 | Pengilly |
| 4,420,581 A | 12/1983 | McFarlane et al. |
| 4,424,337 A | 1/1984 | Smith et al. |
| 4,433,135 A | 2/1984 | Worley et al. |
| 4,434,276 A | 2/1984 | Horlbeck et al. |
| 4,440,924 A | 4/1984 | Kuze et al. |
| 4,447,595 A | 5/1984 | Smith et al. |
| 4,476,272 A | 10/1984 | Pengilly |
| 4,481,314 A | 11/1984 | Rule |

(Continued)

FOREIGN PATENT DOCUMENTS

| AT | 259232 | 4/1965 |
|---|---|---|
| CN | 1392174 | 1/2003 |

(Continued)

OTHER PUBLICATIONS

Shaviv, Materials Science and Engineering A, vol. 2009, Issues 1-2, p. 345-352, 1996.*

(Continued)

*Primary Examiner* — Ellen S Wood
(74) *Attorney, Agent, or Firm* — Oblon, Spivak, McClelland, Maier & Neustadt, L.L.P.

(57) ABSTRACT

A polyester composition containing:
a) aluminum atoms; and
b) alkaline earth atoms or alkali metal atoms or alkali compound residues such as lithium atoms; and
c) particles comprising titanium, zirconium, vanadium, niobium, hafnium, tantalum, chromium, tungsten, molybdenum, iron, or nickel atoms or combinations thereof, where the particles improve the reheat rate of the polyester composition. The polyester polymer compositions may also contain phosphorus catalyst deactivators/stabilizers. The polyester compositions and the articles made from the compositions such as bottle preforms and stretch blow molded bottles have improved reheat rate while maintaining low haze, high L*, a b* below 3, and have low levels of acetaldehyde. In the process for making the polyester polymer, the polymer melt is polycondensed in the presence of a) and b), with the particles c) added in a melt phase process or added to the polymer in an injection molding machine or extruder. The polyester polymer composition can be made to high IV from the melt phase while avoiding solid state polymerization.

118 Claims, No Drawings

U.S. PATENT DOCUMENTS

| | | | |
|---|---|---|---|
| 4,499,288 A | 2/1985 | Harris |
| 4,501,878 A | 2/1985 | Adams |
| 4,520,078 A | 5/1985 | Rabinowitz et al. |
| 4,535,118 A | 8/1985 | Pengilly |
| 4,551,368 A | 11/1985 | Smith et al. |
| 4,604,303 A | 8/1986 | Takakura et al. |
| 4,613,664 A | 9/1986 | Tate et al. |
| 4,617,374 A | 10/1986 | Pruett et al. |
| 4,619,987 A | 10/1986 | Saiki et al. |
| 4,647,650 A | 3/1987 | Sasaki et al. |
| 4,686,274 A | 8/1987 | Harris et al. |
| 4,702,963 A | 10/1987 | Phillips et al. |
| 4,704,417 A | 11/1987 | Bonin et al. |
| 4,705,844 A | 11/1987 | Espenschied et al. |
| 4,740,377 A | 4/1988 | Dawes et al. |
| 4,764,323 A | 8/1988 | Al Ghatta |
| 4,775,598 A | 10/1988 | Jaeckel |
| 4,806,696 A | 2/1989 | Job |
| 4,831,115 A | 5/1989 | Golba, Jr. et al. |
| 4,845,186 A | 7/1989 | Chujo et al. |
| 4,871,790 A | 10/1989 | Lamanna et al. |
| 4,876,230 A | 10/1989 | Job |
| 4,906,693 A | 3/1990 | Craun et al. |
| 5,008,230 A | 4/1991 | Nichols |
| 5,041,405 A | 8/1991 | Lunsford et al. |
| 5,049,647 A | 9/1991 | Al-Ghatta |
| 5,090,134 A | 2/1992 | Russemeyer et al. |
| 5,104,965 A | 4/1992 | Jenkins et al. |
| 5,114,570 A | 5/1992 | Nelson et al. |
| 5,124,301 A | 6/1992 | Wyness et al. |
| 5,220,140 A | 6/1993 | Ball et al. |
| 5,250,333 A | 10/1993 | McNeely et al. |
| 5,254,288 A | 10/1993 | Verheijen et al. |
| 5,258,233 A | 11/1993 | Mills et al. |
| 5,266,413 A | 11/1993 | Mills et al. |
| 5,296,587 A | 3/1994 | Sumner, Jr. et al. |
| 5,300,746 A | 4/1994 | Walters et al. |
| 5,310,977 A | 5/1994 | Stenkamp et al. |
| 5,318,797 A * | 6/1994 | Matijevic et al. ........ 427/213.31 |
| 5,322,883 A | 6/1994 | Adyha et al. |
| 5,331,066 A | 7/1994 | Takanoo et al. |
| 5,340,884 A | 8/1994 | Mills et al. |
| 5,367,070 A | 11/1994 | Nath et al. |
| 5,372,864 A | 12/1994 | Weaver et al. |
| 5,382,157 A | 1/1995 | Denis et al. |
| 5,384,377 A | 1/1995 | Weaver et al. |
| 5,393,871 A | 2/1995 | Yau et al. |
| 5,403,807 A | 4/1995 | Narula |
| 5,409,983 A | 4/1995 | Jones et al. |
| 5,410,984 A | 5/1995 | Pikus et al. |
| 5,419,936 A | 5/1995 | Tindale |
| 5,496,887 A | 3/1996 | Braune |
| 5,514,462 A | 5/1996 | Endo et al. |
| 5,519,112 A | 5/1996 | Harazoe et al. |
| 5,529,744 A | 6/1996 | Tindale |
| 5,573,820 A | 11/1996 | Harazoe et al. |
| 5,589,530 A | 12/1996 | Walsh |
| 5,593,740 A | 1/1997 | Strumban et al. |
| 5,608,027 A | 3/1997 | Crosby et al. |
| 5,610,231 A | 3/1997 | Braune |
| 5,646,208 A | 7/1997 | Cattron et al. |
| 5,648,032 A | 7/1997 | Nelson et al. |
| 5,656,221 A | 8/1997 | Schumann et al. |
| 5,656,716 A | 8/1997 | Schmidt et al. |
| 5,674,801 A | 10/1997 | George |
| 5,688,874 A | 11/1997 | Hoffman |
| 5,718,860 A | 2/1998 | Lee et al. |
| 5,733,969 A | 3/1998 | Thiele |
| 5,774,571 A | 6/1998 | Marshall |
| 5,830,544 A | 11/1998 | Kerscher et al. |
| 5,830,981 A | 11/1998 | Koreishi et al. |
| 5,837,786 A | 11/1998 | Miyoshi et al. |
| 5,851,668 A | 12/1998 | Sandor et al. |
| 5,886,133 A | 3/1999 | Hilbert et al. |
| 5,898,058 A | 4/1999 | Nichols et al. |
| 5,906,882 A | 5/1999 | Valente et al. |
| 5,925,710 A | 7/1999 | Wu et al. |
| 5,940,022 A | 8/1999 | Takatsu |
| 5,945,460 A | 8/1999 | Ekart et al. |
| 5,962,608 A | 10/1999 | Ryang et al. |
| 5,976,450 A | 11/1999 | Mreijen |
| 5,998,004 A | 12/1999 | Nishino et al. |
| 6,020,419 A | 2/2000 | Bock et al. |
| 6,020,421 A | 2/2000 | Fukushima et al. |
| 6,022,920 A | 2/2000 | Maxwell et al. |
| 6,031,128 A | 2/2000 | Roh et al. |
| 6,034,202 A | 3/2000 | Aharoni et al. |
| 6,036,905 A | 3/2000 | Park et al. |
| 6,042,773 A | 3/2000 | Teramoto et al. |
| 6,063,827 A | 5/2000 | Sacripante et al. |
| 6,066,714 A | 5/2000 | Putzig et al. |
| 6,099,778 A | 8/2000 | Nelson et al. |
| 6,150,454 A | 11/2000 | Wu et al. |
| 6,156,867 A | 12/2000 | Aoyama et al. |
| 6,165,601 A | 12/2000 | Noda et al. |
| 6,166,170 A | 12/2000 | Putzig |
| 6,197,851 B1 | 3/2001 | Maxwell et al. |
| 6,200,659 B1 | 3/2001 | Fujimori et al. |
| 6,214,915 B1 | 4/2001 | Avakian et al. |
| 6,261,656 B1 | 7/2001 | Semersky |
| 6,274,212 B1 | 8/2001 | Rule et al. |
| 6,274,852 B1 | 8/2001 | Blok et al. |
| 6,281,278 B1 | 8/2001 | Takase et al. |
| 6,300,399 B1 | 10/2001 | Gallucci et al. |
| 6,313,200 B1 | 11/2001 | Finder |
| 6,316,584 B1 | 11/2001 | Seidel et al. |
| 6,323,271 B1 | 11/2001 | Caldwell et al. |
| 6,346,070 B1 | 2/2002 | Ohmatsuzawa et al. |
| 6,358,578 B1 | 3/2002 | Otto et al. |
| 6,365,659 B1 | 4/2002 | Aoyama et al. |
| 6,384,180 B1 | 5/2002 | Jernigan et al. |
| 6,417,320 B1 | 7/2002 | Otto et al. |
| 6,427,826 B1 | 8/2002 | Li et al. |
| 6,428,882 B1 | 8/2002 | Peiffer et al. |
| 6,451,959 B1 | 9/2002 | Ohmatsuzawa et al. |
| 6,458,915 B1 | 10/2002 | Quillen |
| 6,465,098 B2 | 10/2002 | Mizuguchi et al. |
| 6,472,471 B2 | 10/2002 | Cooke et al. |
| 6,472,500 B2 | 10/2002 | Dhawan et al. |
| 6,473,024 B2 | 10/2002 | Toyoda et al. |
| 6,489,434 B2 | 12/2002 | Jen |
| 6,498,212 B1 | 12/2002 | Kao et al. |
| 6,500,890 B2 | 12/2002 | Edwards et al. |
| 6,500,915 B1 | 12/2002 | Fujimori et al. |
| 6,503,586 B1 * | 1/2003 | Wu et al. ................ 428/35.7 |
| 6,541,598 B2 | 4/2003 | Duan et al. |
| 6,559,271 B2 | 5/2003 | Schaaf et al. |
| 6,569,479 B2 | 5/2003 | Rule |
| 6,569,991 B2 | 5/2003 | Nichols et al. |
| 6,572,810 B2 | 6/2003 | Chatterjee et al. |
| 6,573,359 B2 | 6/2003 | Nichols et al. |
| 6,590,069 B2 | 7/2003 | Nichols et al. |
| 6,599,596 B2 | 7/2003 | Nichols et al. |
| 6,601,987 B2 | 8/2003 | Finder et al. |
| 6,638,456 B2 | 10/2003 | Klein et al. |
| 6,649,731 B2 | 11/2003 | Hori et al. |
| 6,660,792 B2 | 12/2003 | Massey et al. |
| 6,710,158 B2 | 3/2004 | Edwards et al. |
| 6,716,904 B2 | 4/2004 | Takahashi |
| 6,727,306 B2 | 4/2004 | Edwards et al. |
| 6,733,873 B2 | 5/2004 | Mizutani et al. |
| 6,773,800 B2 | 8/2004 | Hosoe et al. |
| 6,774,204 B1 | 8/2004 | Putzig |
| 6,777,048 B2 | 8/2004 | Quillen et al. |
| 6,780,916 B2 | 8/2004 | Tung et al. |
| 6,787,630 B1 | 9/2004 | Dominguez De Walter et al. |
| 6,797,401 B2 | 9/2004 | Herron |
| 6,803,082 B2 | 10/2004 | Nichols et al. |
| 6,827,897 B2 | 12/2004 | Hall et al. |
| 6,828,272 B2 | 12/2004 | Wiegner et al. |
| 6,852,388 B2 | 2/2005 | Murschall et al. |
| 6,887,947 B1 | 5/2005 | Schaefer et al. |
| 6,896,830 B2 | 5/2005 | Carlton et al. |
| 6,896,966 B2 | 5/2005 | Crawford et al. |
| 6,953,768 B2 | 10/2005 | Wallace et al. |
| 7,048,995 B2 | 5/2006 | Fujimori et al. |
| 7,129,317 B2 | 10/2006 | Moore et al. |

| | | | | | |
|---|---|---|---|---|---|
| 7,300,967 B2 * | 11/2007 | Xia .................. 524/439 | JP | 48007272 | 3/1973 |
| 2002/0011694 A1 | 1/2002 | Nichols et al. | JP | 47039497 | 8/1973 |
| 2002/0032300 A1 | 3/2002 | Dowling et al. | JP | 48026955 | 8/1973 |
| 2002/0077443 A1 | 6/2002 | Nichols et al. | JP | 48056782 | 8/1973 |
| 2002/0087027 A1 | 7/2002 | Lindall et al. | JP | 48056783 | 8/1973 |
| 2002/0091226 A1 | 7/2002 | Nichols et al. | JP | 48056784 | 8/1973 |
| 2002/0094402 A1 | 7/2002 | Jen | JP | 47042989 | 9/1973 |
| 2002/0128427 A1 | 9/2002 | Schaaf et al. | JP | 48-79896 | 10/1973 |
| 2002/0136808 A1 | 9/2002 | Rule | JP | 48031991 | 10/1973 |
| 2002/0137872 A1 | 9/2002 | Schneider et al. | JP | 48079898 | 10/1973 |
| 2002/0137879 A1 | 9/2002 | Ohmatsuzawa et al. | JP | 73035948 | 10/1973 |
| 2002/0193555 A1 | 12/2002 | Hori et al. | JP | 48038634 | 11/1973 |
| 2002/0198297 A1 | 12/2002 | Odorisio et al. | JP | 48038635 | 11/1973 |
| 2003/0018160 A1 | 1/2003 | Otto et al. | JP | 48038637 | 11/1973 |
| 2003/0040564 A1 | 2/2003 | Tung et al. | JP | 48044959 | 12/1973 |
| 2003/0045673 A1 | 3/2003 | Nakajima et al. | JP | 48099133 | 12/1973 |
| 2003/0083191 A1 | 5/2003 | Nakajima et al. | JP | 48102191 | 12/1973 |
| 2003/0108702 A1 | 6/2003 | Tung et al. | JP | 49005918 | 1/1974 |
| 2003/0144459 A1 | 7/2003 | Fujimori et al. | JP | 49010834 | 1/1974 |
| 2003/0216253 A1 | 11/2003 | Wiegner et al. | JP | 49006835 | 2/1974 |
| 2004/0023000 A1 | 2/2004 | Young et al. | JP | 49006839 | 2/1974 |
| 2004/0058805 A1 | 3/2004 | Nakajima et al. | JP | 49009116 | 3/1974 |
| 2004/0077486 A1 | 4/2004 | Bellamy et al. | JP | 49045014 | 4/1974 |
| 2004/0086733 A1 * | 5/2004 | Fujimori et al. ......... 428/480 | JP | 49045015 | 4/1974 |
| 2004/0096609 A1 | 5/2004 | Nichols et al. | JP | 49 032676 | 9/1974 |
| 2004/0101642 A1 | 5/2004 | Quillen et al. | JP | 50039711 | 4/1975 |
| 2004/0102316 A1 | 5/2004 | Wallace et al. | JP | 51042795 | 4/1976 |
| 2004/0106767 A1 | 6/2004 | Simon et al. | JP | 51127195 | 11/1976 |
| 2004/0127653 A1 | 7/2004 | Ellington et al. | JP | 51145594 | 12/1976 |
| 2004/0138057 A1 | 7/2004 | Wenzel | JP | 52-039790 | 3/1977 |
| 2004/0178386 A1 | 9/2004 | Tung et al. | JP | 52123489 | 10/1977 |
| 2004/0180159 A1 | 9/2004 | Neal et al. | JP | 52129798 | 10/1977 |
| 2004/0180996 A1 | 9/2004 | Pearson et al. | JP | 52129799 | 10/1977 |
| 2004/0180997 A1 | 9/2004 | Pearson et al. | JP | 53051294 | 5/1978 |
| 2004/0185198 A1 | 9/2004 | Sisson et al. | JP | 53051295 | 5/1978 |
| 2004/0192813 A1 | 9/2004 | Pearson et al. | JP | 53052595 | 5/1978 |
| 2004/0224842 A1 | 11/2004 | Wallace et al. | JP | 53105591 | 9/1978 |
| 2004/0225104 A1 | 11/2004 | Wiegner et al. | JP | 55089332 | 9/1978 |
| 2004/0235640 A1 | 11/2004 | Sterzel | JP | 54135896 | 10/1979 |
| 2004/0236066 A1 | 11/2004 | Moore et al. | JP | 54163996 | 12/1979 |
| 2004/0241468 A1 | 12/2004 | Otaki | JP | 55115425 | 9/1980 |
| 2004/0249113 A1 | 12/2004 | Quillen et al. | JP | 55149320 | 11/1980 |
| 2005/0107576 A1 | 5/2005 | Hori et al. | JP | 56008431 | 1/1981 |
| 2005/0153086 A1 * | 7/2005 | Moore et al. .............. 428/35.7 | JP | 56-149423 | 11/1981 |
| 2005/0203267 A1 | 9/2005 | Jernigan et al. | JP | 57038609 | 8/1982 |
| 2005/0222345 A1 | 10/2005 | Nakayama et al. | JP | 58109532 | 6/1983 |
| 2006/0223958 A1 | 10/2006 | Fischbuch | JP | 60219226 | 6/1983 |
| 2006/0287472 A1 | 12/2006 | Jernigan | JP | 59-015427 | 1/1984 |
| 2007/0106055 A1 | 5/2007 | Kageyama et al. | JP | 60-31526 | 2/1985 |
| 2007/0203279 A1 * | 8/2007 | Jarvis et al. ............ 524/413 | JP | 60139750 | 7/1985 |
| | | | JP | 60-151826 | 8/1985 |
| FOREIGN PATENT DOCUMENTS | | | JP | 60202148 | 10/1985 |
| | | | JP | 61-278558 | 12/1986 |
| CN | 1482154 | 3/2004 | JP | 61-291650 | 12/1986 |
| DE | 1950553 | 5/1970 | JP | 62-039208 | 2/1987 |
| EP | 0578464 | 1/1994 | JP | 62152715 | 7/1987 |
| EP | 0581246 | 2/1994 | JP | 62161827 | 7/1987 |
| EP | 699700 | 3/1996 | JP | 62-177035 | 8/1987 |
| EP | 0541702 | 9/1996 | JP | 62207337 | 9/1987 |
| EP | 0465040 | 1/1997 | JP | 62297318 | 12/1987 |
| EP | 0884365 | 12/1998 | JP | 63-264661 | 11/1988 |
| EP | 0921144 | 6/1999 | JP | 63-315604 | 12/1988 |
| EP | 1065230 | 1/2001 | JP | 62-182065 | 1/1989 |
| EP | 1152035 | 11/2001 | JP | 22-14734 | 8/1990 |
| EP | 1477506 | 11/2004 | JP | 3146707 | 6/1991 |
| EP | 1227117 | 12/2004 | JP | 3161509 | 7/1991 |
| EP | 1516892 | 3/2005 | JP | 3292323 | 12/1991 |
| EP | 1535944 | 6/2005 | JP | 4370142 | 12/1992 |
| EP | 1548046 | 6/2005 | JP | 5097990 | 4/1993 |
| EP | 1239006 | 7/2005 | JP | 5-117379 | 5/1993 |
| GB | 673066 | 6/1952 | JP | 5-287067 | 11/1993 |
| GB | 1337751 | 11/1973 | JP | 05097990 | 11/1993 |
| JP | 46-35500 | 10/1971 | JP | 6087953 | 3/1994 |
| JP | 46040711 | 12/1971 | JP | 06-184333 | 7/1994 |
| JP | 46040713 | 12/1971 | JP | 6-271949 | 9/1994 |
| JP | 46040714 | 12/1971 | JP | 1994271494 | 9/1994 |
| JP | 46041025 | 12/1971 | JP | 62-79599 | 10/1994 |
| JP | 46041031 | 12/1971 | JP | 6286088 | 10/1994 |
| JP | 46041033 | 12/1971 | JP | 1994306154 | 11/1994 |
| JP | 48005798 | 1/1973 | | | |

| | | |
|---|---|---|
| JP | 7133412 | 5/1995 |
| JP | 7224218 | 8/1995 |
| JP | 7-268188 | 10/1995 |
| JP | 1995268188 | 10/1995 |
| JP | 1996003301 | 1/1996 |
| JP | 1996283398 | 10/1996 |
| JP | 8325364 | 12/1996 |
| JP | 1991040850 | 2/1997 |
| JP | 9176464 | 7/1997 |
| JP | 9176465 | 7/1997 |
| JP | 9183892 | 7/1997 |
| JP | 09-256220 | 9/1997 |
| JP | 9272793 | 10/1997 |
| JP | 10316765 | 12/1998 |
| JP | 11005892 | 1/1999 |
| JP | 1999071106 | 3/1999 |
| JP | 1999152324 | 6/1999 |
| JP | 11-181067 | 7/1999 |
| JP | 1999236440 | 8/1999 |
| JP | 2000128970 | 5/2000 |
| JP | 2000128971 | 5/2000 |
| JP | 2000129102 | 5/2000 |
| JP | 2000226446 | 8/2000 |
| JP | 2000302854 | 10/2000 |
| JP | 200126639 | 1/2001 |
| JP | 2001 098418 | 4/2001 |
| JP | 2001163964 | 6/2001 |
| JP | 2001262016 | 9/2001 |
| JP | 2001 278970 | 10/2001 |
| JP | 2001 354759 | 12/2001 |
| JP | 2002 249569 | 9/2002 |
| JP | 2002249648 | 9/2002 |
| JP | 2002249653 | 9/2002 |
| JP | 2002322254 | 11/2002 |
| JP | 2002322258 | 11/2002 |
| JP | 2002332337 | 11/2002 |
| JP | 2003040992 | 2/2003 |
| JP | 2003113230 | 4/2003 |
| JP | 2003113232 | 4/2003 |
| JP | 2003171454 | 6/2003 |
| JP | 2003171455 | 6/2003 |
| JP | 2003-268628 | 9/2003 |
| JP | 2003261666 | 9/2003 |
| JP | 2003268093 | 9/2003 |
| JP | 2003301038 | 10/2003 |
| JP | 2003301090 | 10/2003 |
| JP | 2003301093 | 10/2003 |
| JP | 2003306536 | 10/2003 |
| JP | 2003306538 | 10/2003 |
| JP | 2003306541 | 10/2003 |
| JP | 2003306601 | 10/2003 |
| JP | 2004035659 | 2/2004 |
| JP | 2004035660 | 2/2004 |
| JP | 2004067733 | 3/2004 |
| JP | 2004149790 | 5/2004 |
| JP | 2004156055 | 6/2004 |
| JP | 2004197088 | 7/2004 |
| JP | 2004204138 | 7/2004 |
| JP | 2004224858 | 8/2004 |
| JP | 2004256633 | 9/2004 |
| JP | 2004323627 | 11/2004 |
| JP | 2005023160 | 1/2005 |
| JP | 2005047960 | 2/2005 |
| JP | 2005047961 | 2/2005 |
| JP | 2005047962 | 2/2005 |
| JP | 2005187556 | 7/2005 |
| JP | 2005187557 | 7/2005 |
| JP | 2005187558 | 7/2005 |
| JP | 2005187559 | 7/2005 |
| JP | 2005187560 | 7/2005 |
| JP | 2005187561 | 7/2005 |
| JP | 2005220234 | 8/2005 |
| JP | 2005213291 | 11/2005 |
| JP | 2005213292 | 11/2005 |
| JP | 2005213293 | 11/2005 |
| KR | 9303713 | 5/1993 |
| KR | 120831 | 7/1995 |
| KR | 9707952 | 5/1997 |
| KR | 2001089942 | 10/2001 |
| NL | 7113206 | 1/1973 |
| SU | 374343 | 7/1973 |
| WO | WO 96/03163 | 2/1996 |
| WO | 9728218 | 8/1997 |
| WO | WO 97/44376 | 11/1997 |
| WO | WO 98/41559 | 9/1998 |
| WO | WO 99/57173 | 11/1999 |
| WO | WO 01/21680 | 3/2001 |
| WO | WO 0114452 | 3/2001 |
| WO | WO 01/46306 | 6/2001 |
| WO | WO 01/47688 | 7/2001 |
| WO | WO 02/18472 | 3/2002 |
| WO | WO 02/051616 | 7/2002 |
| WO | WO 02/057335 | 7/2002 |
| WO | WO 02/068497 | 9/2002 |
| WO | WO 02/072665 | 9/2002 |
| WO | WO 03/010226 | 2/2003 |
| WO | WO 2004/065452 | 8/2004 |
| WO | WO 2004/074365 | 9/2004 |
| WO | WO 2004/078825 | 9/2004 |
| WO | WO 2004/101645 | 11/2004 |
| WO | WO 2005/068531 | 7/2005 |
| WO | WO 2005/075539 | 8/2005 |
| WO | WO 2005/082527 | 9/2005 |
| WO | WO 2005/095516 | 10/2005 |
| WO | WO 2007/035250 A3 | 3/2007 |

OTHER PUBLICATIONS

Toth; Transition Metal Carbides and Nitrides, General Properties, Preparation and Characterization; 1971; pp. 1-28, Academic Press, Inc., New York.*
Terekhova, Mikhailov, Tokareva; Heat Stability of Polyethylene Terephthalate (PET) Containing Phosphoric Acid Esters; Khimicheskie volokna; 1964; pp. 1-6; No. 4.
Terekhova, Petukhov, Blocking of Terminal Groups of Polyethylene Terephthalate with o-Phosphoric Acid; Nauka I Teckhnika (Science and Technoloy): Synthetic Fibers; pp. 1-5; No. 2.
Kamatani, Konagaya, Nakamura; Effect of Phosphoric Acid on the Polycondensation of Bis(2-hydroxyethyl) Terephthalate Catalyzed by Sb(III) Compounds; Polymer Journal; 1980; pp. 125-130; vol. 12; No. 2.
International Search Report from co-pending U.S. Appl. No. 11/154,208 filed Jun. 16, 2005.
International Search Report from co-pending U.S. Appl. No. 11/229,367 filed Sep. 16, 2005.
Office Action dated May 14, 2007 from co-pending U.S. Appl. No. 11/229,367.
Office Action dated Aug. 2, 2006 from co-pending U.S. Appl. No. 11/229,367.
Office Action dated Jan. 18, 2007 from co-pending U.S. Appl. No. 11/229,367.
Co-pending U.S. Appl. No. 11/495,431, filed 7/28/06.
Co-pending U.S. Appl. No. 11/500,862, filed 8/8/06.
International Search Report.
Hans Meerwein and Theodor Bersin, Investigations of Metal Alcoholates and Ortho Acid Esters, Annalen der Chemie, Chemical Insitute of Marburg University, 1929, pp. 113-150, vol. 454765.
Hans Meerwein, Increase in Ionization Capacity of Weak Electrolytes as a Result of Complex Formation and its Significance for Catalytic Processes, Annalen der Chemie, Chemical Insitute of Konigsberg University, 1927, pp. 222-253, vol. 455.
U.S. Appl. No. 10/934,546, filed Sep. 3, 2004—now ABD.
Co-pending U.S. Appl. No. 10/996,924, filed Nov. 24, 2004.
U.S. Appl. No. 10/933,975, filed Sep. 3, 2004 now ABD.
Co-pending U.S. Appl. No. 10/996,944, filed Nov. 24, 2004.
U.S. Appl. No. 10/934,987, filed Sep. 3, 2004 now ABD.
Co-pending U.S. Appl. No. 10/997,040, filed Nov. 24, 2004.
Co-pending U.S. Appl. No. 11/005,689, filed Dec. 7, 2004.
Co-pending U.S. Appl. No. 11/372,819, filed Mar. 10, 2006.
Co-pending U.S. Appl. No. 10/988,226, filed Nov. 12, 2004.
Co-pending U.S. Appl. No. 11/373,251, filed Mar. 10, 2006.
Co-pending U.S. Appl. No. 11/502,814, filed Aug. 11, 2006.
Co-pending U.S. Appl. No. 10/988,263, filed Nov. 12, 2004.
Co-pending U.S. Appl. No. 11/054,194, filed Feb. 9, 2005.

Co-pending U.S. Appl. No. 11/228,773, filed Sep. 16, 2005.
Co-pending U.S. Appl. No. 11/228,733, filed Sep. 16, 2005.
U.S. Appl. No. 60/797,452, filed Mar. 4, 2006—now expired.
Co-pending U.S. Appl. No. 11/524,056, filed Sep. 20, 2006.
Office Action dated Sep. 7, 2007 from co-pending U.S. Appl. No. 10/997,040.
Office Action dated Sep. 6, 2007 from co-pending U.S. Appl. No. 10/988,263.
The International Search Report from co-pending U.S. Appl. No. 11/495,431; International Application No. PCT/US06/34616.
Plastic Additives Handbook 5$^{th}$ Ed., 2001, pp. 123-136, Hanser Gardner Publications.
Fred W. Billmeyer, Jr., Methods for Estimating Intrinsic Vicosity, Journal of Polymer Science, 4, 1949, pp. 83-86, E.I. du Pont de Nemours and Co., Arlington, New Jersey.
Carl W. Fuller, Colored Iron Oxide Pigments, Synthetic Pigment Handbook, 1973, pp. 323-349, vol. 1, John Wiley and Sons, New York.
Fred W. Billmeyer, Jr., Principles of Color Technology, Describing Color, 1981, pp. 25-66, John Wiley and Sons, New York.
Kirk Othmer, Titanium and Titanium Alloys, Encyclopedia of Chemical Technology, vol. 24, 4$^{th}$ Ed., 1997, pp. 186-224; 225-349 and 801.
Louis E. Toth, Transition Metal Carbide and Nitrides, General Properties, Preparation and Characterization, 1971, p. 1-28, Academic Press New York, & p. 87.
Kirk Othmer, Encyclopedia of Chemical Technology, vol. 17, 4$^{th}$ Ed., 1996, pp. 108-127.
Kirk Othmer, Encyclopedia of Chemical Technology, vol. 4, 4$^{th}$ Ed., 1992, pp. 841-848.
Kirk Othmer, Encyclopedia of Chemical Technology, vol. 4, 4$^{th}$ Ed., 1997, pp. 423-430.
Kirk Othmer, Encyclopedia of Chemical Technology, vol. 25, 4$^{th}$ Ed., 1998, pp. 872-873.
Kirk Othmer, Encyclopedia of Chemical Technology, vol. 23, 4$^{th}$ Ed., 1997, p. 676.
Kirk Othmer, Encyclopedia of Chemical Technology, vol. 6, 4$^{th}$ Ed., 1998, pp. 228-311.
Kirk Othmer, Encyclopedia of Chemical Technology, vol. 24, 4$^{th}$ Ed., 1998, pp. 572-602.
Kirk Othmer, Encyclopedia of Chemical Technology, vol. 14., 4$^{th}$ Ed., 1998, pp. 829-902.
Kirk Othmer, Encyclopedia of Chemical Technology, vol. 17, 4$^{th}$ Ed., 1998, pp. 1-42; 43-67.
Kirk Othmer, Encyclopedia of Chemical Technology, vol. 12, 4$^{th}$ Ed., 1998, pp. 863-881.
Kirk Othmer, Encyclopedia of Chemical Technology, vol. 22, 4$^{th}$ Ed., 1997, pp. 256-278.
Kirk Othmer, Encyclopedia of Chemical Technology, vol. 16, 4$^{th}$ Ed., pp. 925-962.
D.C. Allport and A.A. Mohajer, Block Copolymers, 1973, pp. 264-270, John Wiley and Sons, New York.
M.E. Stewart, A.J. Cox, D.M. Naylor, Reactive Processing of poly(ethylene 2,6-naphthalene dicarboxylate)/poly(ethylene terephthalate) Blends, Polymer, 1993, pp. 4060-4067, vol. 34, No. 19; Butterworth-Heinemann Ltd.
Liu et al., Improving Oxygen Barrier Properties of Poly(ethylene terephthlate) by incorporating isophthalate. I. Effect of Orientation, Journal of Applied Science, Nov. 15, 2005, 98(4), pp. 1615-1628, Wiley Periodicals, Inc.
Co-pending U.S. Appl. No. 60/718,286, filed Sep. 16, 2005.
Co-pending U.S. Appl. No. 11/154,208, filed Jun. 16, 2005.
Co-pending U.S. Appl. No. 11/229,367, filed Sep. 16, 2005.
Co-pending U.S. Appl. No. 11/154,146, filed Jun. 16, 2005.
Co-pending U.S. Appl. No. 11/095,834, filed Mar. 31, 2005.
Co-pending U.S. Appl. No. 11/228,672, filed Sep. 16, 2005, CiP of U.S. Appl. No. 11/094,034, filed Mar. 30, 2005, CIP of U.S. Appl. No. 10/988,133, filed Nov. 12, 2004.
Co-pending U.S. Appl. No. 11/229,238, filed Sep. 16, 2005.
Research Disclosure 39771; Anonymous; May 1997.
A. Boehm and A. Glaser, The quaterrylimides-highly efficient NIR absorbers for plastics, ANTEC paper 2004, Chicago, IL, May 2004.

Wu, S., A Generalized Criterion for Rubber Toughening: The Critical Matrix Ligament Thickness, Journal of Applied Polymer Science, vol. 35, pp. 549-561, 1988, John Wiley and Sons.
Weissmann, Mariana, et al.; "Theoretical study of cabon-coated iron nanowires"; Physical Review B70, 201401-1 through 201401-4; 2004; The American Physical Society.
Zhang, Z.D. et al.; "Shell/core structure and magnetic properties of carbon-coated Fe-Co © nanocapsules"; Journal of Physics: Condensed Matter 13; 1921-1929; 2001; Institute of Physics Publishing Ltd.
Encyclopedia of Chemical Technology; 4$^{th}$ Ed; vol. 4; pp. 1015-1037; John Wiley and Sons, New York.
Pierson, H.O.; Handbook of Carbon, Graphite, Diamond and Fullerenes: Properties and Applications; pp. 122-140; Noyes Publications; 1993.
Office Action dated Jun. 9, 2008 in Copending U.S. Appl. No. 11/495,431.
USPTO Notice of Allowance dated Jul. 15, 2010 from co-pending U.S. Appl. No. 12/611,380.
USPTO Office Action dated Jun. 22, 2010 from co-pending U.S. Appl. No. 10/988,263.
USPTO Office Action dated Jul. 21, 2010 from co-pending U.S. Appl. No. 11/500,862.
Chinese Office Action issued Jul. 28, 2011, in Patent Application No. 095134160 (with English-language translation).
Office Action issued in Application No. JP 2008-531176, filed Sep. 6, 2006.
Office Action issued Apr. 30, 2012, in Malaysian Patent Application No. PI 20063792, filed Aug. 7, 2006 (with English-language Translation).
Office Action issued Apr. 24, 2012, in Taiwan Patent Application No. 095134160, filed Sep. 15, 2006 (with English-language Translation).
Supplementary European Search Report issued May 16, 2012, in European Patent Application No. 06802967.7 filed Sep. 6, 2006.
Notice of Reasons for Rejection issued May 29, 2012, in Japanese Patent Application No. 2008-531176 filed Sep. 6, 2006 (with English translation).
Office Action issued Jun. 4, 2012, in European Patent Application No. 06802967.7 filed Sep. 6, 2007.
Office Action dated Jun. 9, 2008, in copending U.S. Appl. No. 11/495,431.
Office Action dated Dec. 15, 2008, in copending U.S. Appl. No. 11/495,431.
Office Action dated Jun. 4, 2009, in copending U.S. Appl. No. 11/495,431.
Notice of Allowance dated Sep. 17, 2009, in copending U.S. Appl. No. 11/495,431.
Office Action dated Dec. 30, 2009, in copending U.S. Appl. No. 11/495,431.
Notice of Allowance dated May 18, 2010, in copending U.S. Appl. No. 11/495,431.
Office Action dated Jan. 25, 2008, in copending U.S. Appl. No. 11/229,367.
Office Action dated May 15, 2008, in copending U.S. Appl. No. 11/229,367.
Notice of Allowance dated Nov. 7, 2008, in copending U.S. Appl. No. 11/229,367.
Notice of Allowance dated Dec. 30, 2008, in copending U.S. Appl. No. 11/229,367.
Office Action dated Apr. 6, 2009, in copending U.S. Appl. No. 11/229,367.
Notice of Allowance dated Aug. 4, 2009, in copending U.S. Appl. No. 11/229,367.
Notice of Allowance dated Dec. 18, 2009, in copending U.S. Appl. No. 11/229,367.
Co-pending U.S. Appl. No. 12/611,380, filed Nov. 3, 2009.
Office Action dated Dec. 16, 2009 in co-pending U.S. Appl. No. 12/611,380.
Office Action dated Apr. 7, 2010 in co-pending U.S. Appl. No. 12/611,380.
Office Action dated Mar. 17, 2008 in co-pending U.S. Appl. No. 10/996,924.

Office Action dated Oct. 1, 2008 in co-pending U.S. Appl. No. 10/996,924.
Office Action dated Feb. 27, 2009 in co-pending U.S. Appl. No. 10/996,924.
Office Action dated Aug. 28, 2009 in co-pending U.S. Appl. No. 10/996,924.
Notice of Allowance dated Dec. 2, 2009 in co-pending U.S. Appl. No. 10/996,924.
Office Action dated Jul. 24, 2007 in co-pending U.S. Appl. No. 10/996,944.
Office Action dated Oct. 4, 2007 in co-pending U.S. Appl. No. 10/996,944.
Office Action dated Feb. 20, 2008 in co-pending U.S. Appl. No. 10/996,944.
Office Action dated Jul. 30, 2008 in co-pending U.S. Appl. No. 10/996,944.
Office Action dated Feb. 26, 2009 in co-pending U.S. Appl. No. 10/996,944.
Office Action dated Jul. 17, 2009 in co-pending U.S. Appl. No. 10/996,944.
Office Action dated Apr. 2, 2008 in co-pending U.S. Appl. No. 10/997,040.
Office Action dated Aug. 20, 2008 in co-pending U.S. Appl. No. 10/997,040.
Office Action dated Apr. 10, 2009 in co-pending U.S. Appl. No. 10/997,040.
Office Action dated Sep. 16, 2009 in co-pending U.S. Appl. No. 10/997,040.
Office Action dated Aug. 6, 2008 in co-pending U.S. Appl. No. 11/154,208.
Office Action dated Jan. 12, 2009 in co-pending U.S. Appl. No. 11/154,208.
Office Action dated Jul. 2, 2009 in co-pending U.S. Appl. No. 11/154,208.
Office Action dated Nov. 9, 2009 in co-pending U.S. Appl. No. 11/154,208.
Office Action dated Jun. 8, 2006 in co-pending U.S. Appl. No. 11/005,689.
Office Action dated Nov. 8, 2006 in co-pending U.S. Appl. No. 11/005,689.
Office Action dated May 29, 2007 in co-pending U.S. Appl. No. 11/005,689.
Office Action dated Oct. 18, 2007 in co-pending U.S. Appl. No. 11/005,689.
Office Action dated Dec. 27, 2007 in co-pending U.S. Appl. No. 11/005,689.
Office Action dated May 21, 2008 in co-pending U.S. Appl. No. 11/005,689.
Office Action dated Sep. 30, 2008 in co-pending U.S. Appl. No. 11/005,689.
Office Action dated Feb. 26, 2009 in co-pending U.S. Appl. No. 11/005,689.
Office Action dated Jul. 2, 2009 in co-pending U.S. Appl. No. 11/005,689.
Office Action dated Jun. 21, 2007 in co-pending U.S. Appl. No. 11/372,819.
Office Action dated Nov. 14, 2007 in co-pending U.S. Appl. No. 11/372,819.
Office Action dated May 30, 2008 in co-pending U.S. Appl. No. 11/372,819.
Office Action dated Dec. 3, 2008 in co-pending U.S. Appl. No. 11/372,819.
Office Action dated May 28, 2009 in co-pending U.S. Appl. No. 11/372,819.
Office Action dated Nov. 29, 2005 in co-pending U.S. Appl. No. 10/988,226.
Office Action dated May 11, 2006 in co-pending U.S. Appl. No. 10/988,226.
Office Action dated Nov. 8, 2006 in co-pending U.S. Appl. No. 10/988,226.
Office Action dated Jun. 5, 2007 in co-pending U.S. Appl. No. 10/988,226.
Notice of Allowance dated Aug. 1, 2007 in co-pending U.S. Appl. No. 10/988,226.
Office Action dated Jul. 28, 2008 from copending U.S. Appl. No. 11/373,251.
Office Action dated Dec. 11, 2008 from copending U.S. Appl. No. 11/373,251.
Office Action dated Apr. 14, 2009 from copending U.S. Appl. No. 11/373,251.
Office Action dated Nov. 2, 2009 from copending U.S. Appl. No. 11/373,251.
Office Action dated Feb. 6, 2008 from copending U.S. Appl. No. 11/502,814.
Notice of Allowance dated Jul. 15, 2008 from copending U.S. Appl. No. 11/502,814.
Office Action dated Sep. 24, 2009 from copending U.S. Appl. No. 12/200,976.
Office Action dated Feb. 24, 2010 from copending U.S. Appl. No. 12/200,976.
Co-pending U.S. Appl. No. 10/988,133, filed Nov. 12, 2004.
Co-pending U.S. Appl. No. 11/094,034, filed Mar. 30, 2005.
Office Action dated Aug. 8, 2005 U.S. Appl. No. 11/094,034, filed Mar. 30, 2005.
Office Action dated Jul. 20, 2006 from co-pending U.S. Appl. No. 11/228,672.
Office Action dated Jan. 22, 2007 from co-pending U.S. Appl. No. 11/228,672.
Notice of Allowance dated Jun. 12, 2007 from co-pending U.S. Appl. No. 11/228,672.
Notice of Allowance dated Dec. 19, 2007 from co-pending U.S. Appl. No. 11/228,672.
Office Action dated May 13, 2008 from co-pending U.S. Appl. No. 10/988,263.
Office Action dated Jan. 22, 2009 from co-pending U.S. Appl. No. 10/988,263.
Office Action dated Jul. 10, 2009 from co-pending U.S. Appl. No. 10/988,263.
Office Action dated Jan. 22, 2010 from co-pending U.S. Appl. No. 10/988,263.
Office Action dated May 28, 2008 from co-pending U.S. Appl. No. 11/095,834.
Office Action dated Oct. 16, 2008 from co-pending U.S. Appl. No. 11/095,834.
Office Action dated Jan. 28, 2009 from co-pending U.S. Appl. No. 11/095,834.
Office Action dated Sep. 11, 2009 from co-pending U.S. Appl. No. 11/095,834.
Office Action dated Feb. 6, 2008 from co-pending U.S. Appl. No. 11/054,194.
Office Action dated Jul. 21, 2008 from co-pending U.S. Appl. No. 11/054,194.
Office Action dated Jan. 9, 2009 from co-pending U.S. Appl. No. 11/054,194.
Office Action dated Apr. 29, 2008 from co-pending U.S. Appl. No. 11/228,773.
Office Action dated Sep. 9, 2008 from co-pending U.S. Appl. No. 11/228,773.
Office Action dated Dec. 30, 2008 from co-pending U.S. Appl. No. 11/228,773.
Office Action dated Jun. 15, 2009 from co-pending U.S. Appl. No. 11/228,773.
Office Action dated Sep. 21, 2009 from co-pending U.S. Appl. No. 11/228,773.
Notice of Allowance dated Mar. 8, 2010 from co-pending U.S. Appl. No. 11/228,773.
Co-pending U.S. Appl. No. 11/500,800, filed Aug. 8, 2006.
Office Action dated Jul. 8, 2009 in co-pending U.S. Appl. No. 11/500,800.
Notice of Allowance dated Mar. 15, 2010 in co-pending U.S. Appl. No. 11/500,800.
Office Action dated Apr. 29, 2008 in co-pending U.S. Appl. No. 11/228,733.
Office Action dated Sep. 9, 2008 in co-pending U.S. Appl. No. 11/228,733.

Office Action dated Dec. 31, 2008 in co-pending U.S. Appl. No. 11/228,733.
Office Action dated Jun. 19, 2009 in co-pending U.S. Appl. No. 11/228,733.
Office Action dated Oct. 14, 2009 in co-pending U.S. Appl. No. 11/228,733.
Notice of Allowance dated Apr. 2, 2010 in co-pending U.S. Appl. No. 11/228,733.
Office Action dated Sep. 29, 2008 in co-pending U.S. Appl. No. 11/500,862.
Office Action dated Apr. 2, 2009 in co-pending U.S. Appl. No. 11/500,862.
Office Action dated Feb. 5, 2010 in co-pending U.S. Appl. No. 11/500,862.
Notification of Transmittal of International Search Report and Written Opinion for PCT/US2006/034524, dated Nov. 22, 2006.
Office Action dated Feb. 20, 2009 in co-pending U.S. Appl. No. 11/524,056.
Co-pending U.S. Appl. No. 11/495,416, filed Jul. 28, 2006.
Notification of Transmittal of International Search Report and Written Opinion dated Dec. 28, 2007 for PCT/US2007/016092.
Office Action dated Apr. 14, 2009 in co-pending U.S. Appl. No. 11/495,416.
Office Action dated Oct. 21, 2009 in co-pending U.S. Appl. No. 11/495,416.
Co-pending U.S. Appl. No. 11/714,942, filed Mar. 7, 2007.
Office Action dated Jan. 5, 2009 in co-pending U.S. Appl. No. 11/714,942.
Office Action dated Jun. 3, 2009 in co-pending U.S. Appl. No. 11/714,942.
Notice of Allowance dated Oct. 28, 2009 in co-pending U.S. Appl. No. 11/714,942.
Notice of Allowance dated Dec. 15, 2009 in co-pending U.S. Appl. No. 11/714,942.
Co-pending U.S. Appl. No. 11/495,870, filed Jul. 28, 2006.
Office Action dated May 27, 2008 in co-pending U.S. Appl. No. 11/495,870.
Office Action dated Nov. 28, 2008 in co-pending U.S. Appl. No. 11/495,870.
Office Action dated Apr. 2, 2009 in co-pending U.S. Appl. No. 11/495,870.
Office Action dated Jun. 24, 2009 in co-pending U.S. Appl. No. 11/495,870.
Office Action dated Oct. 2, 2009 in co-pending U.S. Appl. No. 11/495,870.
Notice of Allowance dated Dec. 28, 2009 in co-pending U.S. Appl. No. 11/495,870.
Co-pending U.S. Appl. No. 11/511,719, filed Aug. 29, 2006.
Office Action dated Jun. 4, 2008 in U.S. Appl. No. 11/511,719.
Office Action dated Nov. 24, 2008 in U.S. Appl. No. 11/511,719.
Office Action dated Mar. 10, 2009 in U.S. Appl. No. 11/511,719.
Office Action dated Sep. 18, 2009 in U.S. Appl. No. 11/511,719.
Notice of Allowance dated Feb. 19, 2010 in U.S. Appl. No. 11/511,719.
Notice of Allowance dated Apr. 14, 2010 in U.S. Appl. No. 11/511,719.
Co-pending U.S. Appl. No. 11/711,345, filed Feb. 27, 2007.
Office Action dated Jun. 12, 2009 in co-pending U.S. Appl. No. 11/711,345.
Office Action dated Feb. 4, 2010 in co-pending U.S. Appl. No. 11/711,345.
Fred Billmeyer, Principles of Color Technology; 1981, p. 188, John Wiley and Sons, New York.
Love, Charles, Colored Iron Oxide Pigments, Natural, pp. 323-349, 1973, Wiley & Sons, Inc.
Tomita, K., "Studies on the formation of poly(ethylene Terephthalate: 6 Catalytic activity of metal compounds in polycondensation of bis(2-hydroxyethyl) Terephthalate;" Polymer, vol. 17, pp. 221-224 (1976).
Hovenkamp, S.G.; "Kinetic Aspects of Catalyzed Reactions in the Formation of Poly(ethylene Terephthalate);" Journal of Polymer Science: Part A-1, vol. 9, pp. 3617-3625 (1971).
The Merck Index, An Encyclopedia of Chemicals, Drugs, and Biologicals, Fourteenth Edition, p. 1628, Merck & Co. Inc., Whitehouse Station, New Jersey, 2006.

* cited by examiner

ALUMINUM/ALKALINE OR ALKALI/TITANIUM CONTAINING POLYESTERS HAVING IMPROVED REHEAT, COLOR AND CLARITY

1. FIELD OF THE INVENTION

The invention relates to polyester polymers having improved reheat rates, clarity, and color, and more particularly to polyester polymers catalyzed by aluminum and one or more of alkaline earth metal or alkali metals or compounds to which is added titanium atoms to increase the reheat rate and to neutralize the yellow hue of the polymer, without increasing the haziness of the polymer.

2. BACKGROUND OF THE INVENTION

There remains a continuing need for polyester resin compositions which have excellent color and clarity and also have improved reheat rates in the reheat blow-molding process. There are a variety of reasons why polyester resins, and polyethylene terephthalate (PET) in particular, suffer from poor color and clarity. First, the infrared absorbing compounds typically used to increase the resin's reheat rate, such as carbon black, antimony metal, black iron oxide, red iron oxide, inert iron compounds, spinel pigments, and infrared absorbing dyes, tend to have a negative effect on the visual appearance of PET containers by increasing the haze level and/or causing the article to have a dark appearance (i.e. a decreased L* value). Second, the antimony compounds that are typically used as polycondensation catalysts for PET tend to form insoluble antimony complexes which degrade the resin's color and clarity or are reduced to metallic form which impart a gray color. Third, catalysts that are used to prepare PET can also catalyze degradation reactions within the polymer, thus producing trace impurities which increase the yellowness of the polymer (i.e. a higher b* value).

The amount of absorbing compound that can be added to a polymer is limited by its impact on the visual properties of the polymer, such as brightness, which may be expressed as an L* value, and color, which is measured and expressed as an a* value, a b* value, and haze, as further described below.

To retain an acceptable level of brightness and color in the preform and resulting blown articles, the quantity of reheat additive may be decreased, which in turn decreases reheat rates. Thus, the type and amount of reheat additive added to a polyester resin may be adjusted to strike the desired balance between increasing the reheat rate and retaining acceptable brightness and color levels.

Due to aesthetic reasons, a blue tint is sometimes desired in polyester beverage containers, especially containers for water applications. Polymer articles with a blue tint tend to be more appealing to the human eye, and are thus generally preferred in these applications. Yellowness, which may be measured as a b* value in the CIE color system, may thus be a particularly undesirable color in consumer packaging, and bluing agents such as cobalt and organic toners have been used to increase the blue tint of consumer packaging, thus shifting the b* value from yellow to blue (or from higher to lower b* values), creating a more appealing package. It would be ideal to simultaneously increase the reheat rate and decrease the rate at which color and brightness degrade, such as by increased yellowness, as the concentration of the reheat additive in a thermoplastic composition is increased.

Highly active catalysts which improve the reaction rate are problematic because they also accelerate degradation reactions which impart yellowness. Titanium-based polycondensation catalysts are typically known to be highly active and to impart a yellow hue to the polymer. To control the yellow hue, polyester polymers are made using small amounts of titanium catalysts at low reaction temperatures. Even with such precautions, the yellow hue of the polymer is increased to some extent. Polyester resins catalyzed with lithium and aluminum catalysts are also highly active but normally impart a yellow hue to the polymer.

It would be desirable to provide a polyester resin having a low yellow hue or a more neutral b* color, low haze, with good reheat rates and made with highly active catalysts.

3. SUMMARY OF THE INVENTION

The polyester composition of the invention comprises polyester polymers and:
 a) aluminum atoms; and
 b) alkaline earth atoms or alkali metal atoms or alkali compound residues; and
 c) particles comprising titanium, zirconium, vanadium, niobium, hafnium, tantalum, chromium, tungsten, molybdenum, iron, or nickel atoms or combinations thereof, said particles improving the reheat rate of the polyester composition.

There is also provided a composition comprising polyester polymers obtained by adding particles comprising:
 (i) transition elemental metals,
 (ii) transition metal alloys,
 (iii) transition metal compounds of boron, carbon, or nitrogen, or
 (iv) combinations thereof,
to a melt phase process for manufacturing the polyester polymer or at any time thereafter, wherein the transition metals in the particles comprise titanium, zirconium, vanadium, niobium, hafnium, tantalum, chromium, tungsten, molybdenum, iron, or nickel atoms or combinations thereof, and wherein the polyester polymer is obtained by polycondensing a polyester polymer melt in the presence of aluminum atoms and at least one of alkaline earth metal atoms or alkali metal atoms or alkali compounds.

There is also provided a process for the manufacture of a polyester resin comprising polycondensing a polyester polymer melt in the presence of aluminum atoms and at least one of alkaline earth metal atoms or alkali metal atoms or alkali compounds, and before, during, or after polycondensation adding particles comprising titanium, zirconium, vanadium, niobium, hafnium, tantalum, chromium, tungsten, molybdenum, iron, or nickel atoms or combinations thereof.

The particles preferably comprise transition metal compounds containing the atoms of boron, carbon, and nitrogen; transition elemental metals, and transition metal alloys, wherein the transition atom comprises titanium, zirconium, vanadium, niobium, hafnium, tantalum, chromium, tungsten, molybdenum, iron, or nickel atoms or combinations thereof.

4. DETAILED DESCRIPTION OF THE INVENTION

The present invention may be understood more readily by reference to the following detailed description of the invention and to the examples provided. It is to be understood that this invention is not limited to the specific processes and conditions described, because specific processes and process conditions for processing plastic articles may vary. It is further understood that although the various embodiments may achieve one or more advantages, the claimed invention is not restricted to those advantages, nor need all the advantages be obtained in every instance.

As used in the specification and the claims, the singular forms "a," "an," "the", and "metal" include plural referents unless the context clearly dictates otherwise. For example, reference to processing a thermoplastic "preform," "container" or "bottle" is intended to include the processing of a plurality of thermoplastic preforms, articles, containers, or bottles. Processing at a temperature or using a catalyst is meant to include one or multiple temperatures or catalysts. A particle containing a metal includes a particle containing one or more metals.

By "comprising" or "containing" we mean that at least the named compound, element, particle, etc. must be present in the composition or article, but does not exclude the presence of other compounds, materials, particles, etc., even if the other such compounds, material, particles, etc. have the same function as what is named.

By "atoms" as used in conjunction with a transition metal is meant the transition metal atom occupying any oxidation state, any morphological state, any structural state, and any chemical state, whether as added to or as present in the polymer or composition of matter.

As used herein, a "$d_{50}$ particle size" is the median diameter, where 50% of the volume is composed of particles larger than the stated $d_{50}$ value, and 50% of the volume is composed of particles smaller than the stated $d_{50}$ value. As used herein, the median particle size is the same as the $d_{50}$ particle size.

The intrinsic viscosity (It.V.) values described throughout this description are set forth in dL/g unit as calculated from the inherent viscosity (Ih.V.) measured at 25° C. in 60/40 wt/wt phenol/tetrachloroethane. The inherent viscosity is calculated from the measured solution viscosity. The following equations describe these solution viscosity measurements, and subsequent calculations to Ih.V. and from Ih.V. to It.V:

$\eta_{inh} = [\ln(t_s/t_o)]/C$
where  $\eta_{inh}$ = Inherent viscosity at 25° C. at a polymer concentration of 0.5 g/100 mL of 60% phenol and 40% 1,1,2,2-tetrachloroethane by weight
ln = Natural logarithm
$t_s$ = Sample flow time through a capillary tube
$t_o$ = Solvent-blank flow time through a capillary tube
C = Concentration of polymer in grams per 100 mL of solvent (0.50%)

The intrinsic viscosity is the limiting value at infinite dilution of the specific viscosity of a polymer. It is defined by the following equation:

$\eta_{int} = \lim_{C \to 0} (\eta_{sp}/C) = \lim_{C \to 0} (\ln \eta_r)/C$
where  $\eta_{int}$ = Intrinsic viscosity
$\eta_r$ = Relative viscosity = $t_s/t_o$
$\eta_{sp}$ = Specific viscosity = $\eta_r - 1$ Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

Calibration Factor=Accepted $Ih.V.$ of Reference Material/Average of Triplicate Determinations The uncorrected inherent viscosity ($\eta_{inh}$) of each sample is calculated from the Viscotek Model Y501 Relative Viscometer using the following equation:

$\eta_{inh} = [\ln(P_2/KP_1)]/C$ where
$P_2$ = The pressure in capillary $P_2$
$P_1$ = The pressure in capillary $P_1$
ln = Natural logarithm
K = Viscosity constant obtained from baseline reading
C = Concentration of polymer in grams per 100 mL of solvent The corrected Ih.V., based on calibration with standard reference materials, is calculated as follows:

Corrected $Ih.V.$ = Calculated $Ih.V.$ × Calibration Factor

The intrinsic viscosity (It.V. or $\eta_{int}$) may be estimated using the Billmeyer equation as follows:

$\eta_{int} = 0.5[e^{0.5 \times Corrected\ Ih.V.} - 1] + (0.75 \times Corrected\ Ih.V.)$ Alternatively, the It.V. can be measured using the above solvents and concentrations measured according to ASTM D 5225-98 using a differential viscometer to measure IV.

When we say that the polyester compositions of the invention have reheat properties, we mean that the compositions containing the particle in question reheats faster (increased reheat rate), or with less reheat energy (increased reheat efficiency), or both, compared to the same polyester polymer composition absent the particle in question when exposed, for example, to similar infrared heating, or radiation. A convenient measure of the reheat rate is the Reheat Improvement Temperature (RIT) The RIT is determined by measuring the surface temperature of a sample with the reheat additive subtracted by the surface temperature of a sample targeted to the same composition except without a reheat additive after exposure to an energy source under the same conditions.

When we say that the polyester compositions of the invention have reduced yellowness, or that the titanium nitride particles act as a bluing agent, we mean that the resulting compositions appear to be less yellow, or more blue, or both, or that the b* value, as measured using the tristimulus CIE L*a*b* scale, as further described herein, is lower than it would be in the absence of the titanium nitride particles of the invention. For example, the b* value may be lowered by at least 1 unit, or at least 2 units, or at least 3 units.

When we say that the polyester compositions of the invention have UV-blocking effect, we mean that the compositions provide increased resistance of the contents to the effects of ultraviolet light. This phenomenon can be determined by visual inspection of contents such as dyes that degrade over time in the presence of UV light. Alternatively, the UV-blocking effect of the polyester compositions of the invention can be measured by UV-VIS measurements, such as by using a HP8453 Ultraviolet-Visible Diode Array Spectrometer, performed from a wavelength ranging from 200 nm to 460 nm, or the low end of visible light. An effective comparison measure using this equipment would be a reduction in the percent of UV transmission rate at 370 nm, the polyester compositions of the invention typically obtaining a reduction of at least 5%, or at least 10%, or at least 20% when compared with polyester compositions without the titanium nitride particles of the invention. For example, if the unmodified polymer exhibits a transmission rate of about 80%, and the modified polymer exhibits a transmission rate of about 60%, the reduction would be a reduction of 25%. Any other suitable measure of the ability of the polyester compositions to block a portion of the UV light incident upon the compositions may likewise be used. A suitable sample thickness, for purposes of approximating the thickness of a bottle side-wall, might be for example, about 0.012 inches thick, or from about 0.008 to about 0.020 inches thick.

The "polyester polymer" is any thermoplastic polyester polymer. Polyester thermoplastic polymers of the invention are distinguishable from liquid crystal polymers and thermosetting polymers in that thermoplastic polymers have no appreciable ordered structure while in the liquid (melt) phase, they can be remelted and reshaped into a molded article, and liquid crystal polymers and thermosetting polymers are unsuitable for the intended applications such as packaging or stretching in a mold to make a container.

The polyester polymer is desirably a random polymer such that the monomer units in the polymer chain are randomly arranged rather than arranged in a block fashion.

The polyester polymer may be PET, PEN, or copolymers or mixtures, thereof. A preferred polyester polymer is polyethylene terephthalate. As used herein, a polyalkylene terephthalate polymer or polyalkylene naphthalate polymer means a polymer having polyalkylene terephthalate units or polyalkylene naphthalate units in an amount of at least 60 mole % based on the total moles of units in the polymer, respectively. Thus, the polymer may contain ethylene terephthalate or naphthalate units in an amount of at least 85 mole %, or at least 90 mole %, or at least 92 mole %, or at least 96 mole %, as measured by the mole % of ingredients added to the reaction mixture. Thus, a polyethylene terephthalate polymer may comprise a copolyester of ethylene terephthalate units and other units derived from an alkylene glycol or aryl glycol with an aliphatic or aryl dicarboxylic acid.

While reference is made in certain instances to polyethylene terephthalate, it is to be understood that the polymer may also be a polyalkylene naphthalate polymer.

Polyethylene terephthalate can be manufactured by reacting a diacid or diester component comprising at least 60 mole % terephthalic acid or $C_1$-$C_4$ dialkylterephthalate, or at least 70 mole %, or at least 85 mole %, or at least 90 mole %, and for many applications at least 95 mole %, and a diol component comprising at least 60 mole % ethylene glycol, or at least 70 mole %, or at least 85 mole %, or at least 90 mole %, and for many applications, at least 95 mole %. It is preferable that the diacid component is terephthalic acid and the diol component is ethylene glycol. The mole percentage for all the diacid component(s) totals 100 mole %, and the mole percentage for all the diol component(s) totals 100 mole %.

The polyester pellet compositions may include admixtures of polyalkylene terephthalates, PEN, or mixtures thereof, along with other thermoplastic polymers, such as polycarbonates and polyamides. It is preferred in many instances that the polyester composition comprise a majority of a polyalkylene terephthalate polymers or PEN polymers, or in an amount of at least 80 wt. %, or at least 95 wt. %, based on the weight of polymers (excluding fillers, compounds, inorganic compounds or particles, fibers, impact modifiers, or other polymers which may form a discontinuous phase). In addition to units derived from terephthalic acid, the acid component of the present polyester may be modified with, or replaced by, units derived from one or more other dicarboxylic acids, such as aromatic dicarboxylic acids preferably having from 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid units useful for the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being preferable.

It should be understood that use of the corresponding acid anhydrides, esters, and acid chlorides of these acids is included in the term "dicarboxylic acid".

In addition to units derived from ethylene glycol, the diol component of the present polyester may be modified with, or replaced by, units from additional diols including cycloaliphatic diols preferably having 6 to 20 carbon atoms and aliphatic diols preferably having 2 to 20 carbon atoms. Examples of such diols include diethylene glycol (DEG); triethylene glycol (TEG); 1,4-cyclohexanedimethanol (CHDM); 1,3-propanediol; 1,4-butanediol; 1,5-pentanediol; 1,6-hexanediol; 3-methyl-2,4-pentanediol; 2-methyl-1,4-pentanediol; 2,2,4-trimethyl-1,3-pentanediol; 2-ethyl-1,3-hexanediol; 2,2-diethyl-1,3-propanediol; 1,2-hexanediol; 1,5-hexanediol; 1,6-hexanediol; 2,5-hexanediol; 1,3-hexanediol; 1,4-(2-hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

The polyester polymers can be modified with isophthalic acid, cyclohexanedicarboxylic acid, naphthalene-2,6-dicarboxylic acid, or combinations thereof, in an amount of greater than zero to 15 mole % or less, or 10 mole % or less, or 8 mole % or less. The diol component can be modified with diethylene glycol, 1,4-cyclohexanedimethanol, or combinations thereof in an amount of no more than 15 mole %, or no more than 10 mole %, or no more than 8 mole %, or no more than 5 mole %.

The polyester polymer desirably contains repeating alkylene aryl units, such as alkylene terephthalate or alkylene naphthalate repeat units in the polymer chain. More specific examples of these repeating units include ethylene terephthalate, ethylene naphthalate, and trimethylene terephthalate. More preferred are polyester polymers which comprise:
(i) a carboxylic acid component comprising at least 80, or at least 90, or at least 95 mole % of the residues of terephthalic acid, derivates of terephthalic acid, naphthalene-2,6-dicarboxylic acid, derivatives of naphthalene-2,6-dicarboxylic acid, or mixtures thereof, and
(ii) a hydroxyl component comprising at least 80, or at least 90, or at least 94 mole % of the residues of ethylene glycol or propane diol,
based on 100 mole percent of carboxylic acid component residues and 100 mole percent of hydroxyl component residues in the polyester polymer.

The polyester composition of the invention comprises polyester polymers and:
a) aluminum atoms; and
b) alkaline earth atoms or alkali metal atoms or alkali compound residues; and
c) particles comprising titanium, zirconium, vanadium, niobium, hafnium, tantalum, chromium, tungsten, molybdenum, iron, or nickel atoms or combinations thereof, said particles improving the reheat rate of the polyester composition.

There is also provided a composition comprising polyester polymers obtained by adding particles comprising:
(i) transition elemental metals,
(ii) transition metal alloys,
(iii) transition metal compounds of boron, carbon, or nitrogen, or
(iv) combinations thereof,
to a melt phase process for manufacturing the polyester polymer or at any time thereafter, wherein the transition metals in the particles comprise titanium, zirconium, vanadium, niobium, hafnium, tantalum, chromium, tungsten, molybdenum, iron, or nickel atoms or combinations thereof, and wherein the polyester polymer is obtained by polycondensing a polyester polymer melt in the presence of aluminum atoms and at least one of alkaline earth metal atoms or alkali metal atoms or alkali compounds.

The particles improve the reheat properties of the polyester compositions in which they are distributed. The reheat particles in the composition of the invention preferably comprise transition metal compounds containing the atoms of boron, carbon, and nitrogen; transition elemental metals, and transition metal alloys, wherein the transition atom comprises titanium, zirconium, vanadium, niobium, hafnium, tantalum, chromium, tungsten, molybdenum, iron, or nickel atoms or combinations thereof.

A particle as used throughout is broadly defined as a transition metal included in the group of titanium, zirconium, vanadium, niobium, hafnium, tantalum, chromium, tungsten, molybdenum, iron, and nickel, whose presence can be analytically detected, such as by elemental analysis (AA or ICP techniques) or x-ray fluorescence spectroscopy (XRF).

In a first embodiment, the particles provide polyester compositions that reheat faster (increased reheat rate), with less reheat energy (increased reheat efficiency), or to a higher temperature in a given time than would otherwise be achieved, compared to the same composition made in the absence of the particles. Such particles provide a useful distinction against particles having the same transition metal atom but which are in a state which do not provide a significant reheat rate improvement. Typically, titanium catalysts are not known to provide an improvement in reheat rates.

In a preferred embodiment, the particles also do not cause an increase the It.V. of a polymer melt during polycondensation by more than 0.10 dL/g, more preferably by more than 0.075 dL/g, or by more than 0.05 dL/g. In a most preferred embodiment, the particles do not cause any statistically significant increase in the It.V. of a polymer melt when added to the beginning of a polycondensation reaction for making the polyester polymer. A statistically significant increase in the It.V. of the polymer can be seen by an increase of 0.04 dL/g on two measurements per polymer sample (given a test std dev of 0.006, $\alpha=0.05$ and $\beta=0.90$).

In another embodiment, the particles present in the polyester polymer composition are the residues obtained from the addition of a transition elemental metal, alloys of transition metals, or the transition metal compounds of carbon, nitrogen, or boron atoms (e.g. the carbides, nitrides, or borides of the transition metals) to a melt phase polymerization process. These particles added to the melt phase process may or may not be catalytic, and are preferably not catalytic in that the It.V. of the polymer melt does not increase by more than 0.10 dL/g. An increase in It.V. of less than 0.04 dL/g on two measurements per polymer sample is not statistically significant (given a test standard deviation of 0.006, $\alpha=0.05$ and $\beta=0.90$)

The word "metal" as used throughout does not imply an oxidation state, and a metal may occupy any oxidation state. However, by "elemental" is meant that the transition metal occupies a zero oxidation state. At least a portion of one of the metals in an "alloy" likewise occupies a zero oxidation state. The amount and nature of the alloying material is not especially critical, so long as the alloy provides reheat capabilities to the polymer composition. Although the term "transition element" is traditionally defined to include elements 21 through 29, 39 through 47, 57 through 79, and all known elements from 89 on, the transition metals herein will be defined as those from the group of: titanium, zirconium, vanadium, niobium, hafnium, tantalum, chromium, tungsten, molybdenum, iron, or nickel atoms or combinations thereof. Preferred transition metals are titanium, tungsten, molybdenum, nickel and zirconium, and especially preferred is elemental titanium, titanium alloys, titanium compounds, and elemental nickel, tungsten, and molybdenum. Titanium and titanium alloys include those described in the "Titanium and Titanium Alloys" entry of Kirk-Othmer *Encyclopedia of Chemical Technology*, Vol. 24, 4th ed., (1997) pp. 186-224, incorporated herein by reference.

The particles useful according to the claimed invention may predominantly comprise, in terms of weight percent, the transition metal along with typical impurities. Preferably the cumulative molar quantity of one or more of the transition metals is over 50% based on the particle. Alloys that result in alpha-alloy, beta-alloy, or alpha-beta alloy mixtures are included. Thus, alloys useful according to the invention may be in the form of a single-phase alloy or a multiple phase alloy. Important $\alpha$-stabilizing alloying elements include, for example, aluminum, tin, and zirconium, and the interstitial alloying elements oxygen, nitrogen, and carbon. Important $\beta$-stabilizing alloying elements include vanadium, molybdenum, tantalum, and niobium (all $\beta$-isomorphous), and manganese, iron, chromium, cobalt, nickel, copper, and silicon (all $\beta$-eutectoid).

Further, the phase or phases present in the metallic titanium alloy particles according to the invention may be in the form of an amorphous phase, a solid solution phase, or an intermetallic compound phase solid solution, and may thus be distinguished from compositions comprised predominantly of transition metal compounds such as those in which the titanium has a higher oxidation state, although the alloys may, of course, include compounds of transition metals that result from the alloying process, again so long as the alloys substantially retain their metallic properties.

Alloys useful according to the invention thus include those in which one of the transition metals and one or more other metals or nonmetals or other transition metals are intimately mixed, such as when molten, so that they are fused together and dissolved with each other to form, at least in part, a solid solution. We do not mean, of course, to exclude alloys that have measurable amounts of carbides, nitrides, or oxides present, up to about 50 wt. %, so long as such alloys retain substantial metallic properties, and in any event, the transition metal present substantially retains its metallic properties, the presence of compounds in the alloy not with standing.

Metals that may be alloyed with the transition metals in amounts up 25%, or up to less than 50 wt. %, include any one of the transition metals in combination with each other, and/or one or more of aluminum, tin, manganese, germanium, iron, chromium, tungsten, molybdenum, cobalt, nickel, palladium, ruthenium, or copper, and especially aluminum, tin, or zirconium in combination with titanium. Aluminum, when present, may be in an amount up to about 7.5 wt. %, for example, or up to about 27 wt. %, or from about 0.5 wt. % to about 7.5 wt. %, or from about 0.5 wt. % to about 27 wt. %. Titanium alloys suitable for use according to the invention include those described in ASTM B265 "Titanium and Titanium Alloy Strip, Sheet, and Plate" incorporated herein by reference.

As an alloy, metals and non-metals that can be present in minor amounts, for example up to about 10 wt. %, or more, include one or more of: gold, silver, copper, carbon, oxygen, nitrogen, or silicon. Alloys are thus suitable for use according to the invention so long as such alloys comprise at least 20 wt. %, or at least 30 wt. %, or at least 50 wt. %, or at least 60 wt. %, or at least 90 wt. %, or at least 95 wt. % of one of the transition metals, especially titanium, as determined, for example, by elemental analysis.

There is also provided the transition metals compounded with carbon, nitrogen, or boron atoms. In these transition metal compounds, the relatively large transition metal atoms are thought to act as a host lattice, with the smaller non-metal atoms occupying interstices of the close-packed metal atoms. In contrast with ionic or covalent compounds, ideal stoichiometry is generally not found in these transition metal compounds. The composition of such compounds is a function of the geometrical packing arrangements, rather than valence bonding. These compounds are generally characterized by great hardness, high melting points, and chemical stability, and are typically metallic in their electrical, magnetic, and optical properties. However, the transition metal compounds of boron, nitrogen, and carbon also include the covalently bonded compounds. Some of the transition metal compounds useful according to the claimed invention are further described in "Transition Metal Carbide and Nitrides" by L. E. Toth, Academic Press, 1971, especially pp. 1-28, the relevant portions of which are incorporated herein by reference. The transition metal nitrides are also described in Kirk-Othmer Encyclopedia of Chemical Technology, Vol 17, 4th ed., (1996) pp. 108-127, and especially pp. 108-114, the relevant portions of which are incorporated herein by reference. The transition metal carbides are further described in Kirk-Othmer Encyclopedia of Chemical Technology, Vol 4, 4th ed., (1992) pp. 841-848, and especially pp. 844-847, the relevant portions of which are incorporated herein by reference. The transition metal borides are further described in Kirk-Othmer Encyclopedia of Chemical Technology, Vol 4, 4th ed., (1997) pp. 423-430, the relevant portions of which are incorporated herein by reference.

The transition metals of the invention can be and typically will be coated with a fine layer of metal oxide coating, and are useful according to the invention so long as the oxide coating does not substantially affect the ability of the particles to increase the reheat rate of the polymer compositions.

The particles containing the transition metals may be distinguished from non-metallic compounds added to a melt phase process, such as those in which the transition metals are present predominantly in a higher oxidation state, including titanium (II), titanium (III), and titanium (IV) compounds or complexes that are commonly used as catalysts and form ionic bonds. For example, titanium compounds which may be used as condensation catalysts, for example titanium alkoxides, are distinguishable from elemental metals, alloys, or the compound of carbon, nitrogen, and boron.

The transition metal compounds of the invention, given with their approximate empirical formulas, thus include the titanium nitrides (TiN, $Ti_2N$), the titanium borides (TiB, $TiB_2$, $Ti_2B$, $Ti_2B_5$), titanium carbide (TiC) the vanadium nitrides (VN, $V_2N$), the vanadium borides (VB, $VB_2$, $V_2B_3$, $V_3B_2$), the vanadium carbides (VC, $V_2C$), the zirconium nitrides (ZrN, $Zr_3N_4$), the zirconium borides (ZrB, $ZrB_2$, $ZrB_{12}$), zirconium carbide (ZrC), the niobium nitrides (NbN, $Nb_2N$, $Nb_4N_3$, $Nb_3N_6$, $Nb_4N_5$), the niobium borides (NbB, $NbB_2$), the niobium carbides (NbC, $Nb_2C$), the hafnium nitrides (HfN, $Hf_3N_2$, $Hf_4N_3$), the hafnium borides (HfB, $HfB_2$), hafnium carbide (HfC), the tantalum nitrides (TaN, $Ta_2N$, $Ta_3N_5$, $Ta_5N_6$, $Ta_4N_5$), the tantalum borides (TaB, $Ta_3B_4$, $Ta_3B_2$), the tantalum carbides (TaC, $Ta_2C$), the molybdenum nitrides (MoN, $MO_2N$), the molybdenum borides (MoB, $Mo_2B$, $MoB_2$, $Mo_2B_5$), the molybdenum carbides (MoC, $Mo_2C$), the tungsten nitrides (WN, $W_2N$), the tungsten borides (WB, $WB_2$, $W_2B$, $W_2B_5$), the tungsten carbides (WC, $W_2C$), the chromium nitrides (CrN, $Cr_2N$), the chromium borides (CrB, $CrB_2$, $Cr_5B_3$, $Cr_2B$, $Cr_3B_4$, $CrB_4$), the chromium carbides ($Cr_3C_2$, $Cr_7C_3$), the iron nitrides ($Fe_4N$, $Fe_2N$), the iron borides (FeB, $Fe_2B$), iron carbide ($Fe_3C$), the nickel nitrides (NiN, $Ni_4N$, $Ni_3N$, $Ni_3N_2$), the nickel borides (NiB, $Ni_2B$, $Ni_3B$, $Ni_4B_3$), and nickel carbide ($Ni_3C$).

In one embodiment, the transition metal compounds thus comprise one or more of the titanium nitrides. Titanium nitride is commonly considered to be a compound of titanium and nitrogen in which there is approximately a one-to-one correspondence between titanium atoms and nitrogen atoms. However, it is known in the art of metallurgy that titanium nitride, having a cubic NaCl structure, is stable over a wide range of anion or cation deficiencies, for example in relative amounts from about $TiN_{0.42}$ to about $TiN_{1.16}$, all of which compounds are intended to fall within the scope of the invention. In a titanium nitride embodiment, the particles predominantly comprise titanium nitride, by weight, and the remainder of the particles may well be elemental titanium, or titanium with small amounts of nitrogen dissolved, such that the average amount of nitrogen in the particles may, by weight, be even lower than that stated in the empirical formulas.

Titanium nitride particles may be used to obtain one or more of the following advantages: to improve the reheat properties of the polyester compositions in which they are distributed; as a bluing agent to increase the blue tint of the polyester compositions in which they are distributed; or to improve the UV-blocking properties of the polyester compositions in which they are distributed. Of course, the polyester compositions of the invention may have additional advantages beyond those just given, and the invention is intended to encompass such additional advantages as well.

In another embodiment, the transition metal compounds comprise one or more of the titanium borides. The most common phase of titanium boride is $TiB_2$, which is a gray crystalline solid with a hexagonal crystal structure. However, titanium boride is stable over a range of anion or cation deficiencies, all of which compounds are intended to fall within the scope of the invention. Indeed, so long as the particles according to the invention predominantly comprise titanium boride, by weight, the remainder of the particles may well be elemental titanium, or titanium with small amounts of boron dissolved, such that the average amount of boron in the particles may, by weight, be even lower than that stated in the empirical formulas.

Similarly, the transition metal compounds useful according to the invention may comprise titanium carbide, which is known to have a face-centered-cubic (fcc), NaCl crystal structure wherein the carbon atoms occupy the octahedral interstices of the titanium atom lattice. There can be vacancies in the interstitial sites, and systems with stoichiometries of $TiC_{1.0}$ to $TiC_{0.47}$ are stable. Again, as with all the transition metal compounds useful according to the invention, so long as the particles according to the invention predominantly comprise the transition metal compound by weight, the remainder of the particles may well be the elemental transition metal, with small amounts of the non-metal dissolved such that the average amount of the non-metal in the particles may, by weight, be even lower than that given in the empirical formulas.

Titanium nitride may have relative amounts of titanium, carbon, and nitrogen within a wide range. The titanium nitride can correspond to the formula $Ti_aC_xN_y$, wherein a ranges from 1-2, x ranges from 0.0 to 0.8, and y ranges from 0.1 to 1.0. Relative stoichiometries between carbon and nitrogen range from about $TiC_{0.5}N_{0.5}$ to about $TiC_{0.8}N_{0.2}$, or to about $TiC_{0.7}N_{0.3}$. Titanium nitride compounds useful according to the claimed invention are further described in Kirk-Othmer *Encyclopedia of Chemical Technology*, Vol 24, 4th ed., (1997) pp. 225-349, and especially pp. 231-232, the relevant portions of which are incorporated herein by reference.

Titanium nitride, titanium carbide, and titanium boride compounds are further described in Kirk-Othmer *Encyclopedia of Chemical Technology*, Vol 24, 4th ed., (1997) pp. 225-231, the relevant portions of which are incorporated herein by reference.

In yet a further embodiment, the transition metal is vanadium. Vanadium is also capable of taking atoms of the non-metals carbon, nitrogen, and boride atoms into its metal lattice structure, to thereby form transition metal compounds of the invention. Not all possible vacant lattice sites need be filled, so that sub-stoichiometric species are possible. For example, the nitrogen content in vanadium nitride can range from $VN_{0.71}$. to $VN_{1.00}$. In vanadium boride, the interstitial boron atoms are linked in a layer of hexagons. Vanadium nitride compounds according to the claimed invention are described in Kirk-Othmer *Encyclopedia of Chemical Technology*, Vol 24, 4th ed., (1997) p. 801, incorporated herein by reference. Particles of the vanadium compounds may likewise contain amounts of elemental vanadium, as well as the free non-metal, as already described.

Likewise, the elemental metals, alloys, and nitrides, carbides, and borides of zirconium, molybdenum, tungsten, chromium, iron, nickel and tantalum are useful according to the invention, and may also exhibit a range of stoichiometries, depending on the number of interstitial vacancies that are filled with the non-metal nitrogen, carbon, or boron atoms. The properties and composition of zirconium, its alloys, and its nitrides, carbides and borides useful in the invention are further described in Kirk-Othmer *Encyclopedia of Chemical Technology*, Vol 25, 4th ed., (1998) pp. 872-873, incorporated herein by reference. Tantalum, its alloys, and its compounds useful in the invention are further described in Kirk-Othmer *Encyclopedia of Chemical Technology*, Vol 23, 4th ed., (1997) p. 676, incorporated herein by reference. The properties and composition of chromium, its alloys, and its nitrides, carbides and borides useful in the invention are further described in Kirk-Othmer *Encyclopedia of Chemical Technology*, Vol 6, 4th ed., (1998) pp. 228-311, incorporated herein by reference. The properties and composition of tungsten, its alloys, and its nitrides, carbides and borides useful in the invention are further described in Kirk-Othmer *Encyclopedia of Chemical Technology*, Vol 24, 4th ed., (1998) pp. 573-601, incorporated herein by reference. The properties and composition of molybdenum, its alloys, and its nitrides, carbides and borides useful in the invention are further described in Kirk-Othmer *Encyclopedia of Chemical Technology*, Vol 25, 4th ed., (1998) pp. 925-962, incorporated herein by reference. The properties of iron, its alloys, and its nitrides, carbides and borides useful in the invention are further described in Kirk-Othmer *Encyclopedia of Chemical Technology*, Vol 14, 4th ed., (1998) pp. 829-902, incorporated herein by reference. The properties and composition of nickel, its alloys, and its nitrides, carbides and borides useful in the invention are further described in Kirk-Othmer *Encyclopedia of Chemical Technology*, Vol 17, 4th ed., (1998) pp. 1-42, incorporated herein by reference.

In yet further embodiments, the transition metal may be niobium or hafnium. These transition metals are also capable of taking atoms of the non-metals carbon, nitrogen, and boride into their metal lattice structures, to thereby form the transition metal compounds of the invention. Not all possible vacant lattice sites need be filled, so that sub-stoichiometric species are possible. The properties and composition of niobium, its alloys, and its nitrides, carbides and borides useful in the invention are further described in Kirk-Othmer *Encyclopedia of Chemical Technology*, Vol 17, 4th ed., (1998) pp. 43-67, incorporated herein by reference. The properties and composition of hafnium, its alloys, and its nitrides, carbides and borides useful in the invention are further described in Kirk-Othmer *Encyclopedia of Chemical Technology*, Vol 12, 4th ed., (1998) pp. 863-881, incorporated herein by reference.

The particles of transition metal compounds useful according to the claimed invention may comprise significant amounts of an oxide coating, so long as the transition metal compound particles are comprised predominantly of the transition metal compound itself, and so long as the total amount of transition metal compound is at least 50 wt. %, for example, or at least 60 wt %, or at least 75 wt. %.

Particles useful according to the invention for the improvement of reheat and color in polyester compositions include those having a range of particle sizes and particle size distributions, although we have found certain particle sizes and relatively narrow particle size distributions to be especially suitable in certain applications. For example, in some embodiments, especially those in which the polyester comprises PET, the reheat particles having a median particle size of about 0.05 microns (μm), and a relatively narrow particle size distribution, are advantageous.

The particles according to the claimed invention may include one or more other metals or impurities not identified herein, such as tin, manganese, germanium, palladium, ruthenium, cobalt, copper, gold, silver, silicon, and hydrogen, as well as oxygen.

Preferably, the particles of the invention comprise at cumulative amount of at least 50 wt. % of the transition metal, or at least 75 wt. % of the transition metal, or at least 90 wt. % of the transition metal, or at least 95 wt. % of the transition metal, based on the amount of the metals present in the particle.

The particles also may be coated with a fine layer of an oxide coating. The particles may likewise be hollow spheres of the transition metal compound or spheres coated with the transition metal compound, in which the core may be comprised of the transition metal, of mixtures of the transition metal with other materials, or of other materials in the substantial absence of the transition metal compound. The thickness of the coating may be from about 0.005 μm to about 10 μm, or from 0.01 μm to 5 μm, or from 0.10 μm to 0.5 μm. Such coatings may also comprise small amounts of other materials, as already described.

The amount of the particles present in the polyester compositions according to the invention may vary within a wide range, for example from about 0.5 ppm to about 1,000 ppm, or from 1 ppm to 750 ppm, or from 5 ppm to 500 ppm, or from 5 ppm to 250 ppm. The particles may thus be present, for example, in an amount of at least 0.5 ppm, or at least 1 ppm, or at least 5 ppm, up to about 1,000 ppm, or up to about 750 ppm, or up to about 500 ppm, or up to about 250 ppm. Thermoplastic concentrates according to the invention may, of course, have amounts greater than these, as further described elsewhere herein.

We note that particles of the various metal compounds useful according to the invention may be produced by various powder metallurgy techniques, such as those described for nitrides and carbides in "Transition Metal Carbides and Nitrides" by L. E. Toth, Academic Press, 1971, p. 12, and for borides in Kirk-Othmer *Encyclopedia of Chemical Technology*, Vol 4, 4th ed., (1992) p. 426, the relevant portions of each of which are incorporated herein by reference. The metal compound particles according to the invention may thus be produced by any known means, without limitation.

In the case of nitrides, the methods include, but are not limited to, the following: (1) nitriding the metal powder or metal hydride with nitrogen or ammonia, (2) nitriding metal oxide powders in the presence of carbon, (3) reaction of metal chlorides with ammonia, and (4) precipitation from the gas phase by reacting the metal halide in a nitrogen/hydrogen atmosphere.

In the case of carbides, the methods include, but are not limited to, the following: (1) direct reaction of the metal powder or metal hydride with carbon in a protected atmosphere or vacuum, (2) direct reaction of the metal oxide and excess carbon in a protective or reducing atmosphere, (3) reaction of the metal with a carburizing gas, and (4) precipitation from the gas phase by reacting the metal halide or metal carbonyl in hydrogen.

In the case of borides, methods include direct combination of boron with the elements at temperatures in the range of 1,100-2,000° C., or by vapor-phase reaction or electrolysis.

The shapes of the particles which can be used in this invention include, but are not limited to, the following: acicular powder, angular powder, dendritic powder, equi-axed powder, flake powder, fragmented powder, granular powder, irregular powder, nodular powder, platelet powder, porous powder, rounded powder, and spherical powder. The particles may be of a filamentary structure, where the individual particles may be loose aggregates of smaller particles attached to form a bead or chain-like structure. The overall size of the particles may be variable, due to a variation in chain length and degree of branching.

The size of the particles may vary within a broad range depending on the method of production, and the numerical values for the particle sizes may vary according to the shape of the particles and the method of measurement. Particle sizes useful according to the invention may be from about 0.001 µm to about 100 µm, or from 0.01 µm to 45 µm, or from 0.01 µm to 10 µm, or from 0.01 µm to 5 µm. When the polyester composition comprises PET, we expect that particle sizes from 0.01 µm to 5 µm would be especially suitable.

The particles useful according to the invention, which have a mean particle size suitable for the invention, may have irregular shapes and form chain-like structures, although roughly spherical particles may be preferred. The particle size and particle size distribution may be measured by methods such as those described in the Size Measurement of Particles entry of Kirk-Othmer *Encyclopedia of Chemical Technology*, Vol. 22, 4th ed., (1997) pp. 256-278, incorporated herein by reference. For example, particle size and particle size distributions may be determined using a Fisher Subsieve Sizer or a Microtrac Particle-Size Analyzer manufactured by Leeds and Northrop Company, or by microscopic techniques, such as scanning electron microscopy or transmission electron microscopy.

A range of particle size distributions may be useful according to the invention. The particle size distribution, as used herein, may be expressed by "span (S)," where S is calculated by the following equation:

$$S = \frac{d_{90} - d_{10}}{d_{50}}$$

where $d_{90}$ represents a particle size in which 90% of the volume is composed of particles smaller than the stated $d_{90}$; and $d_{10}$ represents a particle size in which 10% of the volume is composed of particles smaller than the stated $d_{10}$; and $d_{50}$ represents a particle size in which 50% of the volume is composed of particles larger than the stated $d_{50}$ value, and 50% of the volume is composed of particles smaller than the stated $d_{50}$ value.

Thus, particle size distributions in which the span (S) is from 0 to 50, or from 0 to 5, or from 0.01 to 2, for example, may be used according to the invention.

Particularly preferred are titanium nitride particles. Titanium nitride containing particles have the capability of improving reheat rates, color, UV-blocking, or a combination of two or three of these properties in polyester compositions. We have found certain particle sizes and relatively narrow particle size distributions to be especially suitable in certain applications. For example, in some embodiments, especially those in which the polyester comprises PET, titanium nitride particles having a median particle size of about 0.005 µm to about 0.3 µm (microns), or about 0.015 µm to about 0.25 µm, and a relatively narrow particle size distribution, are especially advantageous as both bluing agents and reheat additives. Again, not wishing to be bound by any theory, we think it likely that the effect of the particles which are effective as bluing agents is due to the unique absorptive properties of such particles, especially with sizes in the range from about 5 nm to about 60 nm. The absorbance of the additive in the range of 360 to 500 nm is less than the absorbance in the range of 500 to 700 nm, which consequently produces a shift toward blue appearance of the polyester (the magnitude of which depends on the concentration of the additive and the yellowness of the polymer in the absence of the additive). We note that larger, micron-scale particles provide much less of a bluing effect than do the submicron or nanometer-scale particles just described.

The purity of the particles having a stated chemical composition preferably comprise at least 50 wt. %, or at least 75 wt. %, or at least 90 wt., or at least 95 wt. % purity in regard to the stated composition.

In a preferred embodiment, the particle loading in the polyester composition ranges from about 1 ppm to about 20 ppm, or from 4 to about 15 ppm, or from 4 to about 10 ppm based on the metal atom relative to the weight of the polyester polymer. When a bluing effect is desired in the case of titanium nitride, amounts ranging from about 5 ppm to about 50 ppm are suitable. When significant UV-blocking protection is desired, such as in juice containers, the loading ranges from 1 ppm up to about 100 ppm, or even greater, when used as the primary or sole UV-blocking agent. Thermoplastic concentrates according to the invention may, of course, have amounts much greater than these, as further described elsewhere herein.

When UV-blocking effects are desired, the particles may be combined with one or more known UV absorbers. When used in combination with known UV absorbers, the need for conventional UV absorbers might thereby be reduced. Also, because known UV absorbers tend to yellow the polymers in which they are used, the bluing effect of titanium nitride particles would be an added benefit when used in combination with such UV absorbers, resulting in less need of additional bluing agents.

A known disadvantage of some conventional reheat additives in the art is their instability in the PET manufacturing process. For example, antimony metal reheat additive is known to undergo oxidation to antimony oxide (which is ineffective at increasing reheat rate) if exposed to oxygen during the melt-phase or solid-stating manufacturing processes of making PET. In addition, antimony can be oxidized in the injection molding process used to make preforms. Due to the properties of the metal compounds, the polyester compositions of this invention would not be expected to suffer from the problem of oxidation in the presence of oxygen leaks during the manufacturing and molding processes. Thus, we expect that the reheat rate will tend to be less variable with the described particles, and fewer adjustments will needed to be made to the reheat lamp settings during the reheat blow molding process.

The point at which the particles are incorporated into the polyester composition is not limited. The particles can be added to the polymer reactant system, during or after polymerization, to the polymer melt, or to the molding powder or pellets or molten polyester in subsequent melt processing zone for making an article. They may be added at locations including, but not limited to, proximate the inlet to an esterification reactor, proximate the outlet of an esterification reactor, at a point between the inlet and the outlet of an esterification reactor, anywhere along a recirculation loop, proximate the inlet of a first or only polycondensation reactor, proximate the outlet to a first polycondensation reactor, at a point between the inlet and the outlet of a first polycondensation reactor, proximate the inlet to a second polycondensation reactor typically used for finishing the polycondensation reaction, or at a point between the inlet and the outlet of a second polycondensation reactor, or at a point between the outlet of a polycondensation reactor and a die for forming pellets, sheets, fibers, bottle preforms, or the like. Preferably, the particles are added after substantial completion of esterification, or after at least 90% conversion of terephthalic acid or its ester derivatives (DMT), or between esterification and the commencement of polycondensation, or at any point thereafter, such as when the It.V. of the monomer is at least 0.1 dL/g, or at least 0.2 dL/g, or at least 0.45 dL/g, or at least 0.50 dL/g, or at a point proximate to the outlet of the final polycondensation reactor and any point thereafter up to the a die for solidifying the polyester melt.

If the particles are susceptible to dissolution in hot ethylene glycol, such as the case with titanium metal particles and titanium nitride, the particles are preferably added after the completion of the esterification step because at that point the free ethylene glycol content is sufficiently low to prevent the dissolution of the particles.

The way in which the particles are added is also not limited. The particles may be added to a polyester polymer, such as PET, and fed to an injection molding machine by any method, including feeding the particles to the molten polymer in the injection molding machine, or by combining the particles with a feed of PET to the injection molding machine, either by melt blending or by dry blending pellets. The particles may be supplied neat, or in a concentrate form in a polymer such as PET, or as a dispersion in a liquid or solid carrier. Examples of suitable carriers include but are not limited to polyethylene glycol of various molecular weights provided as a liquid or a solid, mineral oil, hydrogenated castor oil, glycerol monostearate, fatty acid esters, ethoxylated fatty acid esters, paraffin oils, polyvalent alcohols, polyvalent amines, silicone oil, hydrogenated ricinus oil, stearic acid esters of pentaerythritol, and soybean oil.

The particles may be added to an esterification reactor, such as with and through the ethylene glycol feed to a prepolymer reactor, to a polycondensation reactor, or to solid pellets in a reactor for solid stating, or at any point in-between any of these stages. In each of these cases, the particles may be combined with PET or its precursors neat, as a concentrate containing PET, or diluted with a carrier. The carrier may be reactive to PET or may be non-reactive. The particles, whether neat or in a concentrate or in a carrier, and the bulk polyester, may be dried prior to mixing together. These particles may be dried in an atmosphere of dried air or other inert gas, such as nitrogen, and if desired, under sub-atmospheric pressure.

As noted above, the particles may be added to a melt phase process or thereafter in any form, such as from a solid concentrate containing high levels of particles. The concentrates may be let down or combined along with the polyester polymer into the melt phase process, or into an extruder or other suitable melt processing zone in amounts sufficient to provide a final polyester composition and ultimately an article such as a preform or bottle having particles in an amount ranging from 0.5 ppm to 1000 ppm. Thus, a solid concentrate is provided comprising a polyester polymer having dispersed therein the reheat particles in an amount ranging from greater than 1000 ppm (0.1 wt. %), or at least 2000 ppm (0.2 wt. %), or at least 4000 ppm (0.4 wt. %), or at least 1 wt. %, or at least 1.5 wt. %, or at least 2 wt. %, and up to about 10 wt. %, or up to about 5 wt. %. Preferably, the It.V. of the polyester in the concentrate is similar to the It.V. of the polyester composition to which the concentrate is added. For example, the It.V. match is within about +/−0.2, or +/−0.1, or +/−0.07, or +/−0.05. Further, the polyester polymer in the concentrate preferably is the same type of polymer as the bulk polyester polymer.

The concentrate may be made by mixing particles with a polymer such as a polycarbonate, a polyester, a polyolefin, or mixtures of these, in a single or twin-screw extruder, and optionally compounding with other reheat additives. A suitable polycarbonate is bisphenol A polycarbonate. Suitable polyolefins include, but are not limited to, polyethylene and polypropylene, and copolymers thereof. Melt temperatures should be at least as high as the melting point of the polymer. For a polyester such as PET the melt temperatures are typically in the range of 250°-310° C. Preferably, the melt compounding temperature is maintained as low as possible. The extrudate may be withdrawn in any form, such as a strand form, and recovered according to the usual way such as cutting.

The concentrate may be prepared in a similar polyester as used in the final article. However, in some cases it may be advantageous to use another polymer in the concentrate, such as a polyolefin. In the case where a polyolefin/particle concentrate is blended with the polyester, the polyolefin can be incorporated as a nucleator additive for the bulk polyester.

Instead of a concentrate, the particles may be added in a liquid carrier as a slurry or dispersion in the same concentration as stated with respect to the solid concentrate.

The location of the reheat particles within the polyester compositions is not limited. The particles may be disposed anywhere on or within the polyester polymer, pellet, preform, or bottle. Preferably, the polyester polymer in the form of a pellet forms a continuous phase. By being distributed "within" the continuous phase we mean that the particles are found at least within a portion of a cross-sectional cut of the pellet. The particles may be distributed within the polyester polymer randomly, distributed within discrete regions, or distributed only within a portion of the polymer. In a preferred embodiment, the particles are disposed randomly throughout the polyester polymer composition as by way of adding the particles to a melt, or by mixing the particles with a solid polyester composition followed by melting and mixing.

The particles may be added in an amount so as to achieve a twenty-ounce bottle preform RIT of at least 3° C., or at least 5° C., or at least 10° C., while maintaining acceptable preform color/appearance properties.

In another embodiment, there is provided a bottle preform made from the polyester composition of the invention having a final reheat temperature of at least 105° C., or at least 110° C., or at least 115° C., or at least 120° C. and up to about 130° C. The final reheat temperature with respect to preform samples is defined as the surface temperature of the preform after it has passed through the bank of quartz infrared heaters in a stretch blow molding machine.

The polyester compositions of the present invention may be used to form preforms used for preparing packaging containers. The preform is typically heated above the glass transition temperature of the polymer composition by passing the preform through a bank of quartz infrared heating lamps, positioning the preform in a bottle mold, and then blowing pressurized air through the open end of the mold.

The invention provides processes for making polyester preforms or injection-molded bottles that comprise feeding a liquid or solid bulk polyester and a liquid, molten or solid polyester concentrate composition to a machine for manufacturing the preform or bottle, the concentrate being as described above. According to the invention, not only may the concentrate be added at the stage for making preforms or injection-molded bottles, but in other embodiments, there are provided processes for the manufacture of polyester compositions that comprise adding a concentrate polyester composition to a melt phase for the manufacture of virgin polyester polymers, the concentrate comprising particles and at least 65 wt. % of a polyester polymer. Alternatively, the particles may be added to recycled PET to form the concentrate.

In each of the described embodiments, there are also provided a composition comprising polyester polymers obtained by adding particles comprising:
(i) transition elemental metals,
(ii) transition metal alloys,
(iii) transition metal compounds of boron, carbon, or nitrogen, or
(iv) combinations thereof,
to a melt phase process for manufacturing the polyester polymer or at any time thereafter, wherein the transition metals in the particles comprise titanium, zirconium, vanadium, niobium, hafnium, tantalum, chromium, tungsten, molybdenum, iron, or nickel atoms or combinations thereof, and wherein the polyester polymer is obtained by polycondensing a polyester polymer melt in the presence of aluminum atoms and at least one of alkaline earth metal atoms or alkali metal atoms or alkali compounds.

In addition, there is also provided a process for the manufacture of a polyester resin comprising polycondensing a polyester polymer melt in the presence of aluminum atoms and at least one of alkaline earth metal atoms or alkali metal atoms or alkali compounds, and before, during, or after polycondensation adding particles comprising titanium, zirconium, vanadium, niobium, hafnium, tantalum, chromium, tungsten, molybdenum, iron, or nickel atoms or combinations thereof.

In each of the compositions and processes, aluminum atoms and an alkaline earth metal or alkali is present.

The aluminum atom is present in the polyester polymer, and its oxidation, morphological, structural, or chemical state is not limited. Suitable detection methods for the presence of aluminum include inductively coupled plasma emission spectroscopy (ICP-OES) or atomic absorption spectroscopy.

Aluminum may be added to the melt phase process as a compound (which includes a salt or a complex), or as a metal provided that it is ultimately active as a catalyst in the polycondensation phase either alone or in combination with the alkali metal or alkaline earth metal atoms or compounds. It is desirable to select an aluminum compound which can be dissolved in a diluent or a carrier reactive with the polyester forming ingredients. Aluminum oxides are not included within the meaning of an aluminum compound or metal because they are insoluble and have little if any catalytic activity in the polymer melt. Suitable liquid reactive carriers can have any molecular weight, such as those ranging from 62 to about 10,000 grams per mole. Aluminum compounds can also be added as slurries or suspensions in a liquid that is volatile and/or reactive with the polyester forming ingredients. Aluminum can also be added to the melt phase process by melt blending the aluminum compound with a polyester polymer in a suitable extruder or other device to form a concentrate, and subsequently melting the concentrate as a molten feed to the melt phase process.

Preferred aluminum compounds include aluminum compounds with at least one organic substituent. Illustrative examples of suitable compounds include those of the formula:

$$Al[OR]_a[OR']_b[OR'']_c[R''']_d$$

wherein R, R', R'' are independently an alkyl group, aryl group, acyl group, hydrogen, R''' is an anionic group, and a, b, c, d are independently 0 or positive integers, and a+b+c+d is no greater than 4.

Suitable examples of aluminum compounds include the carboxylic acid salts of aluminum such as aluminum acetate, aluminum benzoate, aluminum lactate, aluminum laurate, aluminum stearate, aluminum alcoholates such as aluminum ethylate, aluminum isopropylate, aluminum tri n-buryrate, mono-sec-butyrate, aluminum tri-tert-butyrate, mono-sec-butyoxyaluminum diisoprpylate, and aluminum chelates in which the alkoxy group of an aluminum alcoholate is partially or wholly substituted by a chelating agents such as an alkyl acetoacetate or acetylacetone such as ethyl acetoaacetate aluminum diisopropylate, aluminum tris(ethyl acetate), alkyl acetoacetate aluminum diisopropylate, aluminum monoacetylacetate bis(ethyl acetoacetate), aluminum(tris (acetyl acetate), aluminum acetylacetonate.

Preferred among the aluminum compounds are the basic carboxylic acid salts of aluminum and aluminum alcoholates, Basic carboxylic acid salts of aluminum include monobasic and dibasic compounds. The basic aluminum acetate used can be either the diacetate monohydroxy compound or the monoacetate dihydroxy compound or a mixture thereof. In particular, basic aluminum acetate and aluminum isoproxide are preferred aluminum compounds. Stabilizing basic aluminum acetate with boric acid increases its solubility; however, stabilization increases cost. Aluminum isopropoxide is preferred on a cost basis.

The amount of aluminum needed to effect polycondensation generally ranges from at least 3 ppm, or at least 5 ppm, or at least 10 ppm, or at least 15 ppm, or at least 20 ppm, or at least 30 ppm, and up to about 150 ppm, or up to about 100 ppm, or up to about 75 ppm, or up to about 60 ppm, Al based on the weight of the polymer.

An alkaline earth metal residue or alkali residue is the alkali or alkaline earth atoms present in the polyester polymer, or if an alkali compound is used, then the residual remainder of the alkali compound present within the polymer melt or the finished polymer or article. Their oxidation states or ultimate physical, morphological, structural, or chemical states are not limited. The word "alkali" or "alkaline earth metal" or "metal" includes the atom in its elemental state or in an oxidation state corresponding to its allowable valences in its Periodic group. The chemical state of the alkali upon addition is also not limited. The alkali may be added as a metal compound, organometallic compound, or as a compound without a metal. Likewise, the chemical state of the alkaline earth compound upon addition is not limited.

The alkali metals and alkaline earth metals include the metals in Group IA and Group IIA of the periodic table, including but not limited to Li, Na, K, Rb, Cs, Mg, Ca, Sr, and preferably Li, Na or K. If rapid rates are the primary concern, Li is most preferred. If color is the primary concern, Na is most preferred. The metals may be added to the melt phase as metal compounds (which includes a complex or a salt) having counterions, among which the preferred ones are hydroxides, carbonates, and carboxylic acids.

Other suitable alkali compounds are those mentioned in U.S. Pat. No. 6,156,867, the disclosure of which is fully incorporated herein by reference. They include the tertiary amine compounds and the quaternary ammonium compounds.

The amount of alkaline earth metal or alkali is effective to increase the molecular weight of the polymer melt at a reasonable rate The amount generally ranges from at least about 4 ppm, or at least 6 ppm, or at least 10 ppm, or at least 15 ppm, or at least 20 ppm, or at least 25 ppm, or at least 50 ppm, or at least 75 ppm, and up to about 400 ppm, or up to about 300, or up to 250 ppm or up to 150 ppm, or up to about 100 ppm, or up to about 75 ppm, based on the weight of the polymer. The particular amount used by weight will vary by the type of alkali or alkaline earth metal used, since their atomic or molecular weights vary widely, and the amount of aluminum employed. Increasing the aluminum level increases the rate; therefore, low M:Al molar ratios (MR) may give a reasonable rate with moderate to high aluminum levels while giving slow rates at low aluminum levels. The molar ratio of the alkaline earth metal or alkali:aluminum (M:Al MR) is desirably 0.5 to 6, or 1 to 5, or 2 to 4. The amount of the alkaline earth metal or alkali metal is determined by the aluminum level and the M:Al MR selected. The particular amount used by weight will vary by the aluminum and M:Al MR targets and the type of alkali metal or alkaline earth metal used, since their atomic or molecular weights vary widely. The preferred range of M:Al MR is 2 to 6, and the most preferred range is 2 to 4.

High catalyst loadings may impact the solubility of the catalysts, which in turn may increase the haze level of the polymer. However, an advantageous feature of one embodiment of the invention lies in that the late addition of a deactivator such as a phosphorus compound reduces the haze level even at high catalyst loadings. Therefore, there is also provided a polyester composition containing phosphorus atoms and a metal content of at least 60 ppm, or at least 70 ppm, or at least 80 ppm, or at least 90 ppm, based on the cumulative weight of aluminum, alkaline earth metals and alkali metals, based on the weight of the polyester polymer. The amount of phosphorus is desirably at a mole ratio of P:M (all metals of aluminum and alkaline earth metals and alkali metals) within a range of 0.5:1 to 5:1. Typical amounts of phosphorus atoms will be at least 70 ppm, or at least 100 ppm, or at least 150 ppm. The solution haze values of these polymers at high catalyst loadings can be as low as 30 ntu or less, or 20 ntu or less, or 15 ntu or less, or 10 ntu or less. The relative reduction of haze by addition of phosphorus is as large as 40% or more, or 50% or more, or 60% or more, relative to the same polymer made without phosphorus.

The molar ratio of the alkaline earth metal or alkali:aluminum is desirably 0.5 to 6, or 1 to 5, or 2 to 5.

The various ways in which aluminum, the alkaline earth metal or alkali can be added, their order of addition, and their points of addition are further described below.

The aluminum and alkali or alkaline earth metals may be added as a solution, fine dispersion, a paste, a slurry, or neat. They are preferably added as a liquid, a melt, or a free flowing solid which can be metered. Most preferably they are added as a liquid, and in particular as a liquid solution or dispersion.

Polyester precursor reactants are fed to an esterification reaction vessel where the first stage of the melt phase process is conducted. The esterification process proceeds by direct esterification or by ester exchange reactions, also known as transesterification. In the second stage of the melt phase process, the oligomer mixture formed during esterification is polycondensed to form a polyester melt. The molecular weight of the melt continues to be increased in the melt phase process to the desired IV. The catalyst system of the invention is useful in any melt phase process for making polyethylene terephthalate based polymers.

To further illustrate, a mixture of one or more dicarboxylic acids, preferably aromatic dicarboxylic acids, or ester forming derivatives thereof, and one or more diols, such as ethylene glycol, are continuously fed to an esterification reactor operated at a temperature of between about 200° C. and 300° C., and at a super-atmospheric pressure of between about 1 psig up to about 70 psig. The residence time of the reactants typically ranges from between about one and five hours. Normally, the dicarboxylic acid(s) is directly esterified with diol(s) at elevated pressure and at a temperature of about 240° C. to about 285° C. The esterification reaction is continued until a acid or ester group conversion of at least 70% is achieved, but more typically until a acid or ester group conversion of at least 85% is achieved to make the desired oligomeric mixture (or otherwise also known as the "monomer").

The resulting oligomeric mixture formed in the esterification zone (which includes direct esterification and ester exchange processes) includes bis(2-hydroxyethyl)terephthalate (BHET) monomer, low molecular weight oligomers, DEG, and trace amounts of water as the condensation byproduct not removed in the esterification zone, along with other trace impurities from the raw materials and/or possibly formed by catalyzed side reactions, and other optionally added compounds such as toners and stabilizers. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. Water is removed as the esterification reaction proceeds in order to drive the equilibrium toward the desired products. The esterification zone typically produces the monomer and oligomer species, if any, continuously in a series of one or more reactors. Alternately, the monomer and oligomer species in the oligomeric mixture could be produced in one or more batch reactors. It is understood, however, that in a process for making PEN, the reaction mixture will contain the monomeric species bis (2-hydroxyethyl)-2,6-naphthalate and its corresponding oligomers. At this stage, the It.V. is usually not measurable or is less than 0.1. The average degree of polymerization of the molten oligomeric mixture is typically less than 15, and often less than 7.0.

The reaction to make the oligomeric mixture by the direct esterification method is preferably conducted without added catalyst, because it known to be autocatalytic. The reaction to make the oligomeric mixture by the transesterification method is preferably conducted with an added catalyst. Typical ester exchange catalysts which may be used in an ester exchange reaction include titanium alkoxides and dibutyl tin dilaurate, zinc compounds, manganese compounds, each used singly or in combination with each other. Any other catalyst materials well known to those skilled in the art are suitable. In a most preferred embodiment, however, the ester exchange reaction proceeds in the absence of titanium compounds. Titanium based catalysts present during the polycondensation reaction negatively impact the b* by making the polyester more yellow. While it is possible to deactivate the titanium based catalyst with a stabilizer after completing the ester exchange reaction and prior to commencing polycondensation, in a most preferred embodiment it is desirable to eliminate the potential for the negative influence of the titanium-based catalyst on the b* color of the polyester by conducting the direct esterification or ester exchange reactions in the absence of any added titanium containing compounds. Suitable alternative ester exchange catalysts include zinc compounds, manganese compounds, or mixtures thereof.

Once the oligomeric mixture is made to the desired percent conversion of the acid or ester groups, it is transported from the esterification zone or reactors to the polycondensation zone. The commencement of the polycondensation reaction is generally marked by either a higher actual operating temperature than the operating temperature in the esterification zone, or a marked reduction in pressure compared to the esterification zone, or both. In some cases, the polycondensation reaction is marked by higher actual operating temperatures and lower (usually sub-atmospheric) pressures than the actual operating temperature and pressure in the esterification zone. Typical polycondensation reactions occur at temperatures ranging from about 260° C. and 300° C., and at sub-atmospheric pressure of between about 350 mm Hg to 0.2 mm Hg. The residence time of the reactants typically ranges from between about 2 to about 6 hours. In the polycondensation reaction, a significant amount of glycols are evolved by the condensation of the oligomeric ester species and during the course of molecular weight build up.

In some processes, polycondensation reactions are initiated and continued in the melt phase in a prepolymerization zone and finished in the melt phase in a finishing zone, after which the melt is solidified to form the polyester polymer melt phase product, generally in the form of chips, pellets, or any other shape. Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. The residence time of the melt in the finishing zone relative to the residence time of the melt in the prepolymerization zone is not limited. For example, in some reactor designs, the prepolymerization zone represents the first half of polycondensation in terms of reaction time, while the finishing zone represents the second half of polycondensation. Other reactor designs may adjust the residence time between the finishing zone to the prepolymerization zone at about a 1.5:1 ratio or higher. A common distinction between the prepolymerization zone and the finishing zone in many designs is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

Desirably, the temperature applied to the polymer melt or of the polymer melt in the polycondensation zone is greater than 270° and up to about 300° C. The pressure in the finishing zone may be within the range of about 0.2 to 20 mm Hg, or 0.2 to 10 mm Hg, or 0.2 to 2 mm Hg.

The addition of aluminum and alkaline earth metal or alkali compounds to the melt phase reaction may proceed in a variety of ways. Broadly speaking, the aluminum and alkaline earth metal or alkali compounds may be added in combination as a unitary stream, or as separate streams. The alkaline earth metal or alkali compounds and the aluminum compounds may be combined together into a solution with a solvent such as ethylene glycol and added as a unitary stream, or the solution may be further blended up with the diol stream added to the esterification reactor, or it may be added into the paste of acid/glycol fed to the esterification reactor. Adding the aluminum and alkaline earth metal or alkali compounds together in solution as a unitary stream provides the convenience of reducing the number of addition points.

Preferably, the aluminum compound is added to the melt phase reaction as a separate stream from a stream of the alkaline earth metal or alkali compounds. If desired, the alkali or alkaline earth metal compound is added first followed by the addition of the aluminum compound. In this case, it is desired to add the alkali or alkaline earth metal or alkali earth metal compound to an esterification zone or reactor to lower diethylene glycol levels while the aluminum compound is added to the beginning of polycondensation (e.g. upon completion of at least 90% of esterification or within the first 30 minutes of polycondensation reactions) The addition of lithium compounds to the esterification reaction zone lowers the diethylene glycol content in the resulting polyester polymer. Therefore, it is preferred to add lithium or other alkali or alkaline earth metal compounds to the esterification reaction mixture, zone, or reactor. However, to avoid potential undesirably side reactions between aluminum catalyst and water generated in the esterification zone which may inhibit or deactivate the aluminum catalyst and thereby slow down the rate of polycondensation, it is desirable in yet another embodiment to add the aluminum compounds after substantial completion of the esterification reaction or at the beginning of or during polycondensation. In a further embodiment, at least 75%, or at least 85%, or at least 95% of the esterification reaction (in terms of conversion) is conducted in the absence of added aluminum compounds.

In one embodiment, the esterification process is conducted in the presence of an alkaline earth metal or alkali. The alkaline earth metal or alkali compounds are added to an esterification reaction mixture. The alkaline earth metal or alkali compounds may be added at the initiation of esterification, to the first esterification reactor as a separate stream, in mixture with the terephthalic acid paste, or preferably in combination with the feed of ethylene glycol or other diol to the esterification reactor. The alkaline earth metal or alkali compound is preferably added to the diol tank and fed to the esterification reactor in solution.

The benefit of conducting esterification in the presence of an alkaline earth metal or alkali is a lower level of DEG in the oligomer leaving the esterification zone. A lower level of DEG in the oligomer results in a lower level of DEG in the polymer. The DEG level in polymer affects performance during stretch-blow molding and crystallization behavior. In general, lower DEG levels are desirable. Lowering DEG provides a larger processing window during stretch-blow molding.

The amount of alkaline earth metal or alkali is effective to increase the rate of esterification, thereby acting as a catalyst or promoter.

The alkaline earth metal or alkali compounds may be added to the esterification zone before, during, or after completion of esterification, or between the esterification zone and polycondensation zone, or at a point when polycondensation starts. In one embodiment, the alkaline earth metal or alkali compounds are added before 50% conversion of the esterification reaction mixture. In general, addition of the basic alkali metal compounds or basic alkaline earth metal compounds early in the esterification zone results in the lowest DEG levels. The DEG level may also be related to the amount added of the basic alkali metal compounds or basic alkaline earth metal compounds; however, low levels may be sufficient. In another embodiment where lowering DEG levels is not a goal, the alkaline earth metal or alkali is added between the esterification and prepolymerization zones or at the beginning of the prepolymerization zone.

In the process of the invention, the polyester melt is formed by polycondensing the oligomer mixture in the presence of aluminum compounds or atoms. Aluminum may be added to the esterification reaction mixture, to the oligomer mixture exiting the esterification zone, or at the start of polycondensation, or to the polyester melt during polycondensation. However, since aluminum operates as a polycondensation catalyst, it is desirable to add aluminum to the polyester melt early in the polycondensation reaction to provide the benefit of shorter reaction time or a higher molecular weight build up. We have found that aluminum compounds can react with water present in the esterification zone. This results in a less active catalyst in the polycondensation zone. Therefore, the aluminum catalyst atoms are added preferably when the percent conversion of the acid end groups is at least 75%, more preferably when the % conversion of the acid end groups is at least 85%, and most preferably when the % conversion of the acid end groups is at least 95%, In a preferred embodiment, aluminum is added to the oligomer mixture upon or after completion of esterification or to a polyester melt no later than when the IV of the melt reaches 0.3 dL/g, or no later than when the IV of the melt reaches 0.2 dL/g, and more preferably to the oligomer mixture or prior to commencing or at the start of polycondensation.

Other catalyst metals may be present if desired. For example, Mn, Zn, Sb, Co, Ti, and Ge catalysts may be used in conjunction with aluminum and alkaline earth metals or alkali catalysts. Preferably, the polyester polymer is made without the addition of cobalt to the melt phase reaction since titanium nitride or organic toners are preferred. Titanium catalysts can be used, particularly if melt phase manufacture involves ester exchange reactions. The titanium catalysts are those compounds added in amounts which increase the It.V. of polyester melt by at least 0.3 dL/g if not deactivated. Typically, the titanium catalyst added during ester exchange will be deactivated prior to polycondensing the resulting oligomer mixture since, left untreated before polycondensing, the titanium catalyst will severely discolor the polymer due to its high activity, which includes side reactions. However, if desired, small quantities of active titanium catalysts may be present with the catalyst system of the invention. The amount of titanium catalyst, if used, generally ranges from 2 ppm to 15 ppm, based on the weight of the polymer. Antimony catalysts can also be used in combination with the catalyst system of the invention. The amount of antimony can range from 20 ppm to 300 or to 250 ppm. Due to AA generation concerns, the amount of antimony is preferred to be no greater than 125 ppm, based on the weight of the polymer. Furthermore, it is preferred not to use antimony catalyst because they are known to degrade the L* and clarity of the polyester. It may be necessary to increase the amount of phosphorus if catalytic metals other than aluminum, alkaline earth metals, or alkali metals are present.

Preferably, the polyester polymer is made without the addition of titanium catalysts, cobalt catalysts, antimony catalysts, or any other polycondensation or esterification catalyst metal added to the melt phase reaction in amounts which are effective to catalyze (increase the reaction rate or increase the It.V. by at least 0.1 dL/g), and more preferably, the polyester polymer is made without the addition of any catalyst metal to the melt phase reaction other than the aluminum/alkaline earth or alkali system. It is to be recognized, however, that one or more of metals such as cobalt or manganese will most likely be present at low levels in the polymer because they come as impurities with the terephthalic acid composition made from a metal catalyzed liquid phase oxidation process. Metal impurities present in the raw material supply to the melt phase process are not considered to be metals added to the melt phase process.

The polyester polymer also contains a catalyst deactivator. By a catalyst deactivator is meant a compound effective to at least partially deactivate or inhibit the activity of the catalyst system. A compound is effective to at least partially deactivate the catalyst system when by its addition at a given level, nd solely for testing the effectiveness of a compound at a given level, when both a) the rate of solid-stating is reduced relative to the same polymer without the deactivator ("no additive case") and b) when added earlier, the rate of melt-phase polycondensation to a constant It.V. target is reduced or the It.V. of the polymer is reduced at constant time relative to the no additive case. Preferably, the catalyst deactivator also reduces the rate of AA generation upon melting particles relative to the no additive case, and more preferably upon melting particles having an It.V. of at least 0.72 dL/g obtained from a melt phase polymerization.

The catalyst deactivator is added late during manufacturing the polymer melt in order to limit the activity of catalyst system during subsequent melt processing steps and which would otherwise catalyze the conversion of acetaldehyde precursors present in the polymer to acetaldehyde. Left untreated, the polymer would have a high acetaldehyde generation rate during extrusion or injection molding. The stabilizer or deactivator can also help thermally stabilize the polymer melt near the end of melt phase polycondensation and during remelting which occurs, for example, during melt processing into articles, without which more reactions would occur to cleave the polymer chains in the highly viscous melt. In addition to lowering the formation rate of AA precursors, the stabilizer or deactivator may improve the hydrolytic stability of the polymer. Any side reaction at least partially catalyzed by the polycondensation catalyst system may be less of a problem when the polycondensation catalyst system is at least partially deactivated. The catalyst deactivator is not added along with the addition of aluminum compounds or alkaline earth metal or alkali compounds, nor is it added at the commencement of polycondensation because it would inhibit the rate of polycondensation and the catalytic activity of the metal catalysts. It should be noted, however, that not all types or forms of phosphorus compounds are deactivators, and if they are not, they may, if desired, be added along with the catalyst or at the commencement of polycondensation.

Suitable deactivator compounds are preferably phosphorus containing compounds. The phosphorus compounds contain one or more phosphorus atoms. Preferred are phosphate triesters, acidic phosphorus compounds or their ester derivatives, and amine salts of acidic phosphorus containing compounds. Acidic phosphorus compounds have at least one oxyphosphorus acid group, that is, at least one phosphorus atom double-bonded to one oxygen and single-bonded to at least one hydroxyl or OH group.

Specific examples of phosphorus containing compounds include phosphoric acid, phosphorous acid, polyphosphoric acid, carboxyphosphonic acids, phosphonic acid derivatives, and each of their acidic salts and acidic esters and derivatives, including acidic phosphate esters such as phosphate mono- and di-esters and non acidic phosphate esters (e.g. phosphate tri-esters) such as trimethyl phosphate, triethyl phosphate, tributyl phosphate, tributoxyethyl phosphate, tris(2-ethylhexyl)phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mixtures of mono-, di-, and tri-esters of phosphoric acid with ethylene glycol, diethylene glycol, and 2-ethylhexanol, or mixtures of each. Other examples include distearylpentaerythritol diphosphite, mono-, di-, and trihydrogen phosphate compounds, phosphite compounds, certain inorganic phosphorus compounds such as monosodium phosphate, zinc or calcium phosphates, poly(ethylene)hydrogen phosphate, silyl phosphates; phosphorus compounds used in combinations with hydroxy- or amino-substituted carboxylic acids such as methyl salicylate, maleic acid, glycine, or dibutyl tartrate; each useful for inactivating metal catalyst residues.

Specific examples of preferred acidic phosphorus compounds include phosphoric acid, phosphorous acid, polyphosphoric acid, carboxyphosphonic acids, phosphonic acid derivatives, and each of their acidic salts and acidic esters and derivatives, including acidic phosphate partial esters such as phosphate mono- and di-esters of any of the foregoing acids. Preferred examples of non-acidic phosphorus compounds include oligomeric phosphate tri-esters, (tris)ethylene glycol phosphate, tri-esters of phosphoric acid with ethylene glycol, diethylene glycol, or mixtures of each.

Other phosphorus compounds which may be added include the amine salts of phosphorus-containing acids. The amines may be cyclic or acyclic, may be monomeric, oligomeric, or polymeric, and should be selected so as to minimize haze and/or solubility when the latter are issues. The organic constituents of the amine may in principle be any organic group. Ammonia and related compounds like ammonium hydroxide are suitable.

Suitable organic groups on the amine include linear and branched alkyl, cycloalkyl, aryl, aralkyl, alkaryl, heteroaryl, etc. Each of these types of organic groups may be substituted or unsubstituted, i.e. with hydroxy, carboxy, alkoxy, halo, and like groups. The organic groups may also contain carbonate, keto, ether, and thioether linkages, as well as amide, ester, sulfoxide, sulfone, epoxy, and the like. This list is illustrative and not limiting.

Preferred amines are cyclic amines having a 5- to 7-membered ring, preferably a 6-membered ring. These rings may constitute a single "monomeric" species, or may be part of a larger oligomer or polymer.

Preferred cyclic amines are hindered amines which have organic groups substituted at ring positions adjacent to the ring nitrogen. The ring nitrogen itself may also be substituted, i.e. by alkyl, aryl, aralkyl, alkaryl, and other groups. The hindered amines may also comprise a portion of an oligomeric moiety or polymeric moiety.

Another type of preferred amines are amino acids. Amino acids with decomposition points at or above polymerization temperatures are especially preferred. The L-enantiomer, the D-enantiomer or any mixture thereof, including racemic mixtures, may be used. The amine group and the carboxylic acid group do not have to be attached to the same carbon. The amino acids may be alpha, beta or gamma. Substituted amino acids may be used. Amino acids with some solubility in water are especially preferred as this allows the synthesis of the salt to be done in water, i.e., without VOC's (volatile organic compounds).

The amines forming the salt contain at least one nitrogen capable of salt formation with a phosphorus-containing acid. In hindered amines containing N-alkylated piperidinyl moieties, for example, salt formation may involve the piperidinyl nitrogen, generating species such as (but not limited to):

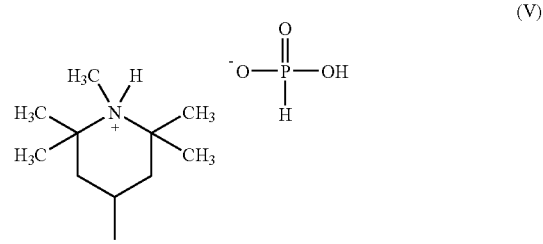

(V)

When there is one nitrogen in the amine compound that can form a salt, one mole of phosphorus-containing acid is used per mole of amine compound. When there are two or more nitrogen atoms in the amine compound that can form salts, two or more moles of acid can be used per mole of amine compound, up to an amount of acid, which creates salts having no remaining neutralizable nitrogen, or slightly in excess of this amount.

The carboxylic acid group of the amino acid opens up the possibility that the compound might be reacted into the polyester chain. Reaction into the polyester chain should result in less volatility and less extractability. Reaction into the polyester chain can also be accomplished if the organic portion of the salt contains a hydroxyl and/or a carboxyl group. If there is only 1 carboxyl or hydroxyl group, the salt could function as an end-capper. If there are a total of 2 reactive groups (carboxyl or hydroxyl), the salt may not always be at the end of the chain.

The precursor to the phosphorous moiety of the phosphorus salt may be any oxyphosphorus acid, including but not limited to hypophosphorous acid, phosphorous acid, phosphoric acid, polyphosophoric acid, polyphosphorous acids, pyrophosphoric acid, phosphinic acids, phosphonic acids, phosphate monoesters, phosphate diesters, phosphonate monoesters, pyrophosphate monoesters, pyrophosphate diesters, pyrophosphate triesters, or salts or compounds which still bear at least one acid hydrogen, etc. The hydrogen on any OH group bound directly to the P=O group is acidic. Compounds with more than one acidic hydrogen may have one or more acidic hydrogens substituted with organic groups such as alkyl, aryl, aralkyl, alkaryl, etc., by polyether oligomers, polyester oligomers, etc. At least one salt-forming acidic hydrogen must remain, however. Oxyphosphorus acids with one or more hydrogen bound directly to the P=O group may have one or more of these hydrogens substituted with organic groups such as alkyl, aryl, aralkyl, alkaryl, etc. Examples of these compounds include but are not limited to alkylphosphonic acids, alkylphosphinic acids and dialkylphosphinic acids. As with the amines, the organic groups may be substituted.

In one embodiment, the salts are prepared by the reaction of one or more acidic phosphorus-containing compounds with one or more basic organic compounds containing nitrogen, wherein the phosphorus-containing compounds are preferably selected from compounds having the formulas:

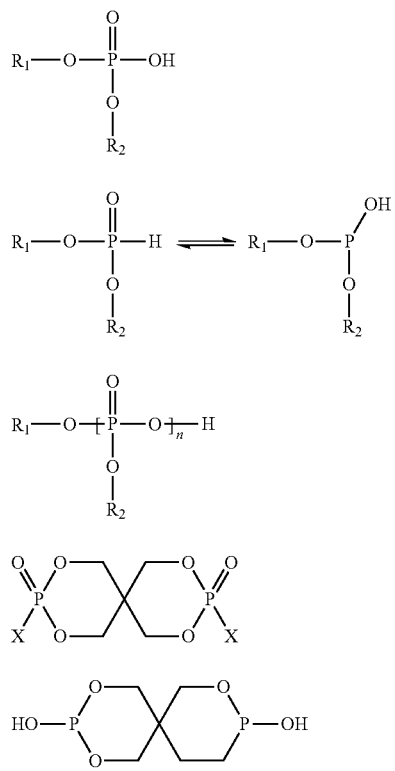

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from hydrogen and hydroxy;

and wherein the basic organic compounds containing nitrogen are selected from compounds having the formulas:

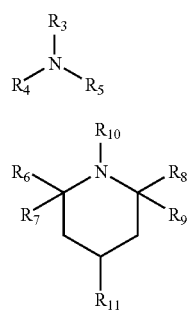

-continued

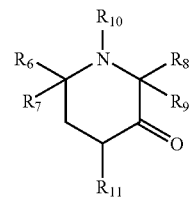

(3)

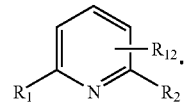

(4)

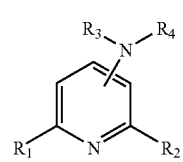

(5)

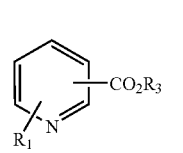

(6)

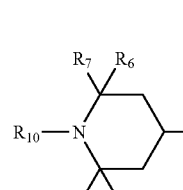

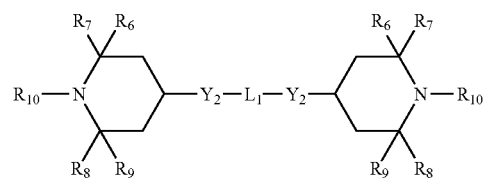

(7)

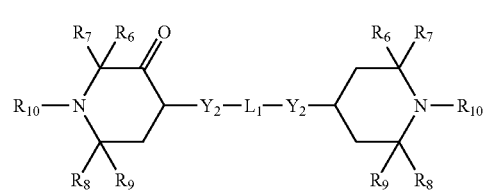

(8)

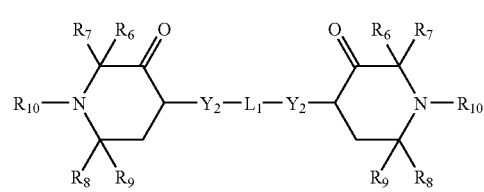

(9)

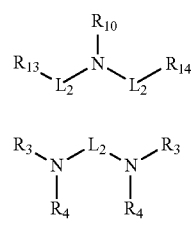

(10)

(11)

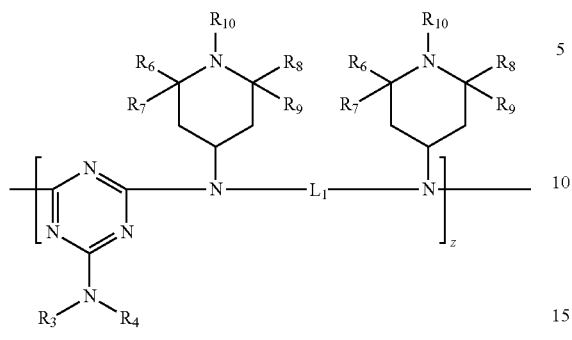
(12)
(13)
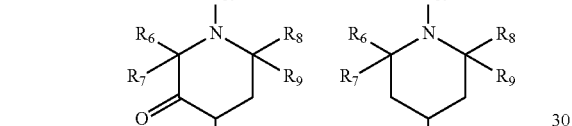
(14)
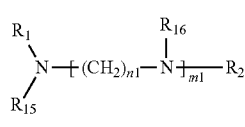
(15)
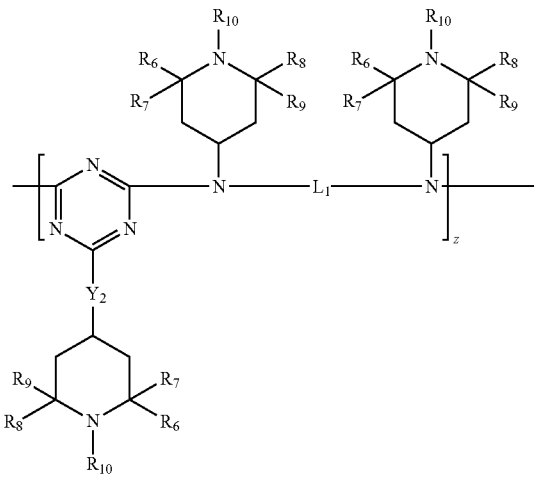
(16)
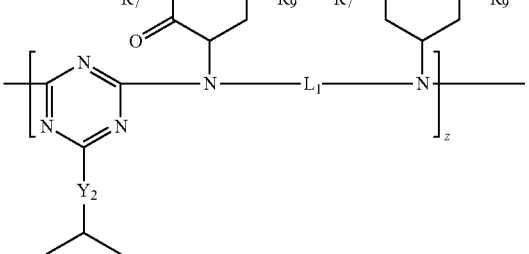
(17)
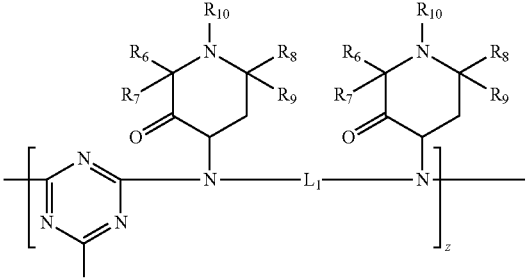
(18)

(19)

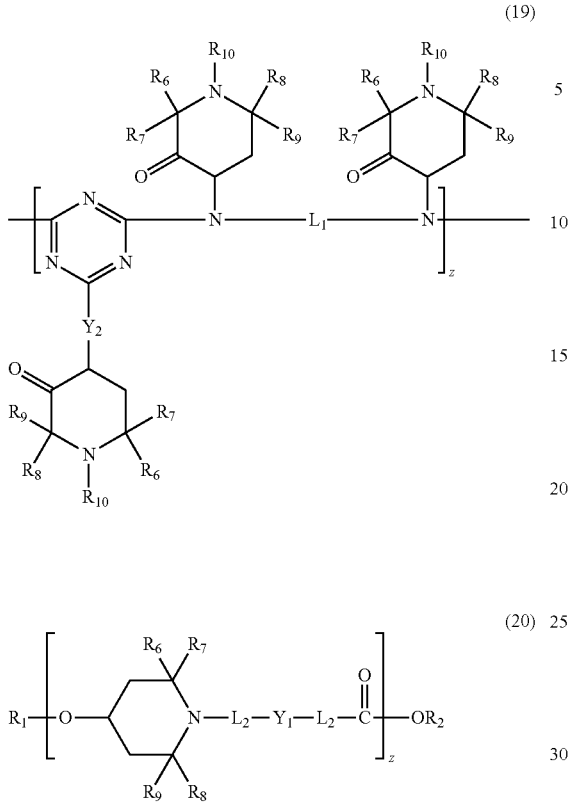

(20)

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

Each of the following types of organic groups may be substituted or unsubstituted, i.e. with hydroxy, carboxy, alkoxy, halo, and/or like groups, and any combination thereof. The organic groups may also contain carbonate, keto, ether, and thioether linkages, as well as amide, ester, sulfoxide, sulfone, epoxy, and the like. This list is illustrative and not limiting.

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein preferably, at least one of $R_3$, $R_4$, and $R_5$ is a substituent other than hydrogen; $R_3$ and $R_4$ or $R_4$ and $R_5$ collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

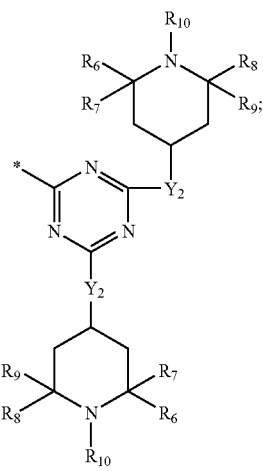

wherein $R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 3 4 or 5 positions on the aromatic ring;

the —$N(R_3)(R_4)$ group may be located at the 3, 4 or 5 positions on the pyridine ring of nitrogen compound (5);

the —$CO_2R_3$ and $R_1$ groups may be located at any of the 2, 3, 4, 5, 6 positions of the pyridine ring of nitrogen compound (6);

$L_1$ is a divalent linking group selected from $C_2$-$C_{22}$-alkylene; —$(CH_2CH_2$—$Y_1)_{1-3}$—$CH_2CH_2$—; $C_3$-$C_8$-cycloalkylene; arylene; or —$CO$-$L_2$-$OC$—;

$L_2$ is selected from $C_1$-$C_{22}$-alkylene, arylene, —$(CH_2CH_2$—$Y_1)_{1-3}$—$CH_2CH_2$— and $C_3$-$C_8$-cycloalkylene;

$Y_1$ is selected from —$OC(O)$—, —$NHC(O)$—, —$O$—, —$S$—, —$N(R_1)$—;

$Y_2$ is selected from —$O$— or —$N(R_1)$—;

$R_{13}$ and $R_{14}$ are independently selected from —$O$—$R_2$, and —$N(R_2)_2$;

Z is a positive integer of up to about 20, preferably up to about 6;

m1, is selected from 0 to about 10;

n1 is a positive integer selected from 2 to about 12;

$R_{15}$, and $R_{16}$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

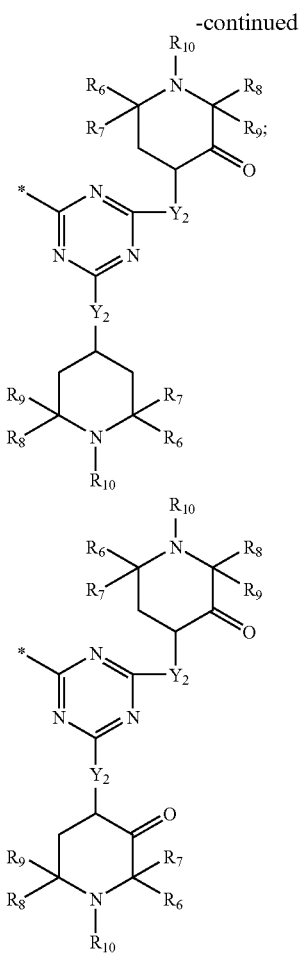

Radical A structures wherein * designates the position of attachment.

Preferably at least one of $R_{15}$ and $R_{16}$ is an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1.

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, carboxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, carboxy, halogen, and the like.

The term "aryl" is used to denote an aromatic radical containing 6, 10 or 14 carbon atoms in the conjugated aromatic ring structure and these radicals are optionally substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; $C_3$-$C_8$-cycloalkyl; halogen; hydroxy, carboxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3,4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCOC$_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, carboxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, carboxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$-alkyl, $C_1$-$C_6$-alkoxy and halogen.

Preferred hindered amines contain alkyl-substituted piperidinyl moieties and/or triazine moieties, more preferably hindered amines where at least one amine group is substituted by both a triazine moiety and an alkyl-substituted piperidine moiety. In the most preferred hindered amines, amino group-containing moieties are linked by an alkylene group, preferably a (—CH$_2$—)$_n$ group where n is from 2 to 12, preferably from 4-10, and most preferably 6 or 8. The most preferred hindered amine is Cyasorb® UV-3529, containing repeat units of the formula:

(21)

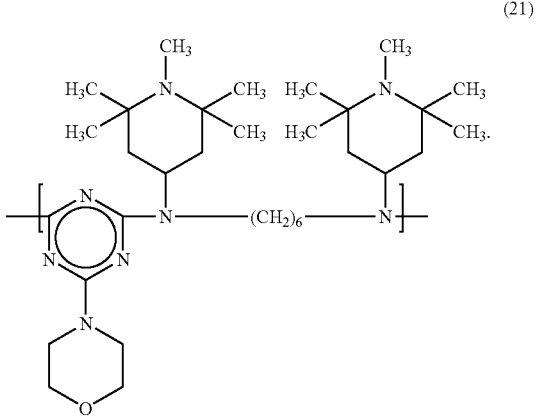

The salt of the amine component of the novel compositions provided by the present invention may be prepared by bringing together the acidic phosphorus-containing compound and the basic nitrogen-containing organic compound in a suitable manner. A suitable manner is any procedure that involves contacting the acidic phosphorus-containing acid with the basic organic compound. For example, the acidic phosphorus-containing compound and the basic nitrogen-containing organic compound may be dissolved in appropriate solvents and the solutions mixed followed by precipitation of the reaction product; mixing the phosphorus-containing acid and the basic organic compound without solvent; and the like.

The ratio of the number of acidic oxyphosphorus groups in the acidic phosphorus-containing compound to the number of basic nitrogen atoms in the basic organic compound may be in the range of about 0.05 to about 2, preferably from about 0.25 to about 1.1. Compositions that contain a large excess of unreacted phosphorus-containing acidic compounds may result in corrosion of process equipment during polyester manufacture, concentrate manufacture (if any) or preform manufacture.

Since the catalyst system used in the invention can be so easily at least partially deactivated, phosphorus compounds previously found to be unsuitable with antimony catalyzed systems, such as the partial or full esters of acidic phosphorus compounds, can now be used in the polymer melt and process of the invention. Moreover, phosphorus compounds found to cause an increase in haze with antimony catalyzed systems, such as phosphorous acid, can also now be used in the catalyst system without acting to increase the haze due to reduction of a metal to a gray or black color.

The quantity of phosphorus used in this process is effective to reduce the amount of AA generated upon remelting the polymer produced in the melt phase by partially or fully deactivating the aluminum/alkaline earth metal or alkali catalyst. Consideration is taken for the cumulative amount of aluminum, alkali or alkaline earth metals, and any other catalyst metals present in the melt. The molar ratio of the moles of phosphorus to the total moles of aluminum and alkaline earth metal or alkali metal (P:M MR where M is deemed to be the cumulative molar total of aluminum, alkaline earth metals, and alkali metals) is generally at least 0.1:1, or at least 0.3:1, or at least 0.5:1, or at least 0.7:1, or at least 1:1, and up to about 5:1, or more preferably up to about 3:1, or up to 2:1, or up to 1.8:1, or up to 1.5:1. Excessively large quantities of phosphorus compounds should be avoided to minimize the loss in polymer It.V. upon addition of the phosphorus compound to the polyester melt. The preferred range for P:M MR is 0.5 to 1.5.

In an embodiment of the invention, the polyester polymer composition contains aluminum atoms within a range of 10 ppm to 100 ppm, or 15 to 60 ppm, or 20 ppm to 40 ppm, based on the weight of the polyester polymer, and the moles of alkaline earth metal or alkali metal or alkali atoms divided by the moles of aluminum atoms is within a range of 0.5 to 6, or 1 to 5, or 2 to 4, and the P:M ratio ranges from 0.1 to 3, or 0.3 to 2, or 0.5 to 1.5. Preferably, the polyester polymer composition contains aluminum and at least one of lithium or sodium or a combination of both.

Since one of the benefits of the invention is the ease with which the catalyst system may be deactivated, care should be taken not to add the phosphorus compound too early as this would retard the polycondensation rate. The addition of the final amount of desired phosphorus should be completed only upon substantial completion of polycondensation and thereafter, and preferably, the final amount of desired phosphorus compound should not be added to the polymer melt in the melt phase manufacturing process until substantial completion of the polycondensation or thereafter.

In the embodiments in which the phosphorus compounds are added in the melt phase polymerization, by the final amount of phosphorus is meant the final amount of phosphorus desired in the polyester polymer exiting the melt phase manufacturing process or as appearing in a pellet. If desired, a partial amount of phosphorus compound may be added early in the melt phase manufacturing process, such as at the initiation of polycondensation, provided that a portion of phosphorus representing the final amount is added late in the course of polycondensation or thereafter but before solidification as explained further below.

To minimize It.V. loss if large quantities of phosphorus are added, or to further minimize the potential It.V. loss even if moderate or optimal quantities of phosphorus are added, it is desirable to add the phosphorus compound neat, that is without further dilution, such as in the case of 85% or more phosphoric acid. If a carrier is used, it is preferred that that the carrier is nonreactive, that is, does not break the polymer chain nor increase AA generation rates. Water, alcohols, glycols and lower molecular weight PET are known to break the polymer chain. Once the minimum amount of the phosphorus compound and the associated It.V. loss are known, the melt-phase process can be carried out such that the It.V, made before deactivation/stabilization, is higher by the amount of It.V. loss expected so that the target ItV. can be achieved.

In one embodiment where the phosphorus compound is added to a melt phase polymerization process, the catalyst stabilizer is added to the polyester melt late during the course of polycondensation and before solidification. The deactivator is added to the polyester melt late in the course of the polycondensation reaction when one or more of the following conditions are satisfied or thereafter and before solidification of the polyester melt:

a) the polyester melt reaches an It.V. of at least 0.50 dL/g or
b) vacuum applied to the polyester melt, if any, is released, or
c) if the polyester melt is present in a melt phase polymerization process, adding the phosphorus compound within a final reactor for making the polyester polymer or between the final reactor and before a cutter for cutting the polyester melt, or
d) if the polyester melt is present in a melt phase polymerization process, following at least 85% of the time for polycondensing the polyester melt; or
e) the It.V. of the polyester melt is within +/−0.15 dl/g of the It.V. obtained upon solidification; or
f) at a point within 20 minutes or less of solidifying the polyester melt.

In one embodiment, the deactivator is added to the polyester melt after the polyester melt obtains an It.V. of at least 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least 0.78 dL/g, and most preferably, regardless of when the deactivator is added, the resulting polymer exiting the melt phase manufacture has an It.V. of at least 0.68 dl/g.

In another embodiment, the deactivator is added to the polyester melt during or after releasing the vacuum from the polyester melt undergoing polycondensation reactions, or after bringing the pressure in a polycondensation zone or reactor to a level of 300 mm Hg or greater, or 450 mm Hg or greater, or 600 mm Hg or greater, or to atmospheric pressure or greater, and preferably before the polyester melt is solidified.

In another embodiment, the deactivator is added at a location near or at the end of a final reactor or between the final reactor and before a cutter. For example, the deactivator is added to the last polycondensation reactor at a location proximal to the outlet of the last polycondensation reactor, or to a pipe connecting directly or indirectly the last polycondensation reactor and a gear pump or extruder providing the motive force to drive the melt through a die plate for cutting wherein said pipe is directed back to or proximal to the outlet or the bottom of the last polycondensation reactor, or to a pipe inlet to the last polycondensation reactor.

In yet another embodiment, the deactivator is added to the polyester melt following at least 85%, or at least 90%, or at least 95%, or at least 98%, or about 100% of the polycondensation time. The polycondensation time is measure as the time elapsed between the start of polycondensation zone to the exit of the polyester melt from the last polycondensation reactor.

In a further embodiment, the deactivator is added to the polyester melt when the It.V. of the polyester melt is within 0.10 dL/g, or within 0.5 dl/g, or within 0.030 dL/g, or within 0.02 of the It.V. obtained upon solidification.

In yet another embodiment, the deactivator is added to the polyester melt at a point within 20 minutes, or within 10 minutes or less, or 5 minutes or less, or 3 minutes or less of solidifying the polyester melt. The solidification of the polyester melt typically occurs when the melt is forced through a die plate into a water bath and cut into pellets, or in a melt-to-mold process when the melt is injection molded into a molded article.

In yet a more preferred embodiment, each of the embodiments identified herein occurs in a continuous manufacturing process where the throughput of the melt phase process is at least 1 ton/day, or at least 50 tons/day, or at least 100 tons/day, or at least 200 tons/day, or at least 300 tons/day, or at least 400 tons/day, or at least 500 tons/day of polyester polymer in a steady state operation.

The reaction time of the melt from an It.V. of 0.40 dL/g through and up to an It.V. in the range of at least 0.68 dL/g to 0.80 dL/g is 150 minutes or less, or 100 minutes or less, or 80 minutes or less, or 50 minutes or less. Preferably, the pressure applied within this range is about 2 mm Hg or less, and about 0.05 mm Hg or more.

Stabilizing or deactivating the catalyst late or near the end of a melt phase process can result in polyester particles that, in the absence of AA scavengers, generate less AA during subsequent melt processing. With late addition of a phosphorus compound, Al/alkaline earth metal or alkali catalyst systems can produce polyester polymers with lower AA generation rates than polyester polymers made without the presence of a catalyst deactivator/stabilizer or polyesters made with conventional antimony catalysts that are similarly deactivated late with a phosphorus compound.

With late addition of a phosphorus compound to the polyester melt catalyzed with an aluminum/alkaline earth metal or alkali system, it is now possible to obtain a polyester polymer having AA levels and an AA generation rate low enough for use in water bottle applications without the need to add AA scavengers or other AA reducing additives. Moreover, this type of polymer having both low AA levels and low AA generation rates without the presence of an AA reducing additive can be obtained to a high It.V. (at least 0.68 dL/g, or at least 0.70 dL/g, or at least 0.72 dL/g, or at least 0.74 dL/g, or at least 0.76 dL/g) in the melt phase without the necessity for solid state polymerizing the polymer.

Further, with late addition of a phosphorus compound, it is possible to obtain AA generation rates suitable for water applications regardless of whether the polymer is made with an aluminum/alkaline earth metal or alkali system at 275° C. or at 280° C. Since polycondensation rates are significantly faster at 280° C. than at 275° C., the aluminum/alkaline earth metal or alkali catalyst systems also have the potential for shorter finisher times or faster production rates. At the same temperature, many combinations of this catalyst system are more active than antimony catalysts, that is, take less time to reach the same It.V. With the combination of higher polycondensation temperatures and higher inherent catalytic activities, shorter finisher times or faster production rates relative to antimony catalysts are likely.

Especially, at higher Al levels and/or higher alkaline earth metal or alkali metal levels, the late addition of a phosphorus compound to the polyester melt significantly decreases particulate haze in the polymer, resulting in a molded article with better clarity. Since higher Al levels and/or higher alkaline earth metal or alkali metal levels in PET increase production rates, late addition of a phosphorus compound facilitates maximizing production rates while minimizing haze.

Crystallized polymers that are catalyzed by aluminum/alkaline earth metal or alkali metal systems tend to be brighter or have higher L* color values relative to crystallized polymers catalyzed by antimony systems. Moreover, the late addition of a phosphorus compound to polyester melts catalyzed by aluminum/alkaline earth metal or alkali systems produces polymers which when crystallized have even higher L* color values or high brightness relative to the no phosphorus case which may have a somewhat higher It.V. For example, the crystallized polyester polymers obtained by the process of the invention have an L* of at least 70, or at least 73, or at least 76, or at least 79.

PET made exclusively in the melt phase using an aluminum/alkaline earth metal or alkali catalyst system with addition of a phosphorus compound near the end of the melt phase process has a low AA generation rate upon melting for water bottle applications, while also exhibiting decreased finisher times or increased production rates, slower crystallization rates from the melt, lower melting points, lower haze and a similar or improved yellowness and brightness after toning with toners or cobalt or titanium nitride as a bluing and reheat additive, relative to PET made with a conventional antimony catalyst. Slower crystallization from the melt means that less heat is needed in the extruder portion of injection molding process to mold clear preforms; therefore, the cooling time is shorter and hence, the injection molding cycle time is decreased, that is, more, clear bottle preforms can be made per unit time. The attribute of a low acetaldehyde generation rate upon remelting provides a single polymer with dual use capabilities in both the carbonated soft drink market and the water bottle market. The combination of slower crystallization rates and the concomitant shorter cycle times, the use of one polymer resin for both water and CSD markets, while avoiding the expense of using an AA reducing additive.

It is to be understood that the melt phase process conditions and reactor configurations described above are illustrative of a melt phase process, and that the invention is not limited to this illustrative process. For example, while reference has been made to a variety of operating conditions at certain discrete It.V. values, differing process conditions may be implemented inside or outside of the stated It.V. values, or the stated operating conditions may be applied at It.V. points in the melt other than as stated. Moreover, one may adjust the process conditions based on reaction time instead of measuring or predicting the It.V. of the melt. The process is also not limited to the use of tank reactors in series or parallel or to the use of different vessels for each zone. Nor is it necessary to split the polycondensation reaction into a prepolymer zone and a finishing zone because the polycondensation reaction can take place on a continuum of slight variations in operating conditions over time in one polycondensation reactor or in a multitude of reactors in series, either in a batch, semi-batch, or a continuous process.

Once the desired It.V. is obtained, the molten polyester polymer in the melt phase reactors is discharged as a melt phase product and solidified preferably without the addition of an acetaldehyde scavenger to the polymer melt. Avoiding the addition of acetaldehyde scavengers is desirable because acetaldehyde scavengers are costly and can be responsible for increasing the b* color of the polyester polymer or decreasing its L* color after toning out yellow, especially when the reaction product of AA and the scavenger is colored. If the AA scavenger has thermal stability or volatility issues, the effectiveness of a given amount of scavenger at lowering AA may suffer when the scavenger is added in the finisher in a polycondensation zone where high heat and high vacuum are applied.

An acetaldehyde scavenger is a compound or polymer which interacts by physical forces or by chemical reaction with acetaldehyde to bind acetaldehyde and prevent its release from the polyester polymer. Rather than preventing the formation of acetaldehyde precursors or the subsequent reactions of the precursors to form AA, the scavengers operate by binding to acetaldehyde.

Acetaldehyde scavengers are known to those of skill in the art. Examples include polyamides such as those disclosed in U.S. Pat. No. 5,266,413, U.S. Pat. No. 5,258,233 and U.S. Pat. No. 4,837,115; polyesteramides such as those disclosed in U.S. application Ser. No. 595,460, filed Feb. 5, 1996; nylon-6 and other aliphatic polyamides such as those disclosed in Japan Patent Application Sho 62-182065 (1987); ethylenediaminetetraacetic acid (U.S. Pat. No. 4,357,461), alkoxylated polyols (U.S. Pat. No. 5,250,333), bis(4-[bgr]-hydroxyethoxyphenyl)sulfone (U.S. Pat. No. 4,330,661), zeolite compounds (U.S. Pat. No. 5,104,965), 5-hydroxy-isophthalic acid (U.S. Pat. No. 4,093,593), supercritical carbon dioxide (U.S. Pat. No. 5,049,647 and U.S. Pat. No. 4,764,323) and protonic acid catalysts (U.S. Pat. No. 4,447,595 and U.S. Pat. No. 4,424,337), and the most well known acetaldehyde scavengers are homo and copolyamides such as poly (caprolactam), poly(hexamethylene-adipamide), poly(m-xylylene-adipamide), and any other compound or polymer having an active methylene group.

The melt phase product is processed to a desired form, such as amorphous pellets. The shape of the polyester polymer pellets is not limited, and can include regular or irregular shaped discrete pellets without limitation on their dimensions, including stars, spheres, spheroids, globoids, cylindrically shaped pellets, conventional pellets, pastilles, and any other shape, but pellets are distinguished from a sheet, film, preforms, strands or fibers.

The number average weight (not to be confused with the number average molecular weight) of the pellets is not particularly limited. By number average weight is meant the number of pellets per given unit of weight. Desirably, the pellets have a number average weight of at least 0.10 g per 100 pellets, more preferably greater than 1.0 g per 100 particles, and up to about 100 g per 100 pellets.

The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove large particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The polyester polymer is one which is crystallizable. The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the $T_g$ of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$. For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized.

A preferred solidification technique integrates the cutting with the crystallization by not allowing the heat energy imparted to the polymer in the melt phase manufacture to drop below the $T_g$ before the polymer is both cut and crystallized to at least 20% degree of crystallinity. In one integrated solidification technique, the molten polyester polymer is directed through a die, cut at the die plate under water at high temperature and greater than atmospheric pressure, swept away from the cutter by the hot water and through a series of pipes to provide residence time to thermally crystallize the particles in the hot liquid water at a temperature greater than the $T_g$ of the polymer and preferably at about 130 to 180° C., after which the water is separated from the crystallized particles and the particles are dried. In another integrated solidification technique, the molten polyester polymer is cut underwater, the particles are immediately separated from the liquid water after cutting, the particles are dried, and while the particles are still hot and before the temperature of the particles drops below the $T_g$ of the polymer and desirably while the particle temperature is above 140° C., the particles are directed from the dryer onto a surface or vessel which allows the particles to form a moving bed with a bed height sufficient to allow the latent heat within the particles to crystallize the particles without the external application of a heating medium or pressurizing means. Such a surface or vessel is desirably an at least partially enclosed vibrating conveyor, such as is available from Brookman Kreyenborg GmbH.

The degree of crystallinity is optionally at least 30%, or at least 35%, or at least 40%. The melt phase products are preferably substantially free of titanium catalyst residues, and in a direct esterification process, are preferably prepared by adding to the melt phase a polycondensation catalyst containing aluminum atoms and alkali earth or alkali metal atoms or alkali compounds without the addition of antimony compounds.). The presence of a catalyst can be determined if the molecular weight, or It.V. of the polymer melt is increased relative to the absence of the compound in the polymer melt under identical conditions. Thus, polyester polymers made in the melt phase having acceptable color can be isolated and provided to a converter without the need for increasing their molecular weight in the solid state. By making the high It.V. product in the melt phase, the solid stating step can be altogether avoided. Solid stating is commonly used for increasing the molecular weight (and the It.V) of the pellets in the solid state, usually by at least 0.05 It.V. units, and more typically from 0.1 to 0.5 It.V. units. Typically, the It.V. of solid stated polyester solids ranges from 0.70 dL/g to 1.15 dL/g. In a typical SSP process, the crystallized pellets are subjected to a countercurrent flow of nitrogen gas heated to 180° C. to 220° C., over a period of time as needed to increase the It.V. to the desired target.

After crystallization, if desired, the residual or free AA on the polyester particles can be reduced if needed. It is preferred, as noted above, to feed polyester pellets to a melt processing zone which have a low level of residual or free AA. Further, as noted above, the acetaldehyde generation rate of the polyester composition is low when the catalyst is deactivated or stabilized.

The AA generation rate and the free AA can be measured on solid particles or preforms. The following method is an exemplary method used to measure acetaldehyde generation on solid particles.

A method that can be used to determine the level of free AA in the polyester polymer composition is the test method ASTM # F2013-00. This test method is used to measure the level of free acetaldehyde in particles, powders, preforms, bottles, and any other form the polyester polymer composition may take. For purposes of measuring residual or free acetaldehyde, the sample is tested according to the method described below. However, for purposes of measuring the acetaldehyde generation, the sample has to undergo a second melt history in order to determine the level of acetaldehyde generated. If the sample is a particle or powder which has not undergone a melt step in addition to a prior melt phase polycondensation step, the sample is first treated according to the Sample Preparation procedure described below, after which the sample is submitted to the ASTM # F2013-00 test method for analysis.

The test procedure for measuring the level of free acetaldehyde on a sample, whether a preform, pellet, powder, or other form is the ASTM # F2013-00 test method. Samples are cryogenically ground through a Wiley Mill equipped with a 1.0 mesh screen. The final ground material has a particle size less than 800 µm. A portion of a sample (0.20 g) is weighed into a 20-mL head-space vial, sealed and then heated at 150° C. for sixty minutes. After heating, the gas above the sealed sample of PET polymer is injected onto a capillary GC column. The acetaldehyde is separated, and the ppm of acetaldehyde present in the sample is then calculated. The amount of acetaldehyde calculated represents the amount of free or residual acetaldehyde present in the sample.

For measuring the acetaldehyde generation rate on preforms, it is sufficient to use this ASTM # F2013-00 Method as described above without subjecting the preforms to a further melt history since by virtue of making a preform, the pellets are melted in an extruder prior to injection molding. By melt extruding or injection molding, AA precursors in the polymer melt have the opportunity to covert to acetaldehyde.

The acetaldehyde generation rate can be measured on the solid particles. However, for purposes of measuring the acetaldehyde generation, the sample has to undergo a second melt history in order to determine the level of acetaldehyde generated. If the sample is a particle or powder which has not undergone a melt step in addition to a prior melt phase polycondensation step, the sample is first treated according to the Sample Preparation procedure described below, after which the sample is submitted to the ASTM # F2013-00 test method for analysis.

Sample Preparation: For the purpose of measuring the acetaldehyde generation rate, and if the sample manufactured exclusively in the melt phase has not seen a melt history subsequent to melt phase polycondensation, it is prepared according to this method prior to submitting the sample to the ASTM # F2013-00 test. Samples of polymer powder ground to pass a 3 mm screen are heated in an oven at 115° C. under vacuum (25-30 in. Hg) with a 4 SCFH nitrogen purge for at least 48 h. Although overnight drying would be sufficient for water removal alone, which is all that is needed for solid-stated samples, this extended oven treatment also serves to desorb to about 1 ppm or less the residual AA present in the high IV powder after melt-phase-only synthesis and prior to AA generation testing. It would take longer to desorb residual AA from pellets to about 1 ppm or less, due to the larger particle size (longer diffusion path). Any suitable acetaldehyde devolatization technique can be employed on pellets which reduces the level of free acetaldehyde down to about 1 ppm or less, including passing hot inert gas over the pellets for a time period sufficient to reduce the residual acetaldehyde to the desired level. The acetaldehyde devolatization temperature should not exceed 170° C. The sample is then packed in a preheated Tinius Olsen extrusion plastometer using a steel rod. The orifice die is calibrated according to ASTM D 1238. A small amount of material is purged out the bottom, which is then plugged. The piston rod assembly is put in the top of the barrel. A 225 g weight may be placed on top of the piston rod to hold the rod down inside of the barrel. The polymer is held at 295° C. for 5 min. The orifice plug is then removed from the bottom of the barrel. Via a large weight and operator pressure, the extrudate is pushed out of the barrel into an ice water bath. The extrudate is patted dry, sealed in a bag and placed in a freezer until the ASTM # F2013-00 test is performed.

Alternatively, a CEAST Model 7027 Modular Melt Flow instrument is used. An AA generation program is initiated that will maintain a temperature of 295° C. and will extrude the melted PET material in 5 minutes at a constant flow rate as defined in the firmware of the instrument. As the extrudate is pushed out of the barrel and into an ice water bath, the sample is collected, patted dry, sealed in a bag and placed in a freezer until the ASTM # F2013-00 test is performed.

Acetaldehyde can be generated in polyester resins with the Ceast Model 7027 Modular Melt Flow or any similar extrusion plastometer instrument. The automated functions of this instrument reduce test variability by maintaining consistent contact times for the polymer inside the extrusion barrel. This particular model of instrument incorporates automated packing of the resin at the start of the test procedure. The instrument is equipped with a motorized platform that will push the material out of the barrel until the piston is at a specified height above the bottom of the barrel. The platform will then hold the piston rod in place, allowing the resin to heat up and generate acetaldehyde. At the end of the specified hold time, the platform extrudes the remainder of the resin out of the barrel while traveling at a constant speed. These steps eliminate the possibility of variability in results from packing the material through the final extrusion step. Variability in loading the polymer is reduced with the design of the barrel, but loading of the polymer is not automated.

Acetaldehyde can be generated in the above manner over a temperature range of 265° C. to 305° C. The most consistent results are obtained between 285° C. and 295° C. The length of time the resin is held inside the barrel shows good results when between 2 and 15 minutes. The range of 5 to 10 minutes shows the best repeatability and distinction between materials. For the AA generation numbers stated for this invention, 295° C. and 5 minutes were used.

Use of this method of acetaldehyde generation and testing allows for screening of polyester resins for acetaldehyde generation without needing large amounts of material for evaluations such as molding of bottle preforms. As little as 10 grams of material may be used in this process making it ideal for testing laboratory samples.

It is now possible to provide a feed of melt-phase-only synthesis polyester polymer particles to a subsequent melt processing step (e.g. extrusion/injection molding) having both low residual acetaldehyde and a low acetaldehyde generation rate. Advantageously, the melt phase production of the polyester particles no longer has to be controlled or restricted to the low production temperatures to produce polyester polymer particles having a low level of residual acetaldehyde (<10 ppm). Instead, a polyester polymer particle having a low level of residual acetaldehyde and a low acetaldehyde generation can now be obtained from a melt phase production of the polyester polymer with an acceptable throughput or production rate. By this method, a robust melt-phase production process with wide processing windows is feasible in which the addition of an acetaldehyde scavenger is not necessary or desirable, and permits the advancement of the polyester polymer to a high It.V. By this method, a robust melt-phase production process with wide processing windows is feasible in which the addition of an acetaldehyde scavenger is not necessary nor desirable, which allows for the use of an aluminum/alkali metal or alkaline earth metal catalyst composition, and permits the advancement of the polyester polymer to a high It.V. By deactivating the aluminum/alkali metal or alkaline earth metal catalyst such that the conversion of acetaldehyde precursors does not occur as readily in the subsequent transfer piping after the vacuum has been released in the melt-phase-only manufacturing process and during subsequent melt processing, particles fit for making preforms can be provided to an injection molding machine.

In another embodiment, polyester polymer particles having a very low level of residual acetaldehyde (<3 ppm) are obtained by the post-melt-phase-polycondensation elimination of residual acetaldehyde. Thus, once particles are obtained from the melt phase production process, the residual acetaldehyde present in the particles is reduced by conventional means or by a preferred means as described below. The amount of residual acetaldehyde in the solid particles is reduced by techniques other that solid state polymerization processes which are expensive and result in significant molecular weight advancement. Desirably, the residual acetaldehyde in the solid particles is reduced in the solid state to a level of 10 ppm or less without increasing the It.V. of the particles by more than 0.03 dL/g. In this more preferred embodiment, the particles are not remelted and devolatized in order to reduce their level of acetaldehyde, nor are the particles subjected to solid state polymerization techniques which result in advancing the It.V. of the particles more than 0.03 dL/g. More preferably, the level of residual acetaldehyde in the solid particles is reduced to a level of 5 ppm or less. Most preferably, the level of residual acetaldehyde in the solid particles is reduced to a level of 2 ppm or less.

Any conventional technique for reducing the acetaldehyde in the particles is suitable other than solid state polymerization techniques and preferably other than by remelting/devolatization. For example, the vacuum procedure described previously as part of the sample preparation for the AA generation rate test; however, on a larger scale, a vessel would replace the oven.

Another technique to reduce the level of acetaldehyde in solid particles without advancing their molecular weight beyond 0.03 dL/g is referred to herein as acetaldehyde stripping. By this method, the residual acetaldehyde of the particles is reduced by introducing the particles into a vessel to form a bed of particles within the vessel, and contacting the bed with a stream of gas introduced at a gas flow rate not exceeding 0.15 SCFM per pound of particles per hour, and withdrawing finished particles from the vessel having a reduced amount of residual acetaldehyde.

In a gas stripping operation, a gas such as air or an inert gas such as nitrogen is contacted with the polyester polymer particles either co-current or countercurrent, preferably countercurrent to the flow of the particles in a vessel in a continuous or batchwise process, preferably a continuous process. The temperature of the gas introduced into the AA stripping vessel is not particularly limited, and can range from ambient to 180° C., but preferably from ambient to 70° C., or up to about 50° C., or up to about 40° C., and more preferably about ambient. The temperature of the gas exiting the stripping vessel will approximate the temperature of the pellets introduced into the vessel. Thus, if particles are introduced at 100° C., the exit temperature of the gas will be about 100° C.+/−20° C. The temperature of the gas exiting the vessel should not exceed a temperature at which the molecular weight of the particles is advanced in the solid state by more than 0.03 dL/g. The residence time of the particles depends on the gas temperature and particle mass/gas ratio, but in general, the residence time ranges from 1 hour to 30 hours. The gas composition is not particularly limited, and includes nitrogen, carbon dioxide, or ambient air. The gas does not need to be dried, since the function of the gas is not to dry the pellets but to strip residual AA from the pellets. If desired, however, the gas may be dried.

While gas stripping of acetaldehyde may also occur in the dryer feeding the extruder for making an article, it is preferred to feed the dryer with polymer particles already having 10 ppm or less of residual acetaldehyde in order to reduce the gas flow used in the dryer and/or improve the quality of the articles made from the extruder. Moreover, in an AA stripping process, dry gas is not required to strip the AA from the particles, whereas in a drying process, a stream of dried air is circulated through the particles primarily to reduce the moisture on or in the particles with the secondary advantage of also removing AA. Thus, in an AA stripping process, ambient air can be and preferably is used as the stripping medium. Since this invention lowers residual AA levels dramatically, it may be possible in cases starting with 5 ppm residual AA or less in the melt-phase product to forgo a separate AA stripping step and lower the AA to 2 ppm or less in the dryer feeding the extruder for making an article. Dryer temperature, gas flow, desiccant type and residence time will impact the efficacy of AA stripping in the dryer feeding the extruder for making an article.

In the event that a AA stripping vessel is employed, there is provided an embodiment in which particles having an It.V. of at least 0.68 dL/g and a degree of crystallinity within a range of 20% to 55% and have a residual acetaldehyde level of 5 ppm or more or 10 ppm or more are fed to a vessel, preferably through the upper end of a vessel, as hot particles (e.g. 100° C. to 180° C.) to increase the efficiency of AA stripping and form a bed of pellets flowing by gravity toward the bottom end of the vessel while a countercurrent flow of gas such as ambient air is circulated through the bed, said gas introduced into the vessel at a temperature ranging from ambient conditions to 70° C., or from ambient to 40° C., to thereby reduce the level of residual AA on the particles introduced into the vessel. The particles are withdrawn from the vessel within about 0.5 to 30 hours of their introduction into the countercurrent stream of gas. While the vessel can be pressurized, it is preferably not pressurized except by the pressure created from the gas flow. The vessel is desirably operated at about 0-5 psig, or ambient pressure.

The level of residual acetaldehyde present on the stripped particles is 10 ppm or less, or 7 ppm or less, or 5 ppm or less, or 3 ppm or less, or 2 ppm or less, or 1.5 ppm or less. The level of residual acetaldehyde present on the particles obtained from the melt phase polycondensation and fed to a stripping vessel is generally 5 ppm or more, or 10 ppm or more, or 20 ppm or more, or 25 ppm or more, or 30 ppm or more. In another embodiment, the difference in the residual acetaldehyde levels of the pellets entering the stripping vessel and those exiting the vessel is at least 2 ppm, or at least 5 ppm, or at least 10 ppm, or at least 20 ppm, or at least 30 ppm.

The gas can be introduced into the vessel by any conventional means, such as by a blower, fans, pumps, and the like. The gas may flow co-current to or countercurrent to or across the flow of particles through the vessel. The preferred flow of gas through the bed of particles is countercurrent to the particle flow through the bed. The gas can be introduced at any desired point on the vessel effective to lower the level of acetaldehyde in the particles exiting the vessel as compared to those fed to the vessel.

Preferably, the gas introduction point is to the lower half of the bed height in the vessel, and more preferably to the lower ¼ of the bed height. The gas flows through at least a portion of the particle bed, preferably through at least 50 volume % of the bed, more preferably through at least 75% of the particle bed volume. Any gas is suitable for use in the invention, such as air, carbon dioxide, and nitrogen. Some gases are more preferred than others due to the ready availability and low cost. For example, the use of air rather than nitrogen would lead to significant operating cost improvements. It was believed that the use of nitrogen gas was required in operations which pass a hot flow of gas through a bed of particles at temperatures above 180° C., such as in a preheater or solid-stater, because nitrogen is inert to the oxidative reactions that result in pellet discoloration and which would otherwise occur between many polyester polymers and the oxygen in ambient air. However, by keeping the process temperature low such that the gas exiting the vessel does not exceed 190° C., particle discoloration is minimized. In one embodiment, the gas contains less than 90 vol % nitrogen, or less than 85 vol % nitrogen, or less than 80 vol % nitrogen. In another embodiment, the gas contains oxygen in an amount of 17.5 vol % or more. The use of air at ambient composition (the composition of the air at the plant site on which the vessel is located), or air which is not separated or purified, is preferred. Desirably, ambient air is fed through the gas inlet. While the air can be dried if desired, it is not necessary to dry the air since the object is to remove acetaldehyde from the particles.

Any vessel for containing particles and allowing a feed of gas and particles into and out of the vessel is suitable. For example, there is provided a vessel having at least an inlet for gas, and inlet for the polyester polymer particles, an outlet for the gas, and an outlet for the finished particles. The vessel is preferably insulated to retain heat. The gas inlet and the finished particle outlet are desirably located below the gas outlet and the particle inlet, preferably with the gas outlet and particle inlet being toward the top of the vessel and the gas inlet and finished particle outlet being toward the bottom of the vessel. The gas is desirably introduced into the bed within the vessel at about ½ or more desirably at about the lower ¼ of the bed height within the vessel. The particles are preferably introduced at the top of the vessel, and move by gravity to the bottom of the vessel, while the gas preferably flows countercurrent to the direction of the particle flow. The particles accumulate within the vessel to form a bed of particles, and the particles slowly descend down the length of the vessel by gravity to the finished particle outlet at the bottom of the vessel. The bed height is not limited, but is preferably at a substantially constant height in a continuous process and is at least 75% of the height of the vessel containing the particles within the stripping zone. The vessel preferably has an aspect ratio L/D of at least 2, or at least 4, or at least 6. While the process can be conducted in a batch or semi batch mode in which as the particles would not flow and the stream of gas can be passed through the bed of particles in any direction, the process is preferably continuous in which a stream of particles continuously flows from the particle inlet to the finished particle outlet as the particles are fed to the vessel.

A suitable gas flow rate introduced into the vessel and passing through at least a portion of the particle bed is one which is sufficient to lower the amount of residual acetaldehyde on the particles exiting the vessel as compared to those introduced into the vessel. For example, for every one (1) pound of particles charged to the vessel per hour, suitable gas flow rates introduced into the vessel are at least 0.0001 standard cubic feet per minute (SCFM), or at least 0.001 SCFM, or at least 0.005 SCFM. High flow rates are also suitable, but not necessary, and the gas flow rate should be kept sufficiently low to avoid unnecessary energy consumption by the gas pumps, fans, or blowers. Moreover, it is not desired to unduly cool the particles or dry the particles because the achievement of either or both of these objectives typically requires the use of high gas flow rates. The gas flow rate is preferably not any higher than 0.15 SCFM, or not higher than 0.10 SCFM, or not higher than 0.05 SCFM, or even not higher than 0.01 SCFM for every one (1) pound of charged particles per hour.

The solid particles produced in the melt phase process preferably have an acetaldehyde generation rate, when measured at 295° C. for 5 minutes, of 20 ppm or less, or 18 ppm or less, or 16 ppm or less, or 13 ppm or less, or 11 ppm or less, or 10 ppm or less, or 8 ppm or less. The process of the invention does not require melting the particles at 295° C. for 5 minutes to make molded articles.

PET samples catalyzed by the levels of Li/Al studied have lower peak temperatures for crystallization upon cooling from the melt ($T_{cc}$) than the Sb controls. As $T_{cc}$ decreases, this indicates that the crystallization rate from the melt is slower. Slower crystallization rates from the melt enable the use of lower extruder barrel temperatures, which in turn require shorter cooling times and result in shorter injection molding cycle times. Converters will value the productivity increases associated with reduced injection molding cycle times.

PET samples catalyzed by the higher Li and Al levels studied at the lower polymerization temperatures studied have lower peak temperatures for crystallization upon heating from the glass ($T_{ch2}$) than the Sb controls. The sample with the lowest $T_{ch2}$ also has a phosphorus compound added late. As $T_{ch2}$ decreases, this indicates that the crystallization rate from the glass is faster. Faster crystallization from the glass is desirable in thermoformable tray applications and for resin producers who crystallize amorphous pellets optionally prior to polymerizing in the solid state.

In another embodiment, the level of AA in a preform is 11 ppm or less, or 9 ppm or less, or 7 ppm or less, as measured on a preform molded with a barrel temperature of 285° C. and a residence time of 108 seconds.

In yet another embodiment, the free AA on solid particles fed to a melt zone for making articles is 10 ppm or less, or 7 ppm or less, or 5 ppm or less, or 3 ppm or less.

In another embodiment, the AA level of the polyester compositions, bottles, preforms, particles or any other form of a polyester polymer is 10 ppm or less, or 7 ppm or less, or 5 ppm or less, or 3 ppm or less.

The particles of the invention are directly or indirectly packaged as a bulk into shipping containers, which are then shipped to customers or distributors. It is preferred to subject the crystallized particles to any process embodiment described herein without solid state polymerizing the particles at any point prior to packaging the particles into shipping containers. With the exception of solid state polymerization, the particles may be subjected to numerous additional processing steps in-between any of the expressed steps.

Shipping containers are containers used for shipping over land, sea or air. Examples include railcars, semi-tractor trailer containers, Gaylord boxes, ship hulls, or any other container which is used to transport finished polyester particles to a customer. Customers are typically converter entities who convert the particles into preforms or other molded articles.

The shipping containers contain a bulk of polyester polymer particles. A bulk occupies a volume of at least 3 cubic meters. In preferred embodiments, the bulk in the shipping container occupies a volume of at least 5 cubic meters, or at least 10 cubic meters.

In one embodiment, there is provided finished polyester polymer particles having an average It.V. of at least 0.68 dL/g, or at least 0.70 dL/g, or at least 72 dL/g, or at least 0.74 dL/g, or at least 0.76 dL/g obtained in a melt phase polymerization and a residual acetaldehyde level of 10 ppm or less or 5 ppm or less; wherein said particles comprise the compositions stated herein. Preferably, the polymer particles contain polyester polymers, aluminum atoms in an amount of at least 5 ppm, or at least 10 ppm, or at least 15 ppm, or at least 20 ppm based on the weight of the polymers, alkaline earth metal or alkali metals in an amount of at least 25 ppm, and phosphorus atoms in an amount of at least 30 ppm, and optionally titanium atoms in an amount of at least 5 ppm. Preferably, the polyester particles in the shipping container also have a degree of crystallinity of at least 20%, preferably at least 30% and also contain a nonzero level of an alkaline earth metal or alkali earth metal or an alkali metal, along with a non-zero level of phosphorus, and one or more of the reheat rate enhancing metals described above. More preferably, the AA generation rate of such particles is less than 20 ppm, or less than 18 ppm, or less than 16 ppm, and the particles have an L* brightness of at least 70, or at least 73, or at least 76, and lack organic AA reducing additives. The particles are desirably contained in a shipping container. Most preferably, the particles have not been solid state polymerized and are shipped as finished particles. By "finished" particles is meant particles that have been subjected by the particle manufacturer to all the processing conditions needed to produce a particle ready for feeding into dryer hoppers associated with a molding machine or directly to a molding machine used for converting particles into articles, without any further processing steps performed by the particle manufacturer.

Articles can be formed from the melt phase products by any conventional techniques known to those of skill. For example, melt phase products, optionally solid state polymerized, which are crystallized to a degree of crystallization of at least 20%, are fed to a machine for melt extruding and injection molding the melt into shapes such as preforms suitable for stretch blow molding into beverage or food containers, or rather than injection molding, merely extruding into other forms such as sheet. Suitable processes for forming the articles are known and include extrusion, extrusion blow molding, melt casting, injection molding, a melt to mold process, stretch blow molding (SBM), thermoforming, and the like.

Examples of the kinds of shaped articles which can be formed from the melt phase products and the polyester polymer composition of the invention include sheet; film; packaging and containers such as preforms, bottles, jars, and trays; rods; tubes; lids; and filaments and fibers. Beverage bottles made from polyethylene terephthalate suitable for holding water or carbonated beverages, and heat-set beverage bottles suitable for holding beverages which are hot filled into the bottles are examples of the types of bottles which are made from the crystallized pellet of the invention. Examples of trays are those which are dual ovenable and other CPET trays.

Suitable methods for making articles comprise:
(i) introducing solid polyester polymer particles comprising:
aluminum residues;
alkaline earth metal residues or alkali residues;
phosphorus;
a degree of crystallinity of at least 20%; and
a residual acetaldehyde level of 10 ppm or less, and lacking organic acetaldehyde scavengers,
into a melt processing zone and melting the particles to form a molten polyester polymer composition; and
(ii) forming an article comprising a sheet, strand, fiber, or a molded part from the molten polymer composition;
wherein the article further contains atoms of titanium, zirconium, vanadium, niobium, hafnium, tantalum, chromium, tungsten, molybdenum, iron, or nickel or combinations thereof.

The transition metals improve the reheat rate of the article. The transition metal atoms may be incorporated into the article by providing polyester polymer particles containing the transition metal atoms, or by feeding to the melt processing zone a feed of the transition metal atoms.

In another embodiment, there is provided a polyester polymer composition, polyester polymer particles, a bulk of polyester particles in a shipping container, or a feed of polyester particles to a melt mixing zone, in which the polyester composition or a polyester melt in a melt mixing zone for making the article comprises:
(1) 10 to 50 ppm Li (based on polymer weight and on the lithium atoms), added in the form of a lithium compound such as lithium acetate or lithium hydroxide;
(2) 10 to 50 ppm Al (based on polymer weight and on aluminum atoms) added in the form of an aluminum compound such as aluminum acetate or aluminum isopropoxide;
(3) titanium based particles, such as titanium nitride containing particles of the size of about 15 to 60 nm in amount of about 1 to 30 ppm (based on polymer weight and on titanium atoms) and
(4) phosphorus atoms in the amount ranging from 80 ppm to about 200 ppm, or up to about 170 ppm (based on the phosphorus content in the final polymer), or at a molar ratio of P:M where M is deemed to be the cumulative molar total of aluminum, alkaline earth metals, and alkali metals, is generally at least 0.1:1, or at least 0.3:1, or at least 0.5:1, or at least 0.7:1, or at least 1:1, and up to about 5:1, or more preferably up to about 3:1, or up to 2:1, or up to 1.8:1, or up to 1.5:1 preferably added at the completion of the polycondensation reaction.

The catalyst stabilizer/deactivator added in the melt phase inhibits the catalyst residues in the polymer from converting acetaldehyde precursors to acetaldehyde. In this embodiment, the particles fed to the melt processing zone are preferably not solid-state polymerized. The polyester particles made by melt-phase-only synthesis desirably have a small surface to center molecular weight gradient and undergo less It.V. loss during melt processing than conventional polyesters. For example, bottles and/or preforms, and in particular beverage bottles such as carbonated soft drink or water bottles are made from the particles of the invention and the It.V. difference between the It.V. of the particles and the It.V of the preforms and/or bottles is not more than 0.04 dL/g, preferably not more than 0.03 dL/g, and most preferably not more than 0.02 dL/g.

In another embodiment, the molded article preferably lacks an organic acetaldehyde scavenger. Preferably, ingredients added to the solid polyester particles at the melt processing step do not include organic acetaldehyde scavengers.

At the melt processing extruder, other components can be added to the extruder to enhance the performance properties of the pellets. These components may be added neat to the bulk polyester pellets or in a liquid carrier or can be added to the bulk polyester pellets as a solid polyester concentrate containing at least about 0.5 wt. % of the component in the polyester polymer let down into the bulk polyester. The types of suitable components include crystallization aids, impact modifiers, surface lubricants, denesting agents, compounds, antioxidants, ultraviolet light absorbing agents, colorants, nucleating agents, other reheat rate enhancing aids, sticky bottle additives such as talc, and fillers and the like can be included. All of these additives and many others and their use are well known in the art and do not require extensive discussion.

As described above, the catalyst deactivators are added late in the course of polycondensation or thereafter but before solidification. In addition to the embodiment where the total amount of deactivator is added during the melt phase process for making the polyester polymer, in another embodiment, a portion of the total amount of deactivator is added to the polyester polymer in at least two stages, once in the melt phase process for making the polyester polymer and again at any point after the polyester polymer is solidified and before the article is formed from the polyester polymer, such as during melt processing the polyester polymer to make an article as conventionally done in an extruder or injection molding machine for making the article. In yet a further embodiment, the total amount of the deactivator is added after solidification and before making the article.

Partial or total addition of the phosphorus compound after solidification from a melt phase manufacturing process may be accomplished by either melt compounding the catalyst deactivator with the polyester polymer particles to form a solid concentrate of polyester polymer particles containing randomly dispersed catalyst deactivator compounds, after which the concentrate is fed to the melt processing zone for making an article along with a feed stream of polyester particles; or a stream of catalyst deactivator compounds can be added directly as a neat stream, or in a slurry or dispersion made with a liquid carrier, together with a stream of the polyester polymer particles to the melt processing zone to make the articles. Thus, there is provided an embodiment in which amorphous polyester polymers are produced from a melt phase process without a catalyst deactivator added late, followed by blending the catalyst deactivator with the polyester polymer by a compounding extrusion or in the extruder portion of the injection molding process such as that used to melt blend dry, liquid, or molten ingredients into a stream of polyester polymer in an extruder, or that used to make a molded article by an extrusion in the injection molding process, or blending in any other mixing device.

Examples of other reheat rate enhancing additives that may be used in combination with reheat particles include carbon black, antimony, tin, copper, silver, gold, palladium, platinum, black iron oxide, and the like, as well as near infrared absorbing dyes, including, but not limited to, those disclosed in U.S. Pat. No. 6,197,851, incorporated herein by reference.

The compositions of the present invention optionally may contain one or more additional UV-absorbing compounds. One example includes UV-absorbing compounds which are covalently bound to the polyester molecule as either a comonomer, a side group, or an end group. Suitable UV-absorbing compounds are thermally stable at polyester processing temperatures, absorb in the range of from about 320 nm to about 380 nm, and migrate minimally from the polymer. The UV-absorbing compounds preferably provide less than about 20%, more preferably less than about 10%, transmittance of UV light having a wavelength of 370 nm through a bottle wall or sample that is 0.012 inches thick. Suitable chemically reactive UV absorbing compounds may include, for example, substituted methine compounds.

Suitable compounds, their methods of manufacture and incorporation into polyesters are further disclosed in U.S. Pat. No. 4,617,374, the disclosure of which is incorporated herein by reference. Other suitable UV-absorbing materials include benzophenone, benzotriazole, triazine, benzoxazinone derivatives. These UV-absorbing compound(s) may be present in amounts between about 1 ppm to about 5,000 ppm by weight, preferably from about 2 ppm to about 1,500 ppm, and more preferably between about 10 ppm and about 1000 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

In addition to or instead of adding the catalyst deactivator/stabilizer to the melt phase process, the catalyst deactivator/stabilizer may optionally be added to polyester polymer particles after solidification of the polyester melt from a melt phase process and before forming an article. This may be accomplished by either melt compounding the catalyst deactivator/stabilizer with the polyester polymer particles to form a solid concentrate of polyester polymer particles containing randomly dispersed catalyst deactivator/stabilizer compounds, after which the concentrate is fed to the melt processing zone for making an article along with a feed stream of polyester particles; or a stream of catalyst deactivator/stabilizer compounds can be added directly to the melt processing zone to make the articles as a neat stream or in a slurry or dispersion, together with a stream of the polyester polymer particles. Thus, there is provided an embodiment in which amorphous polyester polymers are produced from a melt phase process without a catalyst deactivator added late, followed by blending the catalyst deactivator with the polyester polymer by a compounding extrusion or in the extruder portion of the injection molding process such as that used to melt blend dry, liquid, or molten ingredients into a stream of polyester polymer in an extruder, or that used to make a molded article by an extrusion or injection molding process, or that used in any other mixing device.

In this embodiment, the mixing device where the catalyst deactivator/stabilizer is introduced may be part of the injection molding process, or it may be a separate step prior to injection molding. The catalyst deactivator/stabilizer may be introduced neat, in a liquid carrier or via a polymer concentrate. Introduction neat or in a liquid carrier is more preferred since reaction with the catalyst in the polymer carrier may lower effectiveness. If the catalyst deactivator/stabilizer is a liquid and is added neat, a mixer at ambient conditions could be used to coat the pellets with the liquid additive prior to entry into an extruder. If the polymer concentrate route is used, the concentrate pellets could be dry blended at ambient conditions with the solid-stated pellets to make a 'salt and pepper' type blend. These same comments and approaches apply to melt blending the catalyst deactivator/stabilizer with pellets made exclusively in the melt-phase.

This embodiment is particularly useful if the pellets are solid state polymerized. Incorporating the catalyst deactivator/stabilizer in the melt phase may in some instances lower the solid-stating rate. If one desires to solid state polymerize the polyester pellets, it is advantageous to add the catalyst deactivator/stabilizer after the pellets have undergone a solid state polymerization process.

In addition to adding the transition metal reheat particles to virgin polymer, whether to make a concentrate, or added neat or as a dispersion to the melt phase after the prepolymerization reactors or to an injection molding zone, reheat particles may also be added to post-consumer recycle (PCR) polymer. PCR containing reheat particles is added to virgin bulk polymers by solid/solid blending or by feeding both solids to an extruder.

Alternatively, PCR polymers containing reheat particles are advantageously added to the melt phase for making virgin polymer between the prepolymerization zone and the finishing zone. The It.V. of the virgin melt phase after the prepolymerization zone is sufficiently high at that point to enable the PCR to be melt blended with the virgin melt. Alternatively, PCR may be added to the finisher. The particles may be combined with PCR by any of the methods noted above, or separately fed to and melt blended in a heated vessel, followed by addition of the PCR melt containing the particles to the virgin melt phase at these addition points.

The polyesters of this invention may also, optionally, contain color stabilizers, such as certain cobalt compounds. These cobalt compounds can be added as cobalt acetates or cobalt alcoholates (cobalt salts or higher alcohols). They can be added as solutions in ethylene glycol. Polyester resins containing high amounts of the cobalt additives can be prepared as a masterbatch for extruder addition. The addition of the cobalt additives as color toners is a process used to further minimize or eliminate the yellow color, measured as b*, of the resin. Other cobalt compounds such as cobalt aluminate, cobalt benzoate, cobalt chloride and the like may also be used as color stabilizers. It is also possible to add certain diethylene glycol (DEG) inhibitors to reduce or prevent the formation of DEG in the final resin product. Preferably, a specific type of DEG inhibitor would comprise a sodium acetate-containing composition to reduce formation of DEG during the esterification and polycondensation of the applicable diol with the dicarboxylic acid or hydroxyalkyl, or hydroxyalkoxy substituted carboxylic acid. It is also possible to add stress crack inhibitors to improve stress crack resistance of bottles, or sheeting, produced from this resin.

Specific uses for the polyester polymers of the invention include preforms to make bottles, preformed trays, preformed cups, and the like, which are heated and drawn to form the final product. Yet another use relates to polyester yarn or filaments or fiber which is forced through a plurality of spinnerets having an infrared quench collar thereabout. Additionally, the present invention is applicable to highly transparent, clear and yet low haze powdered coatings wherein a desired transparent film or the like is desired. Because of the improved UV-blocking effect of the inventive compositions, a further use is in injection-molded bottles, such as those intended for juice packaging. Similarly, when used as a bluing agent such as titanium nitride particles, the packages have improved color, regardless of whether improved reheat is a necessary effect for the packaging application.

The impact of a reheat additive on the color of the polymer can be judged using a tristimulus color scale, such as the CIE L*a*b* scale. The L* value ranges from 0 to 100 and measures dark to light. The a* value is the redness-greeness opponent-color coordinate, with positive a* values being red and negative a* values being green. The b* value is the yellowness-blueness opponent-color coordinate, with positive b* values being yellow and negative b* values being blue.

Color measurement theory and practice are discussed in greater detail in *Principles of Color Technology*, pp. 25-66 by Fred W. Billmeyer, Jr., John Wiley & Sons, New York (1981), incorporated herein by reference.

L* values for the polyester compositions as measured on twenty-ounce bottle preforms discussed herein should generally be greater than 45, or at least 60, or at least 65, or at least 70, or at least 75, or at least 78, or at least 80, or at least 85. Specifying a particular L* brightness does not imply that a preform having a particular sidewall cross-sectional thickness is actually used, but only that in the event the L* is measured, the polyester composition actually used is, for purposes of testing and evaluating the L* of the composition, injection molded to make a preform having a thickness of 0.154 inches.

The color of a desirable polyester composition is generally indicated by an a* coordinate value preferably ranging from about minus 4.4 to plus 1.6, or minus 2.0 to about plus 0.5 or from about minus 2.0 to about plus 0.1. With respect to a b* coordinate value, it is generally desired to make a bottle preform having a b* value coordinate ranging from −8.6 to +10.2, or from −3.0, or from −1.5, to a positive value of less than 5.0, or less than 4.0, or less than 3.8, or 3.0 or less, or 2.6 or less. These color values are as indicated on the polyester in any form, whether amorphous pellets ground to a powder passing a 300 mesh, or on a preform or bottle sidewall. In a preferred embodiment, these color values are as measured on a twenty-ounce bottle preforms having a nominal sidewall cross-sectional thickness of 0.154 inches.

The measurements of L*, a* and b* color values are conducted according to the following method. The instrument used for measuring b* color should have the capabilities of a HunterLab UltraScan XE, model U3350, using the CIE Lab Scale (L*, a*, b*), D65 (ASTM) illuminant, 10° observer and an integrating sphere geometry. Clear plaques, films, preforms, and bottles are tested in the transmission mode under ASTM D1746 "Standard Test Method for Transparency of Plastic Sheeting." The instrument for measuring color is set up under ASTM E1164 "Standard Practice for Obtaining Spectrophotometric Data for Object-Color Evaluation."

More particularly, the following test methods can be used, depending upon whether the sample is a preform, or a bottle. Color measurements should be performed using a HunterLab UltraScan XE (Hunter Associates Laboratory, Inc., Reston Va.), which employs diffuse/8° (illumination/view angle) sphere optical geometry, or equivalent equipment with these same basic capabilities. The color scale employed is the CIE L*a*b* scale with D65 illuminant and 10° observer specified.

Preforms having a mean outer diameter of 0.846 inches and a wall thickness of 0.154 inches are measured in regular transmission mode using ASTM D1746, "Standard Test Method for Transparency of Plastic Sheeting". Preforms are held in place in the instrument using a preform holder, available from HunterLab, and triplicate measurements are averaged, whereby the sample is rotated 90° about its center axis between each measurement.

In some embodiments, the polyester compositions containing titanium nitride particles, and preforms made from these compositions, may have a b* color of less than 10.2, or less than 3.5, or less than 3, and in any case greater than minus 2, or greater than minus 9.

Preforms containing titanium nitride particles often show a blue tint (a lower b* value than control samples).

A variety of other articles can be made from the polyester compositions of the invention, including those in which reheat is neither necessary nor desirable. Articles include sheet, film, bottles, trays, other packaging, rods, tubes, lids, fibers and injection molded articles. Any type of bottle can be made from the polyester compositions of the invention. Thus, in one embodiment, there is provided a beverage bottle made from PET suitable for holding water. In another embodiment, there is provided a heat-set beverage bottle suitable for holding beverages which are hot-filled into the bottle. In yet another embodiment, the bottle is suitable for holding carbonated soft drinks. Further, in yet another embodiment, the bottle is suitable for holding alcoholic beverages.

In one another embodiment of the invention, there is thus provided a polyester beverage bottle made from a preform, wherein the preform has a RIT of 5° C. or more, and an L* value of 70 or more.

This invention can be further illustrated by the additional examples of embodiments thereof, although it will be understood that these examples are included merely for purposes of illustration and are not intended to limit the scope of the invention.

Example 1

Li/Al Catalyst System

A catalyst solution containing 0.27 wt % Li was prepared by combining 3.97 g lithium acetate dihydrate (obtained from Aldrich Chemical Co.) and 96.03 g distilled water. Another catalyst solution containing 0.32 wt % Al was prepared by combining 1.71 g aluminum acetate containing boric acid stabilizer ($CH_3CO_2Al(OH)_2 \cdot \frac{1}{3}H_3BO_3$) (obtained from Aldrich Chemical Co.) and 98.29 g distilled water.

PET oligomer was prepared by charging purified terephthalic acid (PTA), purified isophthalic acid (PIA) and ethylene glycol (EG) to a 2-L autoclave. The charged amounts were as follows: 651.0 g PTA, 13.0 g PIA and 396.0 g EG. The raw materials were reacted at 245° C. and 40 psig for 200 minutes. At the end of the reaction, the oligomer was discharged from the reactor and allowed to solidify at room temperature and was then pulverized to a coarse powder.

In a second step, a polymer was prepared from the oligomer in the following manner. Oligomer (111 g), Li catalyst solution (1.0 g) and Al catalyst solution (1.0 g) were charged to a 500-mL polymerization flask which was equipped with a polymer head, an overhead stirrer, a nitrogen inlet, a dry-ice condensing trap, vacuum source, and a molten metal bath as a heating source. The targeted amounts of catalyst and additives based on the final polymer weight were 27 ppm Li and 33 ppm Al. The polymerization reaction was carried out in two stages using the following conditions:

Stage 1: 285° C., 25 torr, 20 min
Stage 2: 285° C., 0.5 torr, 70 min

At the end of Stage 2, the pressure was increased to 700 torr, and a charge of 0.144 g of an oligomeric ester of phosphoric acid having one free acid site as a catalyst deactivator/stabilizer was added to the molten polymer. Pressure was reduced to 2 torr and the deactivator/stabilizer was incorporated by stirring for 10 minutes. The target phosphorus level based on the final polymer weight was 120 ppm. At the end of the reaction, the polymer was recovered and ground through a 3 mm screen using a Wiley Mill.

The concentration of Li, Al and P in the polymer was determined by inductively coupled plasma optical emission spectroscopy (ICP-OES). The intrinsic viscosity (It.V.) of the polymer was determined according to ASTM method D 5225-98. Solution haze was measured using a Hach Ratio Turbidimeter according to analytical test method BKCA-A-AS-G-TBA-0001-02.

Three clear, molded discs were prepared from the samples using a Daca MicroCompounder/MicroInjector. The molded discs had a thickness of 67-mil and a diameter of 2.9 cm. The approximate chip molding conditions were as follows: 278° C. screw temperature, 283° C. barrel temperature, 14° C. mold temperature, 120 psi injection pressure, and 1.4 scfh nitrogen flow to the feed throat.

Color measurement (L*, a*, b* and haze) on the discs was performed using a HunterLab UltraScan XE (Hunter Associates Laboratory, Inc., Reston Va.), which employs diffuse/8° (illumination/view angle) sphere optical geometry. The color scale employed was the CIE LAB scale with D65 illuminant and 10° observer specified. Three chips were stacked together to give a sample of approximately 200 mil (0.51 cm) thickness. The three chips were stacked together and placed in the sample holder inside the instrument such that the area of largest surface area was placed perpendicular to the light source. The color measurements were made in the total transmission (TTRAN) mode, in which both light transmitted directly through the sample and light that is diffusely scattered is measured. Color in transmission at any thickness can be recalculated according to the following:

$$T_h = T_o 10^{-\beta h}$$

$$\beta = \frac{\log_{10}(T_o/T_d)}{d}$$

where
$T_k$=transmittance at target thickness
$T_o$=transmittance without absorption
$\beta$=Absorption coefficient
$T_d$=transmittance measured for sample
h=target thickness
d=thickness of sample Haze is defined as the scattering of light within or at the surface of a nearly clear specimen, which is responsible for cloudy appearance seen in transmission. A transmission haze measurement is a ratio of the diffuse light to the total light transmitted by a specimen, and is calculated according to the following formula:

$$\text{Haze} = \left(\frac{Y_{\text{Diffuse transmission}}}{Y_{\text{Total transmission}}}\right) \times 100$$

(Note that haze measurements on the HunterLab UltraScan XE do not conform to ASTM method D1003 because of differences in the instrument geometry.)

The reheat rate of each of the molded discs was determined as follows. The disc was placed onto a support which was in contact with the sample along its edges only. An actuator then automatically moved the disc beneath a pyrometer and measured the initial temperature ($T_i$). The disc was then moved to a fixed distance below a lamp housing equipped with a bulb (GE DYH projection bulb, 250 W, 120 V) operating at 60 V. The sample was exposed to a radiant light for 20 seconds. The color temperature of the lamp was approximately 2,200° C. After heating, the disc was automatically returned to the pyrometer where the surface temperature ($T_f$) of the center area of the side which faced the lamp (front side) was recorded two seconds after the lamp was turned off. A 90-second cooling cycle was used between consecutive tests; during which a fan cooled the lamp housing prior to loading the next sample. The RIT is calculated by subtracting the $T_f$ of the control without reheat additive from the $T_f$ of the sample containing the reheat additive.

Example 2

Li/Al Catalyst System and Titanium Nitride (TiN)

The procedure of Example 1 was followed, except that titanium nitride (TiN) was added to the polymer. The TiN nanopowder was obtained from Nanostructured & Amorphous Materials (catalog number 5350KE). The nominal particle size was 25 nm, and the measured d50 particle size was 15 nm as determined by transmission electron microscopy (TEM). A dispersion containing 0.25 wt % TiN was prepared by combining 0.315 g TiN along with 124.685 g EG. A portion of the TiN dispersion (0.27 g) was added to the oligomer along with the Li and Al catalyst solutions. The targeted level of TiN based on the final polymer weight was 6.8 ppm TiN. The Ti concentration in the polymer was determined by x-ray fluorescence (XRF). The RIT was determined as described above.

Conclusions Based on the Examples

The results for the examples are given in the Table. Example 1 shows the results for a polyester made with a Li/Al catalyst system and post-polycondensation addition of a phosphorus stabilizer. The polymer is bright (i.e. high L*) and clear (i.e. low haze) and has a high It.V. and a high b* (6.13).

Example 2 shows the improvement in reheat rate and color attributed to the addition of titanium nitride particles. The RIT is 4.2° C., and the b* decreases to 2.61 (i.e. a shift toward a more bluish color). Furthermore, the addition of the titanium nitride particles did not significantly increase the haziness of the polymer, as seen in the solution haze and disc haze results. An advantage of the blueness imparted by the titanium nitride particles is that the amount of blue toner which is added during the manufacturing process to mask the yellow color of the polymer could be decreased.

What we claim is:

1. A polyester composition comprising a polyester polymer and:
   a) aluminum atoms;
   b) lithium atoms;
   c) phosphorus atoms, wherein the amount of the phosphorus atoms ranges from 30 ppm to 400 ppm, based on the weight of the polyester polymer; and
   d) particles comprising titanium nitride, said particles improving the reheat rate of the polyester composition, wherein the polyester composition has an L* value of 70 or more as measured on a twenty ounce bottle preform having a nominal sidewall cross-sectional thickness of 0.154 inches.

2. The polyester composition of claim 1, wherein the particles further comprise at least one metal selected from the group consisting of a titanium atom, a zirconium atom, a vanadium atom, a niobium atom, a hafnium atom, a tantalum atom, a chromium atom, a tungsten atom, a molybdenum atom, an iron atom, and a nickel atom.

3. The polyester composition of claim 2, wherein the particles have a median particle size ranging from 1 nm to about 500 nm.

4. The polyester composition of claim 3, wherein the particles are present in an amount ranging from 1 ppm to 50 ppm, with respect to the total weight of the polyester composition.

5. The polyester composition of claim 1, wherein the polyester composition is in the form of a beverage bottle preform.

6. The polyester composition of claim 5, wherein the beverage bottle preform has a reheat improvement temperature (RIT) of at least 5° C., a preform L* value of 70 or more, and a b* value ranging from −8 to +5.

7. The polyester composition of claim 1, wherein the particles comprise the titanium nitride having an empirical formula ranging from $TiN_{0.42}$ to about $TiN_{1.16}$.

8. The polyester composition of claim 1, wherein the particles comprise the titanium nitride in an amount of at least 90 wt. %, with respect to the total weight of the particles.

9. The polyester composition of claim 1, wherein the particles have a particle size distribution with a span (S) ranging from 0.01 to 2.

10. The polyester composition of claim 1, wherein the polyester polymer is obtained by
    reacting an acid component comprising at least 85 mole % of terephthalic acid, naphthalenic acid, or at least one $C_1$-$C_4$ dialkyl ester thereof,
    with a diol component comprising at least 90 mole % ethylene glycol,
    based on a mole percentage for all acid components totaling 100 mole %, and the mole percentage for all diol components totaling 100 mole %.

11. The polyester composition of claim 10, wherein the acid component further comprises isophthalic acid, cyclohexanedicarboxylic acid, naphthalene-2,6-dicarboxylic acid, or a combination thereof, in an amount of greater than zero to less than 15 mole %.

TABLE

| Ex | TiN (ppm) | Cat | It.V. (dL/g) | Metals Analysis (ppm) ||||| Solution Haze (ntu) | Disc Color |||| RIT (° C.) |
|---|---|---|---|---|---|---|---|---|---|---|---|---|---|---|
| | | | | Li | Al | P | Ti | Sb | | L* | a* | b* | Haze | |
| 1 | None | Li/Al | 0.856 | 26 | 30 | 129 | 0 | 0 | 2.3 | 87.99 | −1.45 | 6.13 | 3.37 | 0 |
| 2 | 6.8 | Li/Al | 0.861 | 27 | 39 | 130 | 5 | 0 | 7.2 | 79.18 | −1.43 | 2.61 | 3.73 | 4.2 |

12. The polyester composition of claim 10, wherein the diol component further comprises diethylene glycol, 1,4-cyclohexanedimethanol, or a combination thereof, in an amount of greater than zero to less than 10 mole %.

13. The polyester composition of claim 1, wherein the particles do not cause an increase in the It.V. of the polyester polymer during its manufacture of more than 0.10 dL/g.

14. The polyester composition of claim 1, wherein the particles are coated with a layer of metal oxide.

15. The polyester composition of claim 1, wherein the titanium nitride comprises relative amounts of titanium, carbon, and nitrogen corresponding to the formula $Ti_aC_xN_y$, wherein
a ranges from 1-2,
x ranges from 0.0 to 0.8, and
y ranges from 0.1 to 1.0.

16. The polyester composition of claim 1, wherein the particles have a median particle size ranging from 0.001 μm to 5 μm.

17. The polyester composition of claim 1, wherein the particles have a mean particle size ranging from 5 nanometers to 60 nanometers.

18. The polyester composition of claim 17, wherein the amount of particles comprising titanium nitride ranges from 1 ppm to 20 ppm based on the titanium atoms relative to the weight of the polyester polymer.

19. The polyester composition of claim 1, wherein the polyester composition is in the form of a bottle preform having a final reheat temperature of at least 110° C.

20. The polyester composition of claim 1, wherein the amount of aluminum atoms ranges from 10 ppm to 100 ppm based on the weight of the polyester polymer.

21. The polyester composition of claim 20, wherein the aluminum atoms are derived from an aluminum organic compound.

22. The polyester composition of claim 21, wherein the aluminum organic compound has a formula $Al[OR]_a[OR']_b[OR'']_c[R''']_d$, wherein
R, R', R'' are independently an alkyl group, aryl group, acyl group, or hydrogen,
R''' is an anionic group,
a, b, c, d are independently 0 or positive integers, and
a+b+c+d is no greater than 4.

23. The polyester composition of claim 21, wherein the aluminum organic compound is at least one selected from the group consisting of a carboxylic acid salt of aluminum, an aluminum alcoholate, an aluminum hydroxide, an aluminum halide, and an aluminum hydroxyhalide.

24. The polyester composition of claim 1, wherein the lithium atoms are derived from at least one lithium salt or complex comprising a counterion of a hydroxide, an amine, an amine derivative, a carbonate, or a halide.

25. The polyester composition of claim 1, wherein the amount of the lithium atoms in the polyester polymer ranges from 4 ppm to 250 ppm, based on the weight of the polyester polymer.

26. The polyester composition of claim 25, wherein the amount of the lithium atoms ranges from 25 ppm to 100 ppm, based on the weight of the polyester polymer.

27. The polyester composition of claim 1, wherein the molar ratio of the lithium atoms:aluminum atoms ranges from 1:1 to 5:1.

28. The polyester composition of claim 1, wherein the quantity of phosphorus atoms ranges from 75 ppm to 300 ppm.

29. The polyester composition of claim 1, wherein the molar ratio of the phosphorus atoms to the total of the aluminum atoms, and the lithium atoms, measured as the number of metal atoms, ranges from 0.5:1 to 3:1.

30. The polyester composition of claim 1, wherein the It.V. of the polyester polymer obtained from a melt phase polymerization reaction is at least 0.72 dL/g.

31. The polyester composition of claim 1, wherein the polyester polymer is partially crystallized to a degree of at least 30 percent.

32. The polyester composition of claim 1, wherein the polyester composition has an acetaldehyde generation rate of less than 15 ppm.

33. The polyester composition of claim 1, wherein the lithium atoms are derived from a lithium compound and the lithium atoms are present in an amount ranging from 10 ppm to 50 ppm,
wherein the aluminum atoms are present in an amount ranging from 10 ppm to 50 ppm and the aluminum atoms are derived from an aluminum compound, and
wherein the particles have a median particle size ranging from 5 nm to 60 nm and the particles are present in an amount ranging from of 5 ppm to 50 ppm based on the titanium atoms,
each as based on the weight of the polyester polymer.

34. The polyester composition of claim 33, wherein the phosphorus atoms are present in an amount ranging from 100 ppm to 250 ppm and the polyester composition has an acetaldehyde generation rate of less than 15 ppm.

35. A bottle preform made from the polyester composition of claim 34, having a b* of less than 3.0.

36. A polyester composition, comprising:
a polyester polymer obtained by adding particles comprising titanium nitride to a melt phase process for manufacturing the polyester polymer or at any time thereafter,
wherein the polyester polymer is obtained by polycondensing a polyester polymer melt in the presence of aluminum atoms, lithium atoms, and phosphorus atoms,
wherein the amount of the phosphorus atoms ranges from 30 ppm to 400 ppm, based on the weight of the polyester polymer,
wherein the polyester composition has an L* value of 70 or more as measured on a twenty ounce bottle preform having a nominal sidewall cross-sectional thickness of 0.154 inches.

37. The polyester composition of claim 36, wherein the particles have a median size ranging from 1 nm to 500 nm.

38. The polyester composition of claim 36, wherein the amount of particles present in the polyester composition ranges from 5 ppm to 50 ppm based on the titanium atoms,
wherein the particles present in the polyester composition have a median particle size ranging from 0.001 μm to 5 μm, and
wherein the aluminum atoms are present in an amount ranging from 4 ppm to 100 ppm.

39. The polyester composition of claim 36, wherein the It.V. of the polyester polymer obtained from the polycondensing is at least 0.72 dL/g.

40. The polyester composition of claim 36, wherein the aluminum atoms are added to the melt phase process before the It.V. of the polyester polymer has reached 0.3 dL/g.

41. The polyester composition of claim 36, wherein the particles are added to the polyester polymer melt in the melt phase process after the It.V. of the polyester polymer melt has reached 0.45 dL/g.

42. The polyester composition of claim 36, wherein the particles are added to the melt phase process at a point proximate to an outlet of a final polycondensation reactor and any point thereafter up to a die for solidifying the polyester melt, or at any point after solidification of the polyester polymer made in the melt phase process.

43. The polyester composition of claim 36, wherein the aluminum atoms are added to the melt phase process as a stream separate from a stream containing the lithium atoms.

44. The polyester composition of claim 36, wherein the aluminum atoms are added to the melt phase process as a liquid solution or dispersion, wherein the aluminum atoms are obtained from at least one aluminum compound selected from the group consisting of a carboxylic acid salt of aluminum, an aluminum alcoholate, an aluminum hydroxide, an aluminum halide, and an aluminum hydroxyhalide.

45. The polyester composition of claim 36, wherein the lithium atoms are added as a liquid stream to the melt phase process, wherein the lithium atoms are obtained from at least one lithium salt or complex comprising a counterion of a hydroxide, an amine, an amine derivative, a carbonate, or a halide.

46. The polyester composition of claim 1, wherein the polyester polymer is obtained in a direct esterification process.

47. The polyester composition of claim 36, wherein the polyester polymer is made in the absence of added titanium-containing catalysts.

48. The polyester composition of claim 36, wherein the polyester polymer is made in the absence of added antimony containing catalysts.

49. The polyester composition of claim 36, wherein the lithium atoms are added to a diol feed to an esterification reactor.

50. The polyester composition of claim 36, wherein the lithium atoms are added before 50% conversion of an esterification reaction mixture.

51. The polyester composition of claim 36, wherein the lithium atoms are added between an esterification and a polycondensation zone.

52. The polyester composition of claim 36, wherein the aluminum atoms are added to the polyester polymer melt before the It.V. of the polyester polymer melt reaches 0.3 dL/g.

53. The polyester composition of claim 36, wherein the polyester polymer is made in the absence of titanium containing catalysts, cobalt containing catalysts, and antimony containing catalysts, used to increase the It.V. of the polyester polymer in the melt phase by more than 0.1 dL/g.

54. The polyester composition of claim 53, wherein the polyester polymer is made without the addition of any metal containing catalyst to the melt phase process other than the aluminum atoms and the lithium atoms.

55. The polyester composition of claim 36, wherein the phosphorus atoms are obtained from at least one acidic phosphorus compound or at least one acidic phosphorus ester derivative.

56. The polyester composition of claim 36, wherein the phosphorus atoms are derived from one or more phosphorus containing compounds selected from the group consisting of phosphoric acid, phosphorus acid, polyphosphoric acid, a carboxyphosphonic acid, a phosphonic acid derivative, an acidic salt of any of these, an acidic ester of any of these, and a derivative of any of these.

57. The polyester composition of claim 56, wherein the phosphorus containing compounds are one or more selected from the group consisting of an oligomeric phosphate tri-ester, (tris)ethylene glycol phosphate, a tri-ester of phosphoric acid with ethylene glycol, diethylene glycol, and mixtures of each.

58. The polyester composition of claim 36, wherein the amount of phosphorus atoms is at least 50 ppm.

59. The polyester composition of claim 58, wherein the amount of phosphorus atoms ranges from 75 ppm up to 300 ppm.

60. The polyester composition of claim 36, wherein the molar ratio of the phosphorus atoms to the total of the aluminum atoms and the lithium atoms ranges from 0.3:1 to 5:1.

61. The polyester composition of claim 60, wherein the molar ratio of the phosphorus atoms to the total of the aluminum atoms and the lithium atoms ranges from 0.5:1 to 3:1.

62. The polyester composition of claim 36, wherein the phosphorus atoms are added to the polyester melt when one or more of the following conditions are satisfied or thereafter and before solidification of the polyester melt:
  a) the polyester polymer melt reaches an It.V. of at least 0.50 dL/g; or
  b) vacuum applied to the polyester polymer melt, if any, is released; or
  c) if the polyester polymer melt is present in a melt phase polymerization process, adding the phosphorus atoms within a final reactor for making the polyester polymer or between the final reactor and before a cutter for cutting the polyester polymer melt; or
  d) if the polyester polymer melt is present in a melt phase polymerization process, following at least 85% of the time for polycondensing the polyester polymer melt; or
  e) the It.V. of the polyester polymer melt is within +/−0.15 dL/g of the It.V. obtained upon solidification; or
  f) at a point within 20 minutes or less of solidifying the polyester polymer melt.

63. The polyester composition of claim 62, wherein the phosphorus atoms are added to the polyester polymer melt after the polyester polymer melt obtains an It.V. of at least 0.72 dL/g.

64. The polyester composition of claim 62, wherein the phosphorus atoms are added to the polyester polymer melt immediately before or after bringing the pressure within a final polycondensation reactor to a level of 300 mmHg or greater.

65. The polyester composition of claim 62, wherein the phosphorus atoms are added at a location near or at the end of the final reactor or between the final reactor and before a cutter for cutting the polyester polymer melt.

66. The polyester composition of claim 62, wherein the phosphorus atoms are added to the polyester polymer melt following at least 90% of the polycondensation time.

67. The polyester composition of claim 62, wherein the phosphorus atoms are added to the polyester polymer melt when the It.V. of the polyester polymer melt is within 0.05 dL/g of the It.V. obtained upon solidification.

68. The polyester composition of claim 62, wherein the phosphorus atoms are added to the polyester polymer melt at a point within 5 minutes or less of solidifying the polyester polymer melt.

69. The polyester composition of claim 36, wherein the polyester polymer is made in a continuous manufacturing process where the throughput of the melt phase process is at least 50 tons/day.

70. The polyester composition of claim 36, wherein a reaction time of the polyester polymer melt from an It.V. of 0.40 dL/g through and up to a final It.V. obtained in the melt phase process is 80 minutes or less.

71. The polyester composition of claim 36, wherein the polyester polymer has an It.V. of at least 0.72 dL/g obtained in the melt phase process.

72. The polyester composition of claim 36, wherein the polyester composition has an L* value of at least 73.

73. The polyester composition of claim 36, wherein organic acetaldehyde scavengers are not added to the melt phase process for making the polyester polymer.

74. A bulk of pellets, comprising the polyester composition of claim 36 in a shipping container.

75. A post consumer recycle polyester polymer, comprising the polyester composition of claim 36.

76. A bottle preform comprising the polyester composition of claim 36, having a b* ranging from −8.6 to 3.0 or less.

77. The bottle preform of claim 76, having an RIT of 5° C. or more.

78. The polyester composition of claim 36, wherein the lithium atoms are present in an amount ranging from 10 ppm to 50 ppm,
wherein the aluminum atoms are present in an amount ranging from 10 ppm to 50 ppm, and
wherein the particles comprising titanium nitride have a median particle size ranging from 5 nm to 60 nm and are present in amount ranging from 5 ppm to 50 ppm based on the titanium atoms,
each based on the weight of the polyester polymer.

79. The polyester composition of claim 78, wherein the amount of phosphorus atoms ranges from 75 ppm to 170 ppm, based on the weight of the polyester polymer.

80. The polyester composition of claim 79, wherein the phosphorus atoms are added at the completion of the polycondensing or thereafter.

81. The polyester composition of claim 36, wherein the particles further comprise atoms of tungsten or molybdenum.

82. The polyester composition of claim 1, wherein the particles further comprise
a transition metal compound comprising at least one boron atom,
a transition metal compound comprising at least one carbon atom, or
a transition metal compound comprising nitrogen.

83. The polyester composition of claim 2, wherein the particles further comprise
a transition metal compound comprising at least one boron atom,
a transition metal compound comprising at least one carbon atom, or
a transition metal compound comprising nitrogen.

84. The polyester composition of claim 1, wherein the polyester composition has an L* value of at least 73.

85. The polyester composition of claim 1, comprising no added antimony containing catalysts.

86. The polyester composition of claim 36, comprising no added antimony containing catalysts.

87. The polyester composition of claim 1, comprising no added titanium containing catalysts, no added cobalt containing catalysts, and no added antimony containing catalysts.

88. The polyester composition of claim 36, comprising no added titanium containing catalysts, no added cobalt containing catalysts, and no added antimony containing catalysts.

89. The polyester composition of claim 1, comprising no added metal containing catalyst other than the aluminum atoms and the lithium atoms.

90. The polyester composition of claim 36, comprising no added metal containing catalyst other than the aluminum atoms and the lithium atoms.

91. The polyester composition of claim 1, wherein the amount of the lithium atoms ranges from 40 ppm to 100 ppm, based on the weight of the polyester polymer.

92. The polyester composition of claim 36, wherein the amount of the lithium atoms ranges from 40 ppm to 100 ppm, based on the weight of the polyester polymer.

93. The polyester composition of claim 1, wherein L* is at least 75.

94. The polyester composition of claim 36, wherein L* is at least 75.

95. The polyester composition of claim 1, wherein L* is at least 78.

96. The polyester composition of claim 36, wherein L* is at least 78.

97. The polyester composition of claim 1, wherein L* is at least 79.18.

98. The polyester composition of claim 36, wherein L* is at least 79.18.

99. The polyester composition of claim 1, wherein L* is at least 80.

100. The polyester composition of claim 36, wherein L* is at least 80.

101. The polyester composition of claim 1, wherein L* is at least 85.

102. The polyester composition of claim 36, wherein L* is at least 85.

103. The polyester composition of claim 1, wherein the particles are present in an amount ranging from 10 ppm to 100 ppm.

104. The polyester composition of claim 36, wherein the particles are present in an amount ranging from 10 ppm to 100 ppm.

105. The polyester composition of claim 1, wherein the particles are present in an amount ranging from 15 ppm to 100 ppm.

106. The polyester composition of claim 36, wherein the particles are present in an amount ranging from 15 ppm to 100 ppm.

107. The polyester composition of claim 1, wherein the particles are present in an amount ranging from 20 ppm to 100 ppm.

108. The polyester composition of claim 36, wherein the particles are present in an amount ranging from 20 ppm to 100 ppm.

109. The polyester composition of claim 1, wherein the particles are present in an amount ranging from 25 ppm to 100 ppm.

110. The polyester composition of claim 36, wherein the particles are present in an amount ranging from 25 ppm to 100 ppm.

111. The polyester composition of claim 72, wherein the particles are present in an amount ranging from 10 ppm to 100 ppm.

112. The polyester composition of claim 84, wherein the particles are present in an amount ranging from 10 ppm to 100 ppm.

113. The polyester composition of claim 72, wherein the particles are present in an amount ranging from 15 ppm to 100 ppm.

114. The polyester composition of claim 84, wherein the particles are present in an amount ranging from 15 ppm to 100 ppm.

115. The polyester composition of claim 72, wherein the particles are present in an amount ranging from 20 ppm to 100 ppm.

116. The polyester composition of claim 84, wherein the particles are present in an amount ranging from 20 ppm to 100 ppm.

117. The polyester composition of claim 72, wherein the particles are present in an amount ranging from 25 ppm to 100 ppm.

118. The polyester composition of claim 84, wherein the particles are present in an amount ranging from 25 ppm to 100 ppm.

\* \* \* \* \*

UNITED STATES PATENT AND TRADEMARK OFFICE
CERTIFICATE OF CORRECTION

PATENT NO. : 8,431,202 B2  
APPLICATION NO. : 11/229238  
DATED : April 30, 2013  
INVENTOR(S) : Donna Rice Quillen et al.

Page 1 of 1

It is certified that error appears in the above-identified patent and that said Letters Patent is hereby corrected as shown below:

On the title page, Item (73), the Assignee's city is incorrect. Item (73) should read:

--(73) Assignee: Grupo Petrotemex, S.A. de C.V., San Pedro Garza Garcia (MX)--

Signed and Sealed this
Twenty-fifth Day of June, 2013

Teresa Stanek Rea
*Acting Director of the United States Patent and Trademark Office*